Inventor
HANS P. LUHN
By
Charles E. McTiernan
Attorney

Dec. 28, 1954 | H. P. LUHN | 2,698,075

PROGRAMMING SYSTEM FOR RECORD CONTROLLED PRINTING APPARATUS

Filed Dec. 9, 1950 | 43 Sheets-Sheet 2

Inventor

HANS P. LUHN

Charles E. McTiernan

Attorney

Inventor
HANS P. LUHN
By
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 4

Inventor
HANS P LUHN

By Charles E. McTiernan

Attorney

Dec. 28, 1954 H. P. LUHN 2,698,075
PROGRAMMING SYSTEM FOR RECORD CONTROLLED
PRINTING APPARATUS
Filed Dec. 9, 1950 43 Sheets-Sheet 5

Inventor
HANS P. LUHN
By
Charles E. McTiernan
Attorney

Dec. 28, 1954

H. P. LUHN 2,698,075

PROGRAMMING SYSTEM FOR RECORD CONTROLLED PRINTING APPARATUS

Filed Dec. 9, 1950

Inventor
HANS P. LUHN
By
Charles E. McTiernan
Attorney

Inventor
HANS P. LUHN
By Charles E. McTiernan
Attorney

Inventor
HANS P. LUHN
By
Charles E. McTiernan
Attorney

HANS P LUHN
By Charles E. McTiernan
Attorney

Dec. 28, 1954    H. P. LUHN    2,698,075
PROGRAMMING SYSTEM FOR RECORD CONTROLLED
PRINTING APPARATUS
Filed Dec. 9, 1950    43 Sheets-Sheet 9

HANS P. LUHN
Charles E. McTiernan
Attorney

Inventor
HANS P. LUHN
By Charles E. McTiernan
Attorney

Inventor
HANS P LUHN
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 12

Inventor
HANS P. LUHN

By
Charles E. McTiernan
Attorney

HANS P LUHN
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 14

Inventor

HANS P. LUHN

By

Charles E. McTiernan

Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 15

HANS P. LUHN

By Charles E. McTiernan

Attorney

Inventor
HANS P. LUHN
By
Charles E. McTiernan
Attorney

Dec. 28, 1954

H. P. LUHN 2,698,075

PROGRAMMING SYSTEM FOR RECORD CONTROLLED PRINTING APPARATUS

Filed Dec. 9, 1950

HANS P. LUHN

By Charles C. McTiernan

Attorney

Inventor
HANS P. LUHN
By Charles E. McTiernan
Attorney

Dec. 28, 1954

H. P. LUHN 2,698,075

PROGRAMMING SYSTEM FOR RECORD CONTROLLED
PRINTING APPARATUS

Filed Dec. 9, 1950

Inventor

HANS P. LUHN
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 19

Inventor

HANS P. LUHN

By

Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 20

Inventor
HANS P. LUHN

Charles E. McTiernan
Attorney

Dec. 28, 1954    H. P. LUHN    2,698,075
PROGRAMMING SYSTEM FOR RECORD CONTROLLED
PRINTING APPARATUS
Filed Dec. 9, 1950    43 Sheets-Sheet 21

Inventor
HANS P. LUHN
By Charles E. McTiernan
Attorney

HANS P. LUHN
By
Charles E. McTiernan
Attorney

Inventor
HANS P. LUHN
By
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 24

By HANS P. LUHN

Charles E. McTiernan

Attorney

Inventor
HANS P. LUHN
By
Charles E. McTiernan
Attorney

Inventor
HANS P. LUHN
Charles E. McTiernan
Attorney

Inventor
HANS P LUHN
By
Charles E. McTiernan
Attorney

Dec. 28, 1954 H. P. LUHN 2,698,075
PROGRAMMING SYSTEM FOR RECORD CONTROLLED
PRINTING APPARATUS
Filed Dec. 9, 1950 43 Sheets-Sheet 28

Inventor
HANS P. LUHN
By
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 29

Inventor
HANS P. LUHN

By
Charles E. McTiernan
Attorney

Dec. 28, 1954 H. P. LUHN 2,698,075

PROGRAMMING SYSTEM FOR RECORD CONTROLLED PRINTING APPARATUS

Filed Dec. 9, 1950 43 Sheets-Sheet 30

Inventor
HANS P LUHN

Charles E. McTiernan
Attorney

FIG. 31.
| | | Index Series | | | | Major Series | | | | | Minor Series | | | |
|---|---|---|---|---|---|---|---|---|---|---|---|---|---|---|
| | | A1 | A2 | B1 | B2 | C | D1 | D2 | D3 | E | F1 | F2 | G1 | G2 |
| DECK U | Y X | | | | | 1 | | | | | 2 | | | |
| DECK I | 0 1 2 3 4 | 0-1 | 5-4 | 2 | 3 | 4-0 | 1 | 3 | 3 | 2 | 0 | 3 | 2 | 1 |
| DECK L | 5 6 7 8 9 | 5-4 | 0-1 | 3 | 2 | 0-4 | 3 | 1 | 1 | 2 | 3 | 0 | 1 | 2 |
| Possible Combinations | | 26 | 26 | 100 | 100 | 5 | 50 | 46 | 4 | 100 | 10 | 10 | 50 | 50 |
| | | 252 | | | | 210×2=420 | | | | | 120 | | | |
Total Combinations = 792
FIG. 32.
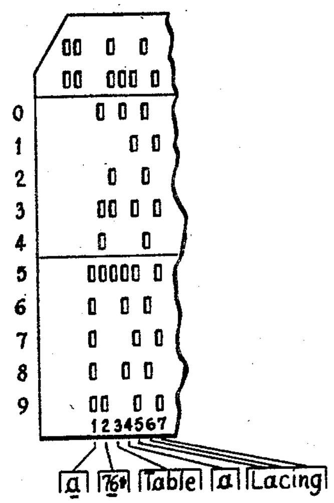
FIG. 24.
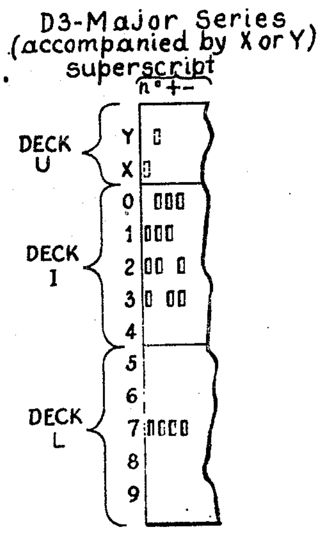
Inventor
HANS P. LUHN
By
Charles E. McTiernan
Attorney Inventor
HANS P LUHN
By
Charles E. McTiernan
Attorney Inventor
HANS P. LUHN
By
Charles E. McTiernan
Attorney Dec. 28, 1954    H. P. LUHN    2,698,075
PROGRAMMING SYSTEM FOR RECORD CONTROLLED
PRINTING APPARATUS
Filed Dec. 9, 1950    43 Sheets-Sheet 33

Inventor
HANS P. LUHN

By

Attorney

INVENTOR
HANS P. LUHN
BY
Charles E. McTiernan
ATTORNEY

Dec. 28, 1954   H. P. LUHN   2,698,075
PROGRAMMING SYSTEM FOR RECORD CONTROLLED
PRINTING APPARATUS
Filed Dec. 9, 1950.   43 Sheets-Sheet 34

INVENTOR
HANS P. LUHN
BY Charles E. McTiernan
ATTORNEY

INVENTOR
HANS P. LUHN
BY Charles E. McTiernan
ATTORNEY

Dec. 28, 1954   H. P. LUHN   2,698,075
PROGRAMMING SYSTEM FOR RECORD CONTROLLED
PRINTING APPARATUS
Filed Dec. 9, 1950   43 Sheets-Sheet 35

INVENTOR
HANS P. LUHN
BY Charles E. One Trerman
ATTORNEY

INVENTOR
HANS P. LUHN
By
Charles E. McTiernan
ATTORNEY

INVENTOR
HANS P. LUHN

Charles E. McTiernan
ATTORNEY

INVENTOR
HANS P. LUHN

BY Charles E. McTiernan
ATTORNEY

Dec. 28, 1954  H. P. LUHN  2,698,075
PROGRAMMING SYSTEM FOR RECORD CONTROLLED
PRINTING APPARATUS
Filed Dec. 9, 1950  43 Sheets-Sheet 38

INVENTOR
HANS P. LUHN
ATTORNEY

INVENTOR
HANS P. LUHN
Charles E. McTiernan
ATTORNEY

Inventor
HANS P. LUHN
By
Charles E. McTiernan
Attorney

Dec. 28, 1954

H. P. LUHN 2,698,075

PROGRAMMING SYSTEM FOR RECORD CONTROLLED
PRINTING APPARATUS

Filed Dec. 9, 1950

Inventor
HANS P. LUHN

Attorney

Dec. 28, 1954     H. P. LUHN     2,698,075
PROGRAMMING SYSTEM FOR RECORD CONTROLLED
PRINTING APPARATUS
Filed Dec. 9, 1950     43 Sheets-Sheet 41

Inventor
HANS P. LUHN
By
Charles E. McTiernan
Attorney

FIG. 34.

Geographical Location of Branch Offices-Table 97#

| | Col.#1 | Col.#2 | Col.#3 | Col.#4 | Col.#5 |
|---|---|---|---|---|---|
| 0 | Alabama | Idaho | Michigan | New York | Tenn. |
| 1 | Arizona | Illinois | Minnesota | No.Carolina | Texas |
| 2 | Arkansas | Indiana | Mississippi | No.Dakota | Utah |
| 3 | California | Iowa | Missouri | Ohio | Vermont |
| 4 | Colorado | Kansas | Montana | Oklahoma | Virginia |
| 5 | Connecticut | Kentucky | Nebraska | Oregon | Washington |
| 6 | Delaware | Louisiana | Nevada | Penn. | West Va. |
| 7 | District of Col. | Maine | New Hampshire | Rhode Island | Wisconsin |
| 8 | Florida | Maryland | New Jersey | So.Carolina | Wyoming |
| 9 | Georgia | Massachusetts | New Mexico | So.Dakota | Hawaii |

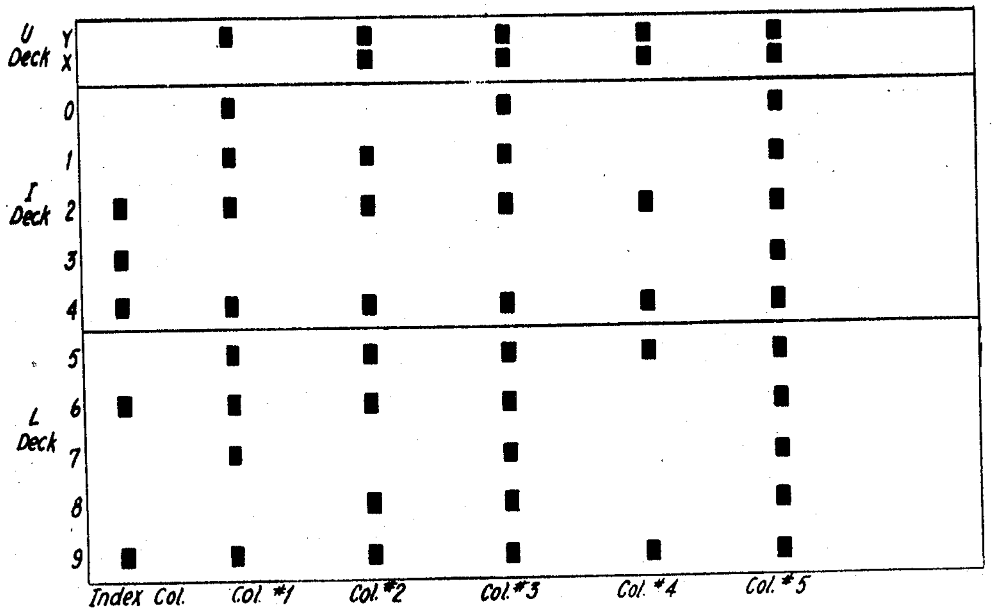

FIG. 35.

Inventor
HANS P. LUHN
By
Charles E. McTiernan
Attorney

FIG. 36.
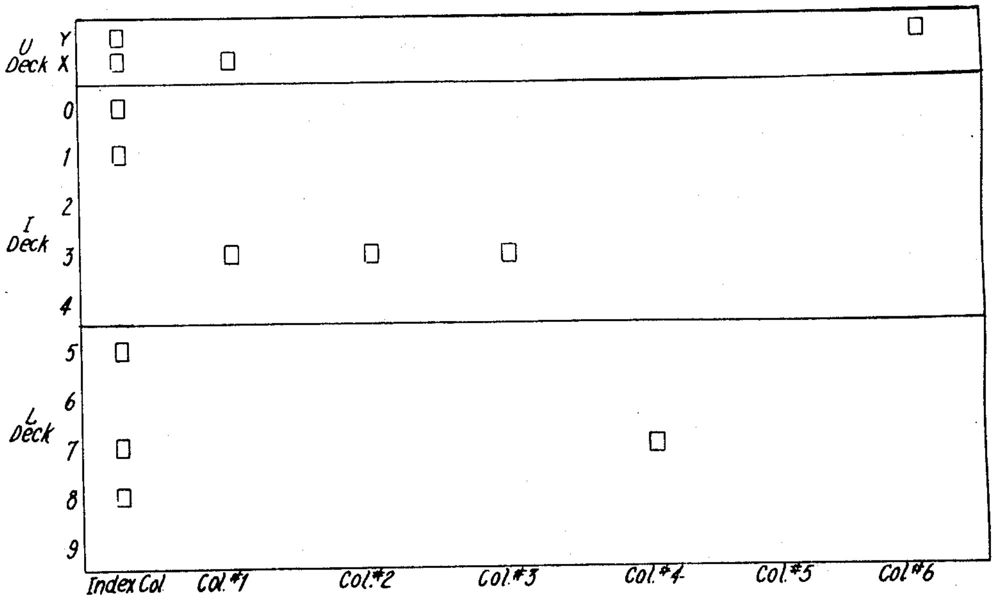
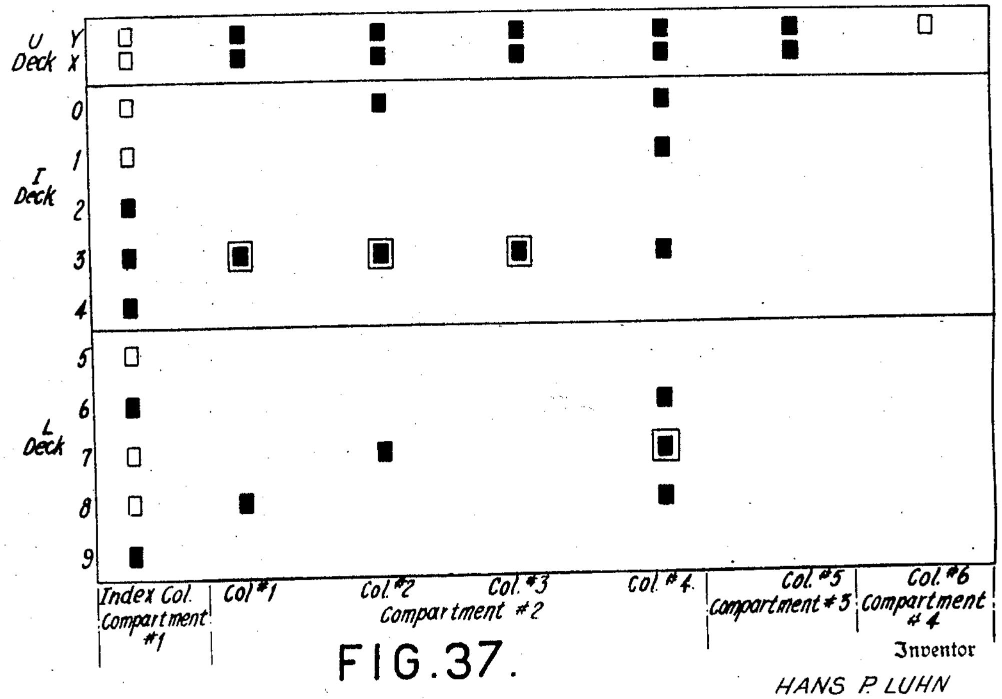
FIG. 37.
Inventor
HANS P. LUHN
By
Charles E. McTiernan
Attorney
Dec. 28, 1954   H. P. LUHN   2,698,075
PROGRAMMING SYSTEM FOR RECORD CONTROLLED
PRINTING APPARATUS
Filed Dec. 9, 1950   43 Sheets-Sheet 43
Inventor
HANS P. LUHN
By
Attorney

United States Patent Office 2,698,075
Patented Dec. 28, 1954

2,698,075

PROGRAMMING SYSTEM FOR RECORD CONTROLLED PRINTING APPARATUS

Hans P. Luhn, Armonk, N. Y., assignor to International Business Machines Corporation, New York, N. Y., a corporation of New York Application December 9, 1950, Serial No. 199,989

5 Claims. (Cl. 197—20)

This invention relates in general to a system for transcribing onto a copy sheet data which has been recorded on a record card pursuant to a predetermined coding arrangement. This invention relates, more specifically, to a system wherein record cards bearing data pursuant to a new and novel coding arrangement, consisting of a multitude of different coding combinations assigned to various series and subseries groupings, and representative of the intelligence to be transcribed upon a copy sheet are successively sensed causing a screening relay network to be completed resulting in the energization of the code selecting relay representative of the detected coding subseries at the proper time. After the code selecting relay has been energized, a programming operation is cyclically initiated whereby the required program steps assigned to the code subseries detected are carried out resulting in the printing of the record intelligence as further modified by accompanying symbols in addition to the necessary shifting of the typewriter basket as required for the transcribing of such intelligence upon a copy sheet.

The principal object of the invention is to provide record controlled printing apparatus which functions to analyze data or intelligence designated within a record card in codified form and to print the recorded intelligence at a rapid rate.

Another object of the invention is to provide record controlled printing apparatus including programming means for enabling the program steps required of a particular code combination to be carried out while the unwanted program steps are skipped.

Figs. 14*a* to 14*d* are a diagrammatic showing of the position of the type slugs necessary to effect the printing of certain selected characters in subscript or superscript form.

Figure 15:
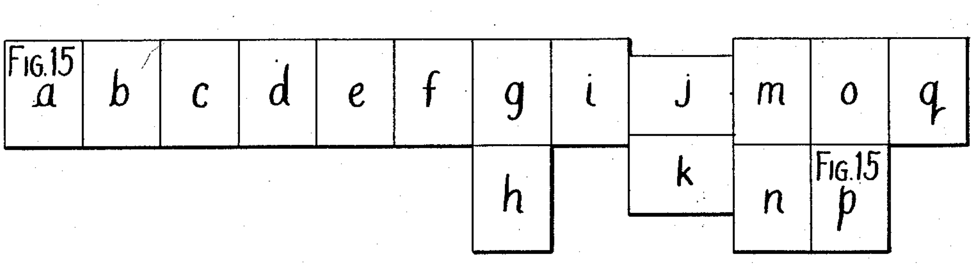
Figure 15A:
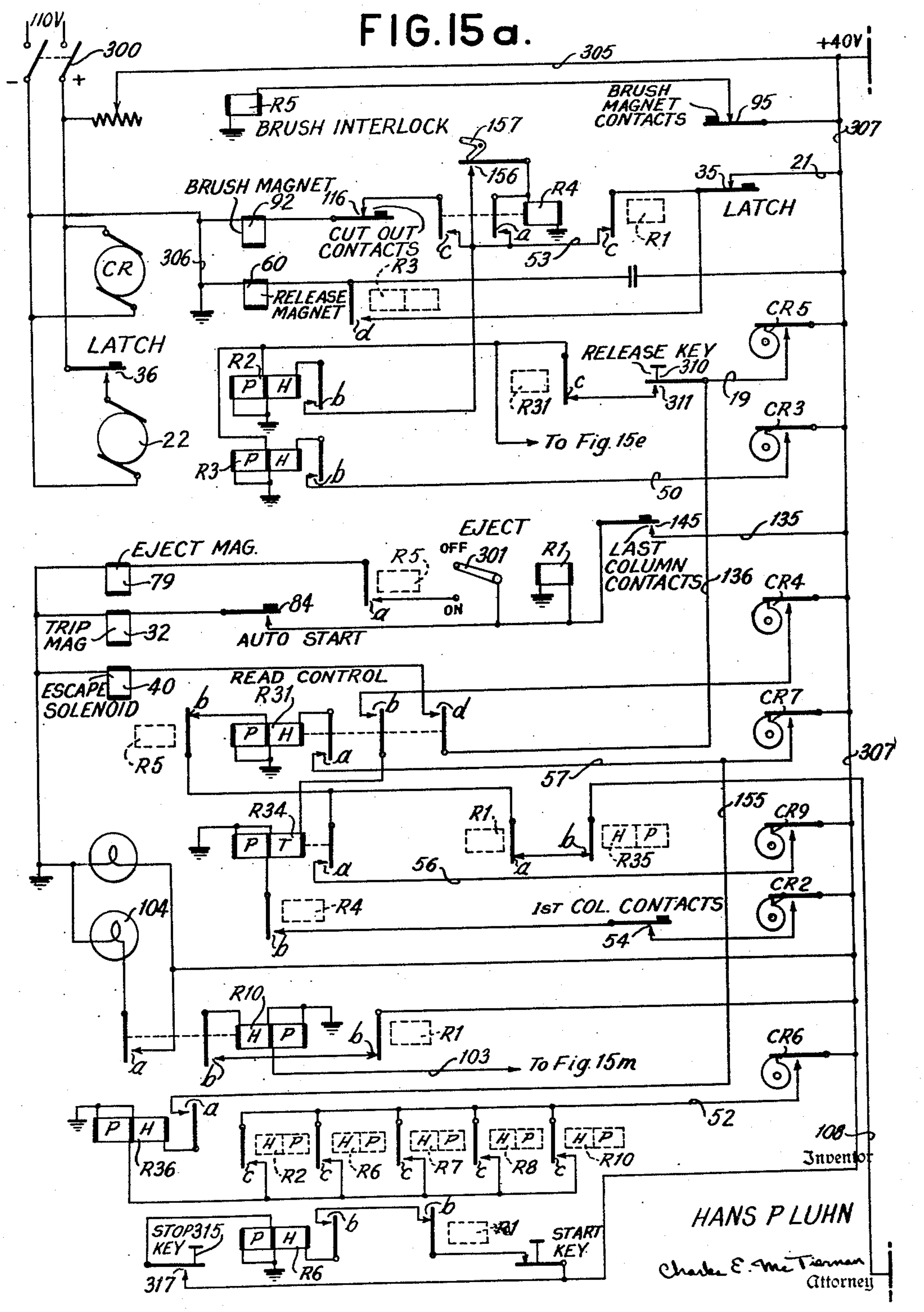
Figure 15B:
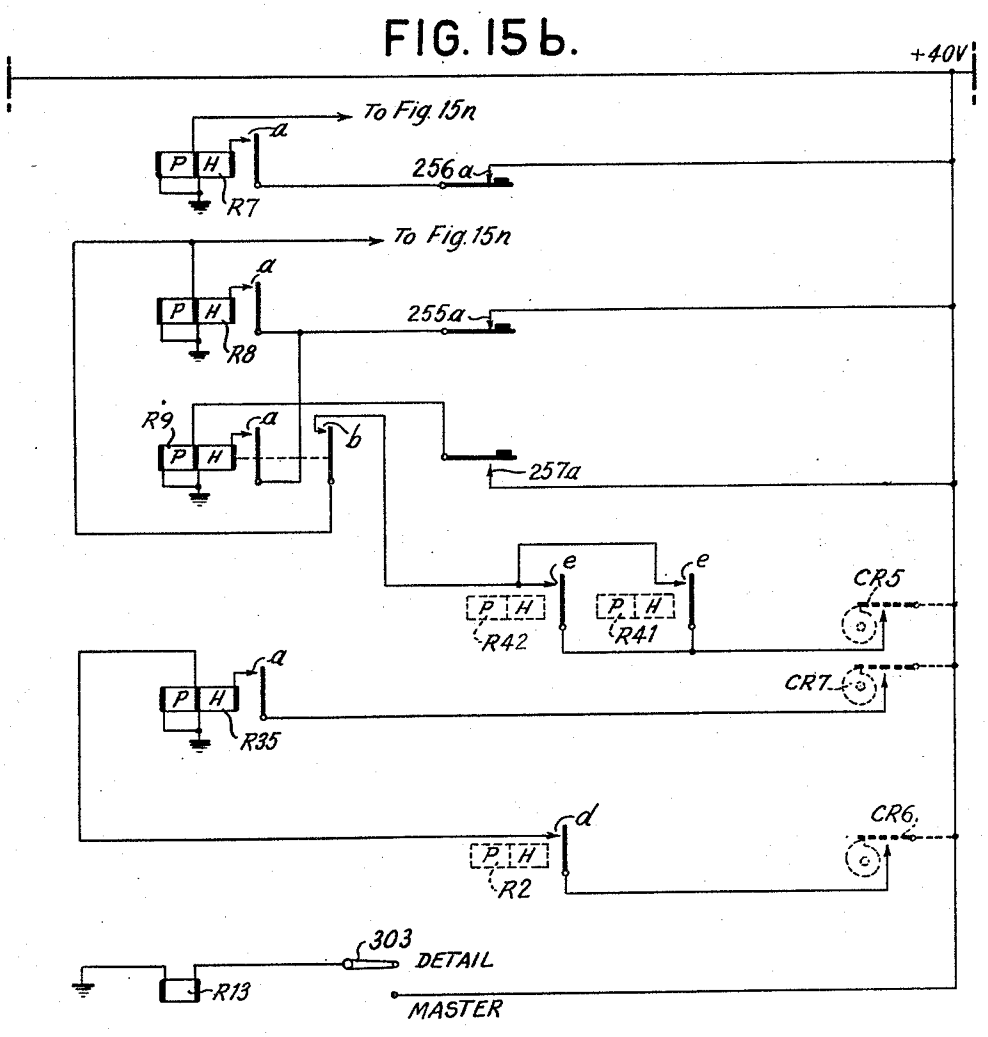
Figure 15C:
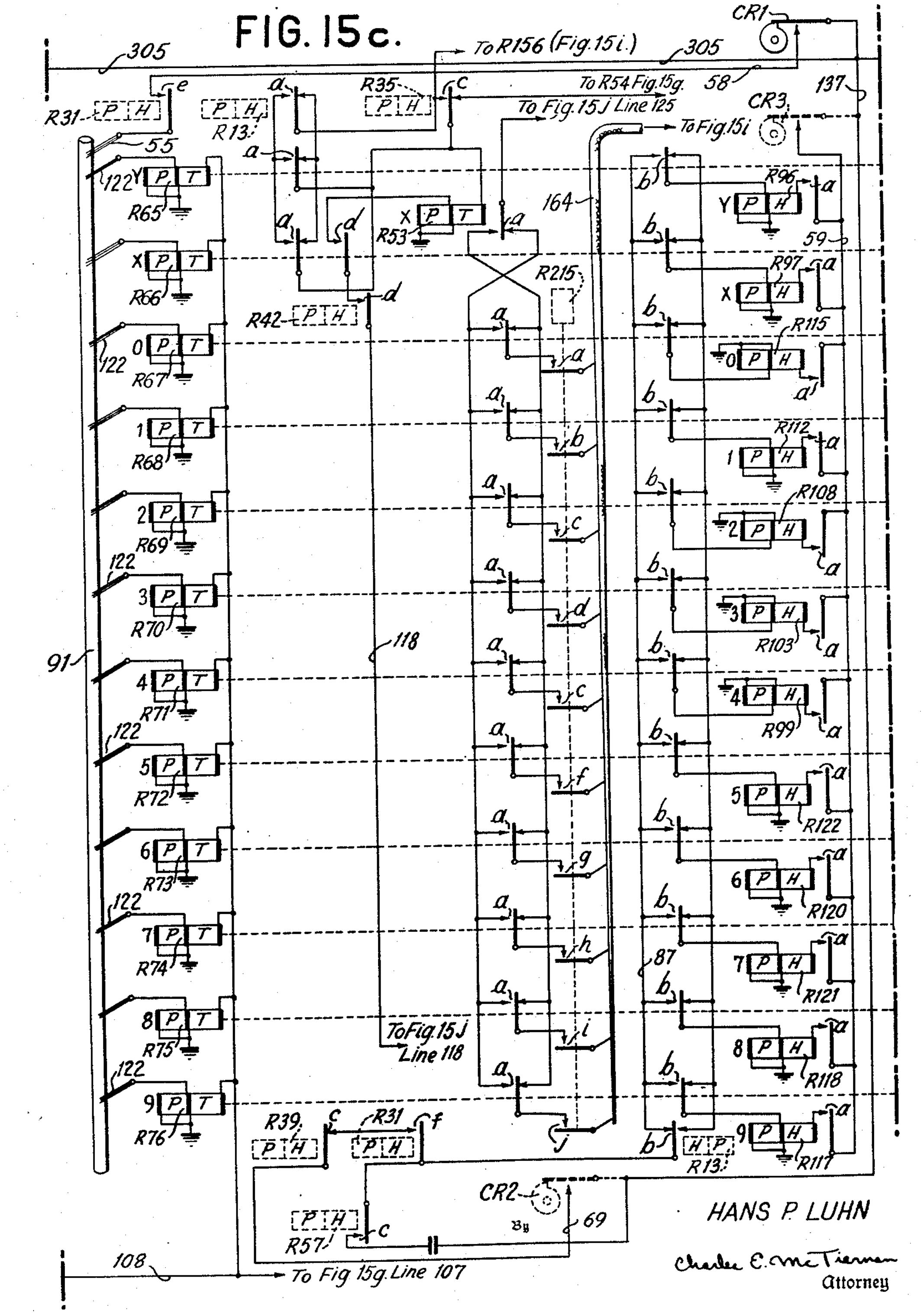
Figure 15D:
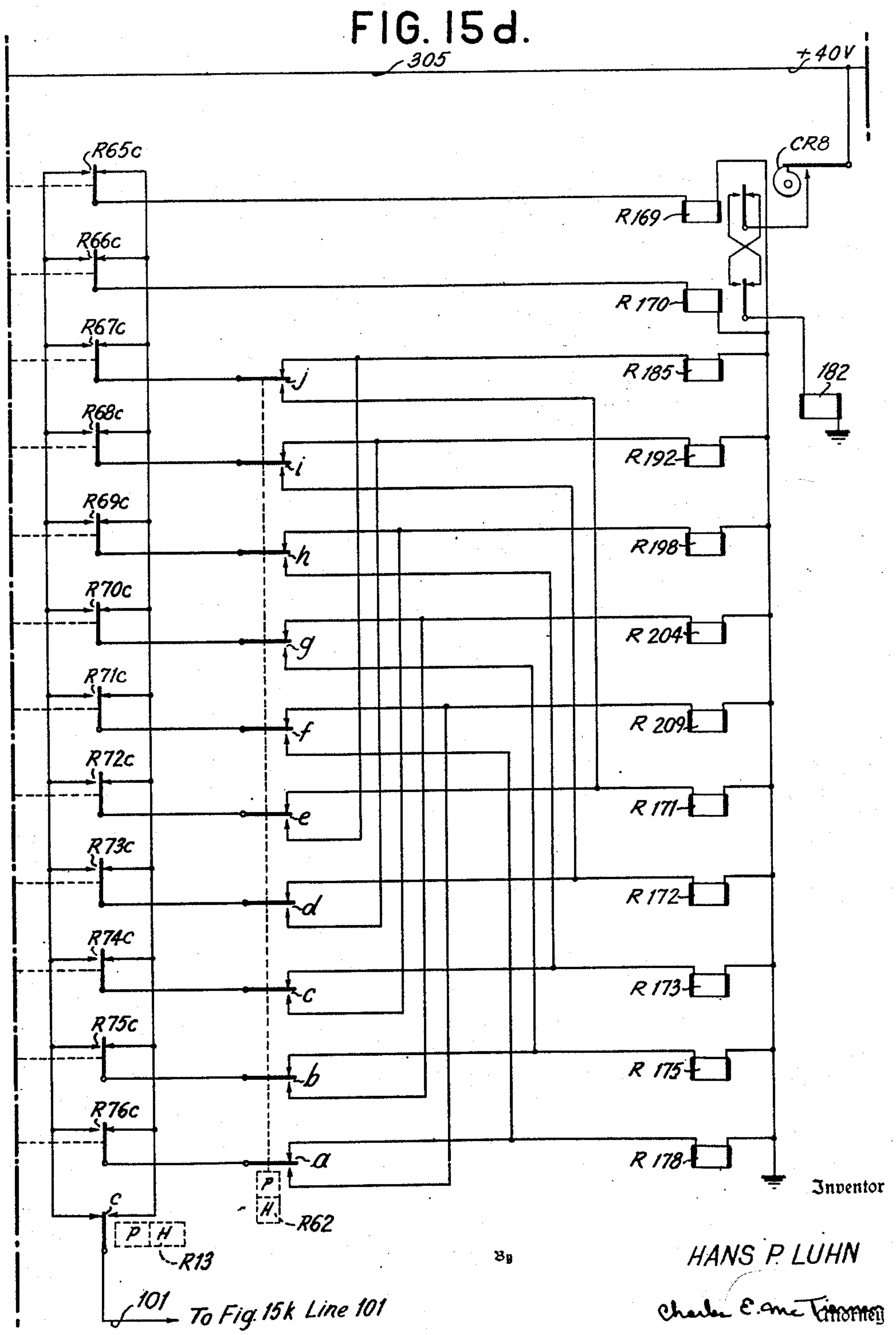
Figure 15E:
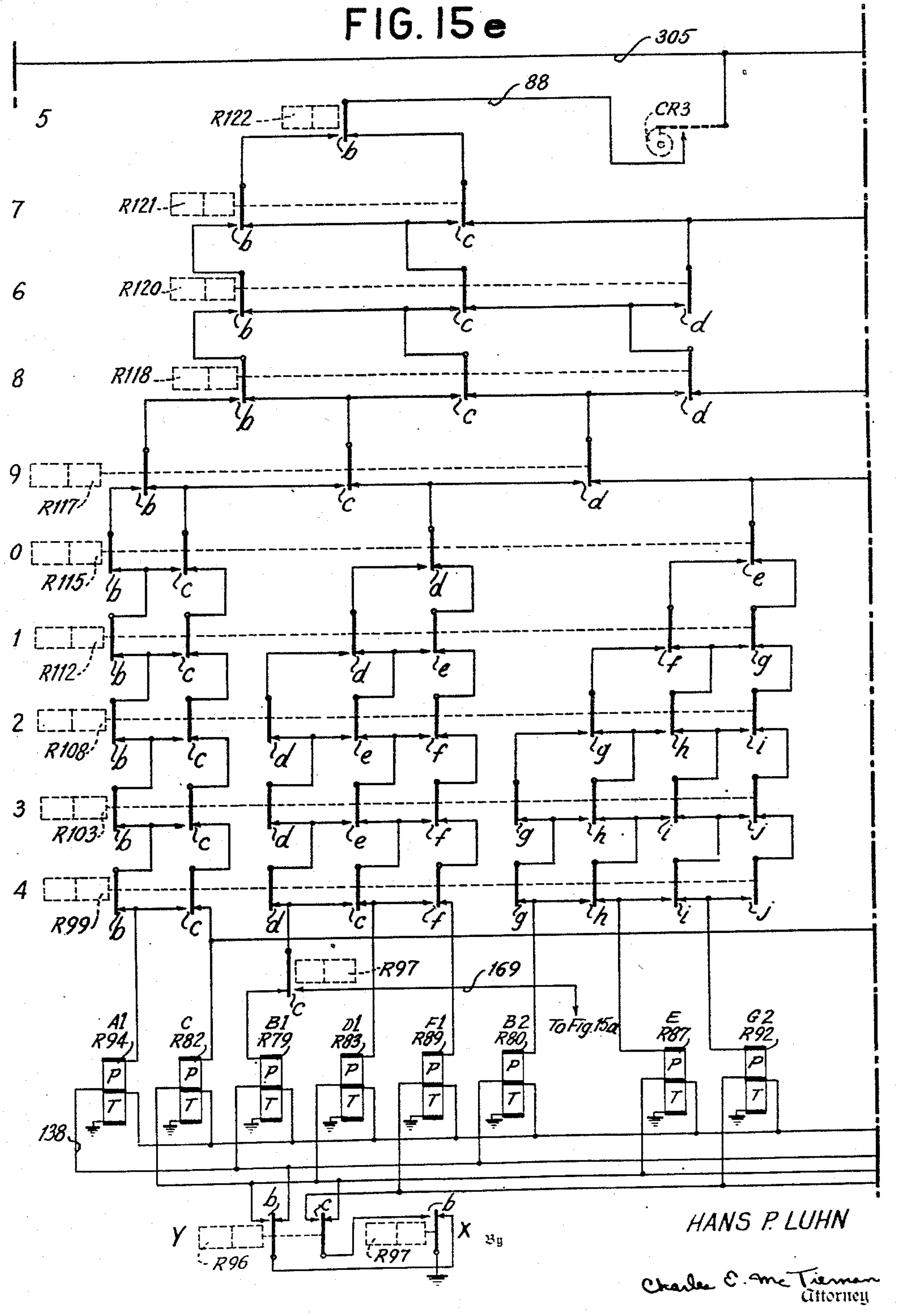
Figure 15F:
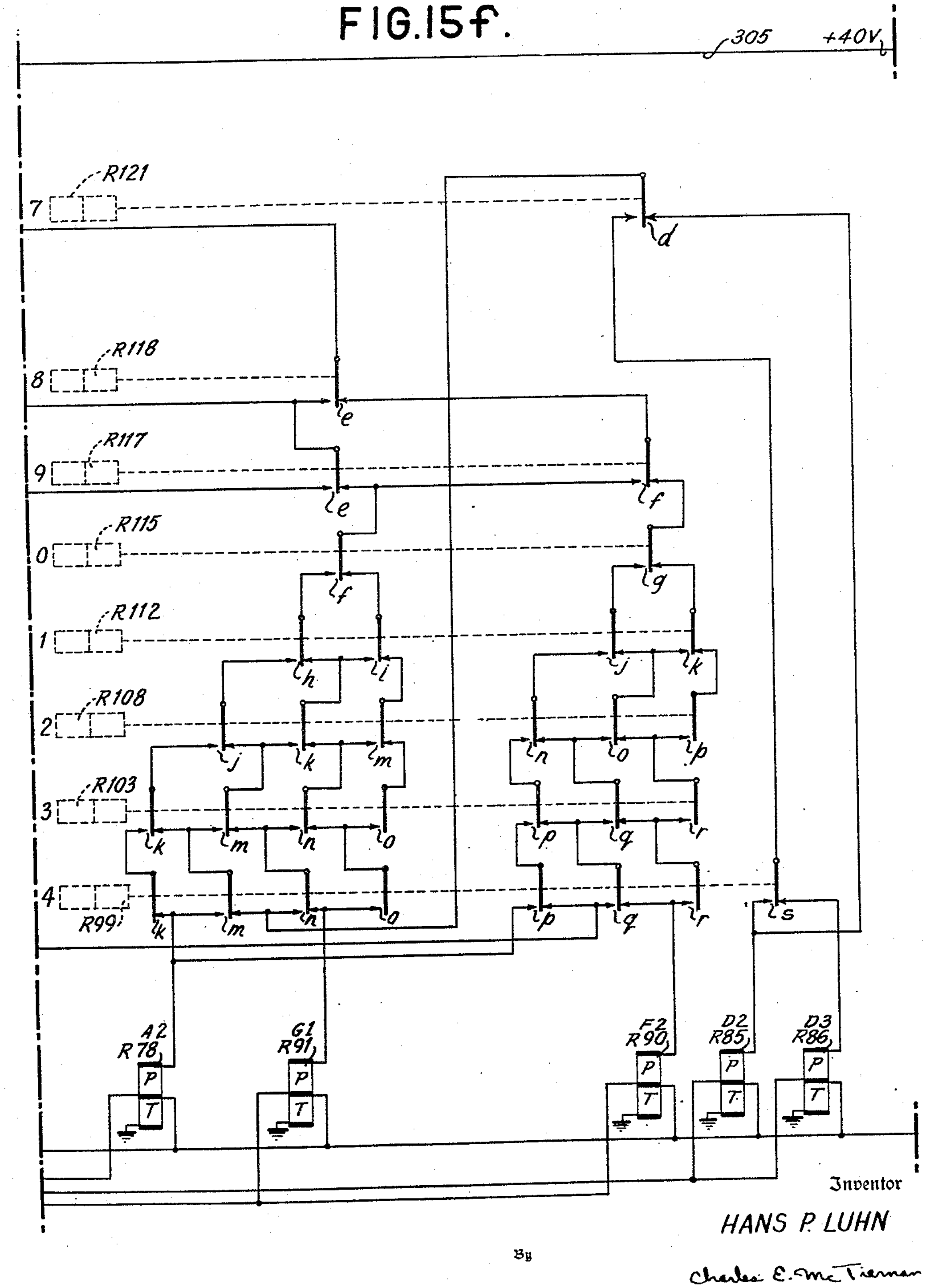
Figure 15G:
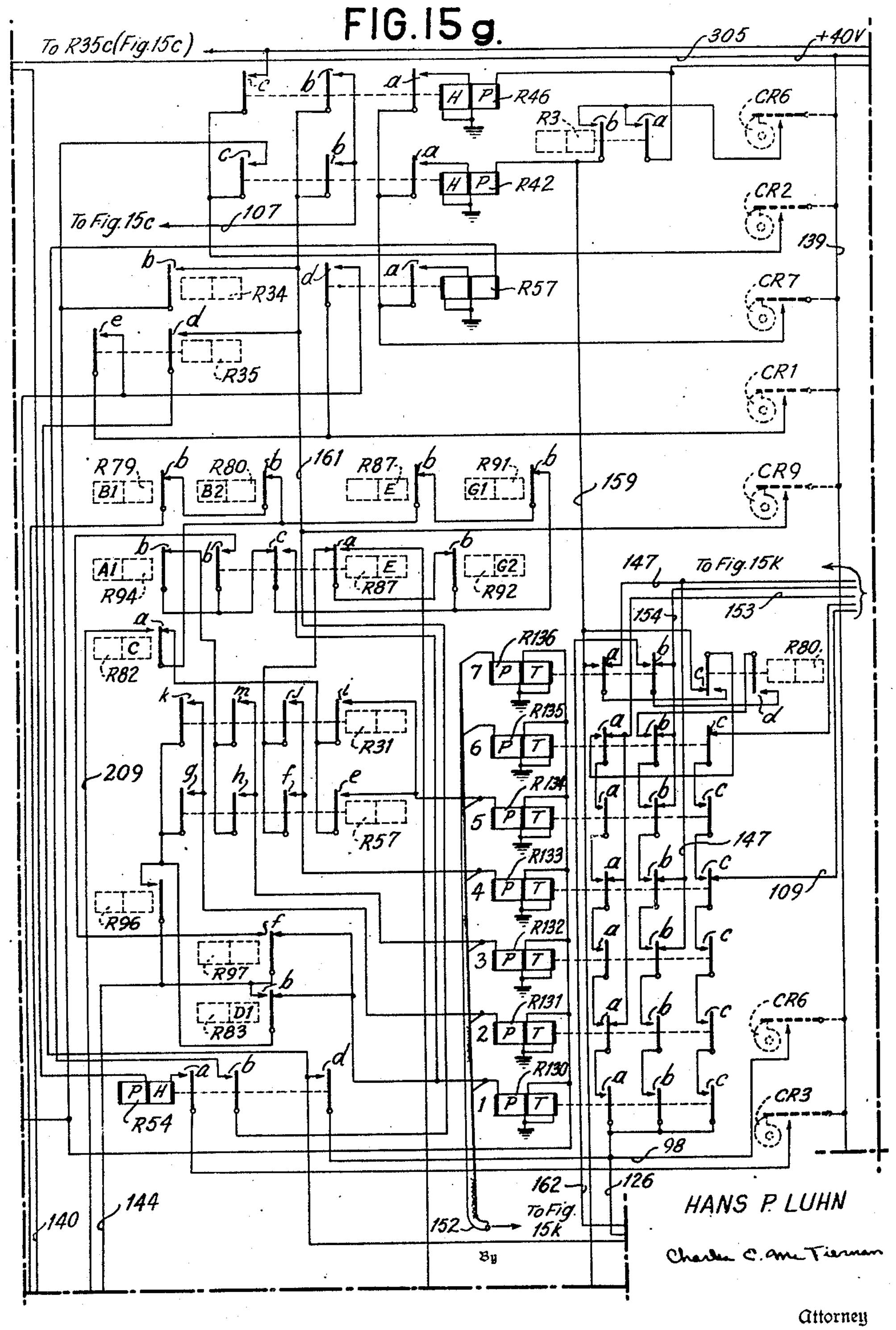
Figure 15H:
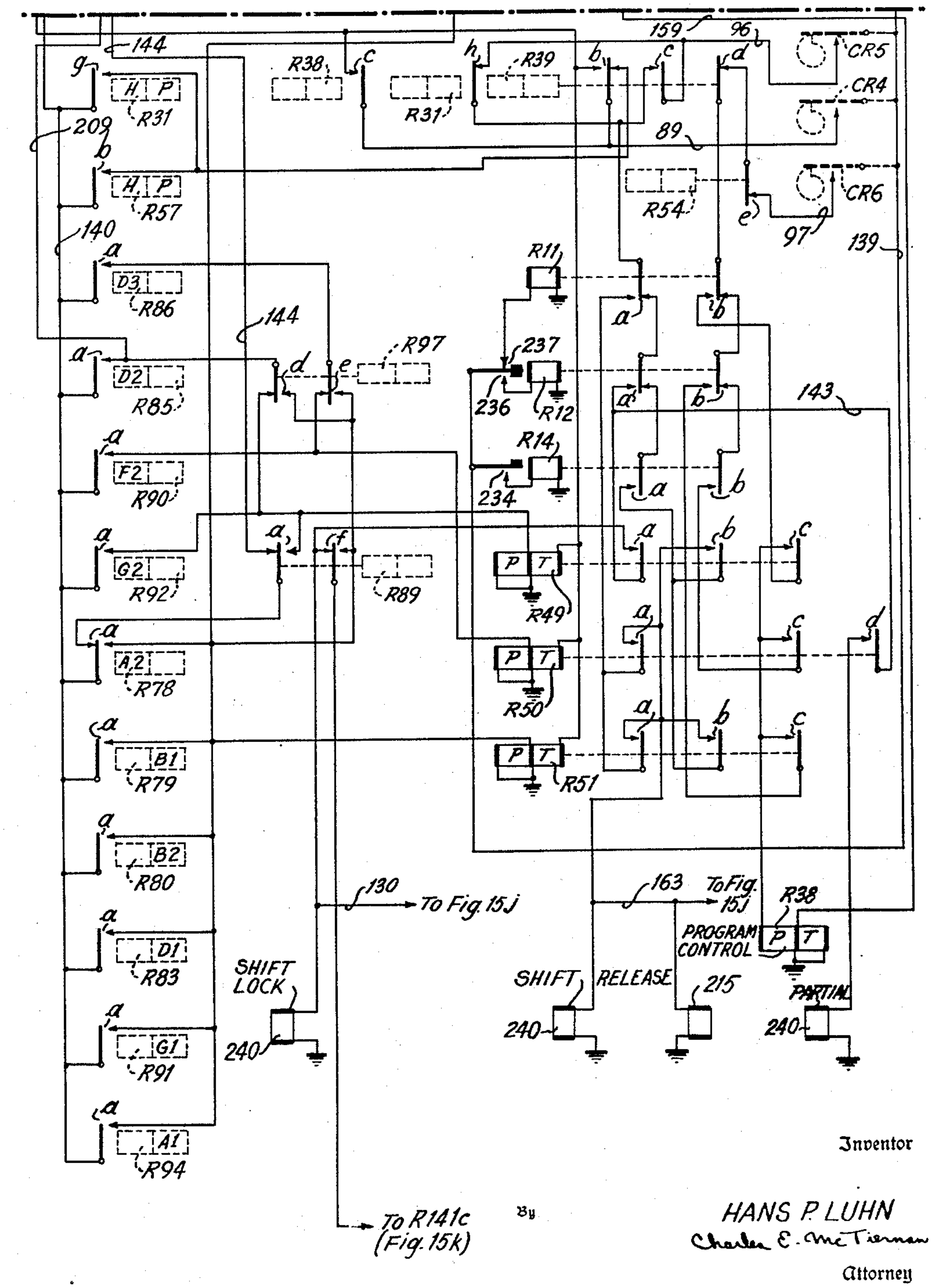
Figure 15I:
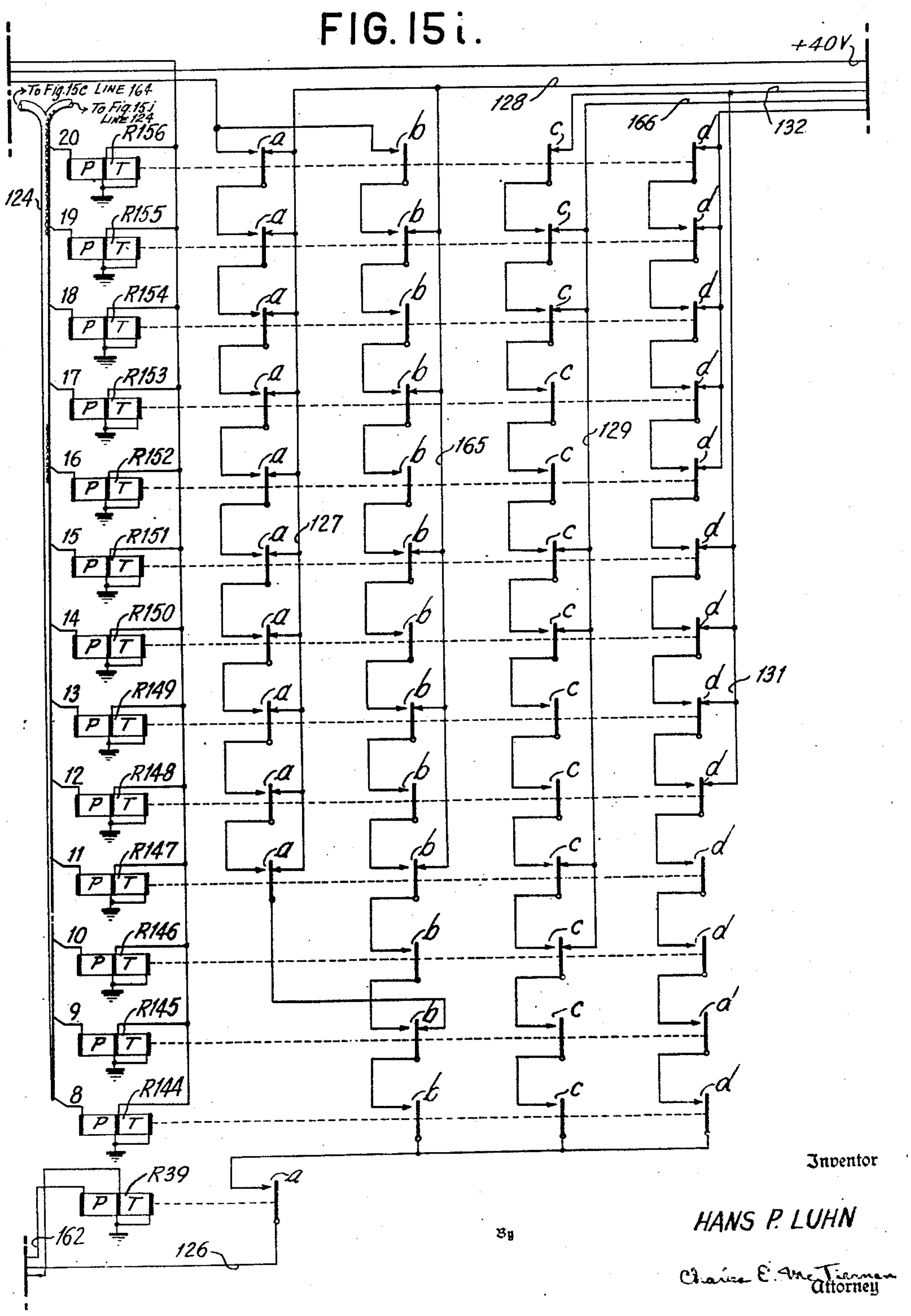
Figure 15J:
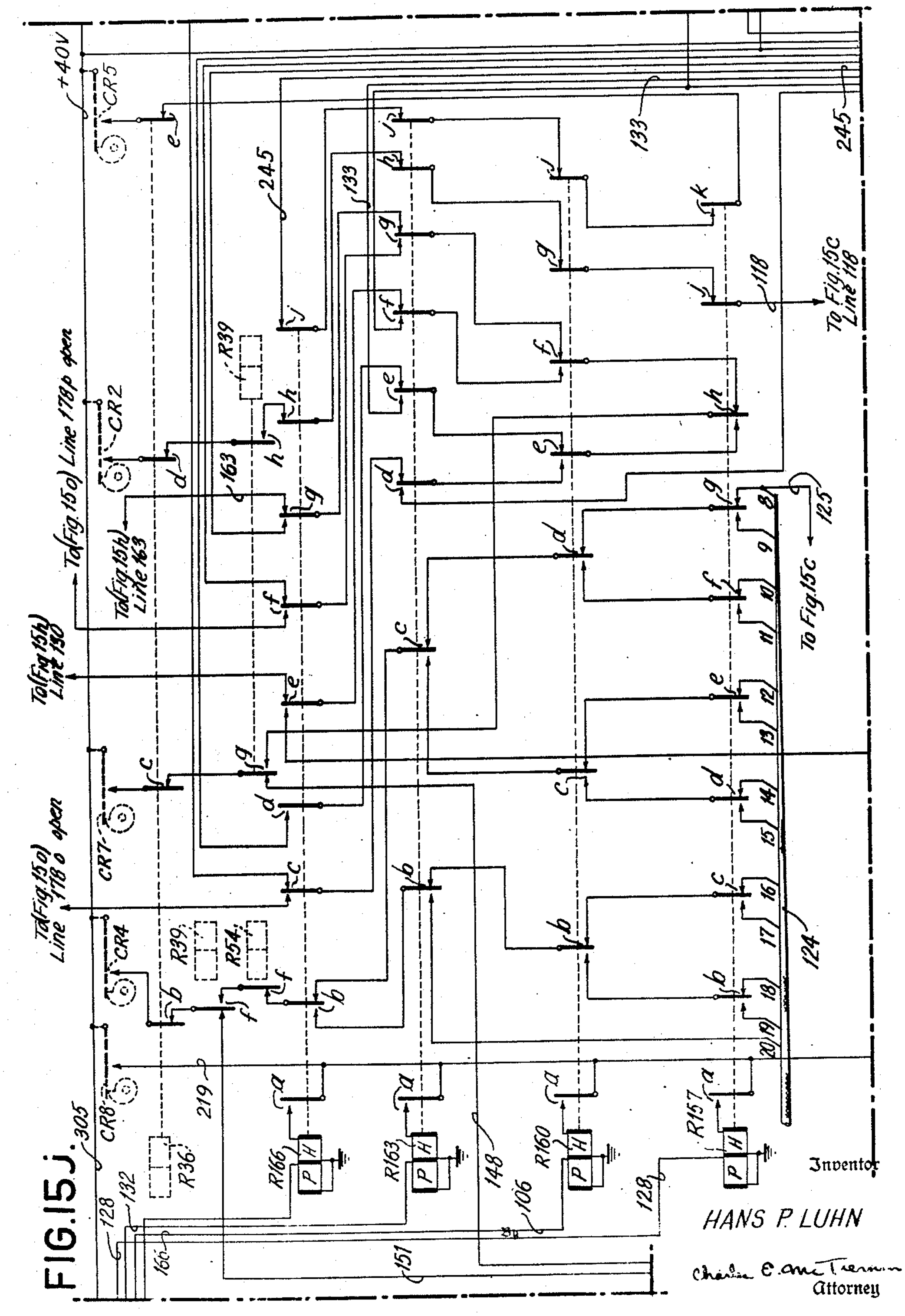
Figure 15K:
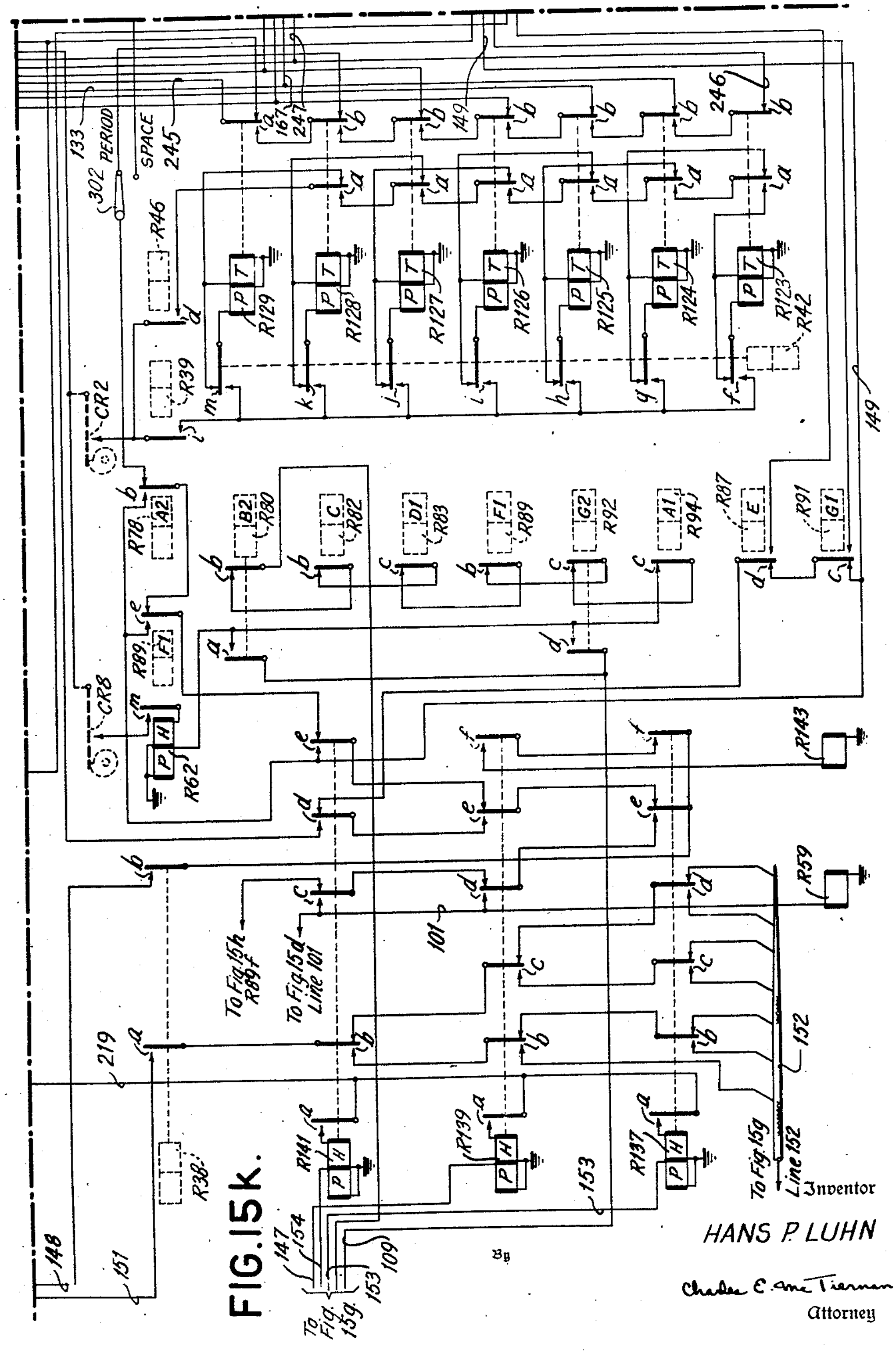
Figure 15M:
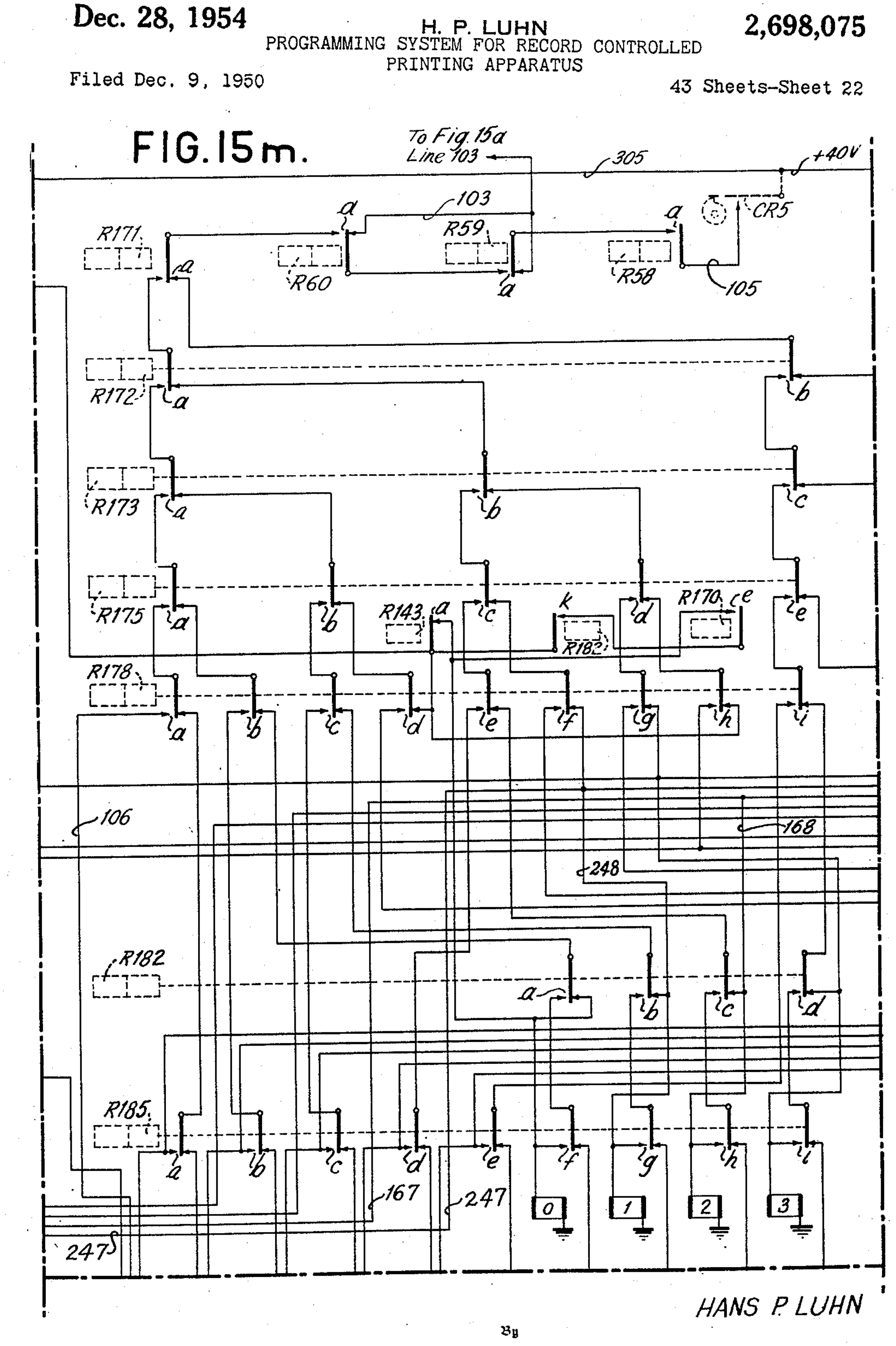
Figure 15N:
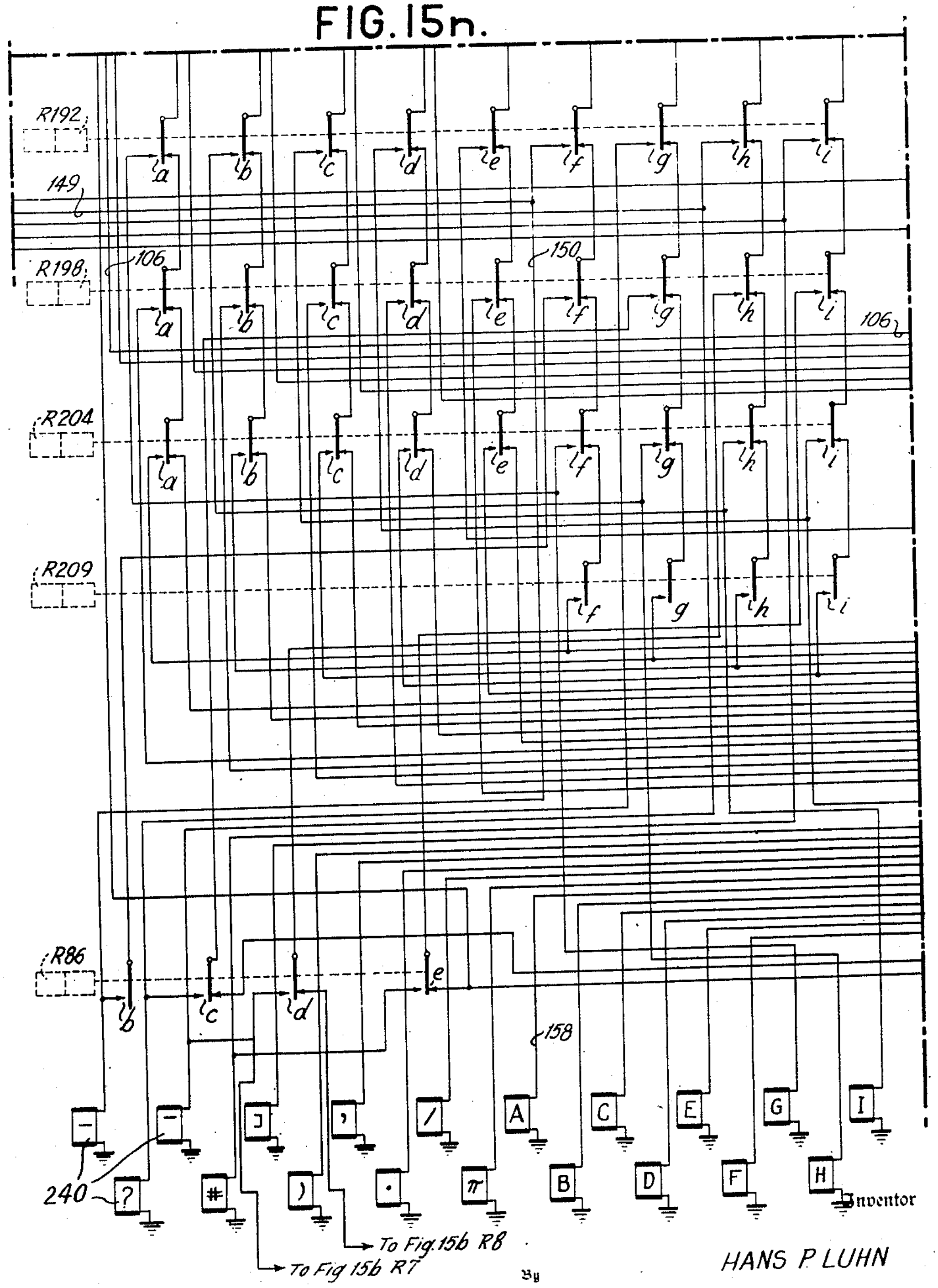
Figure 15O:
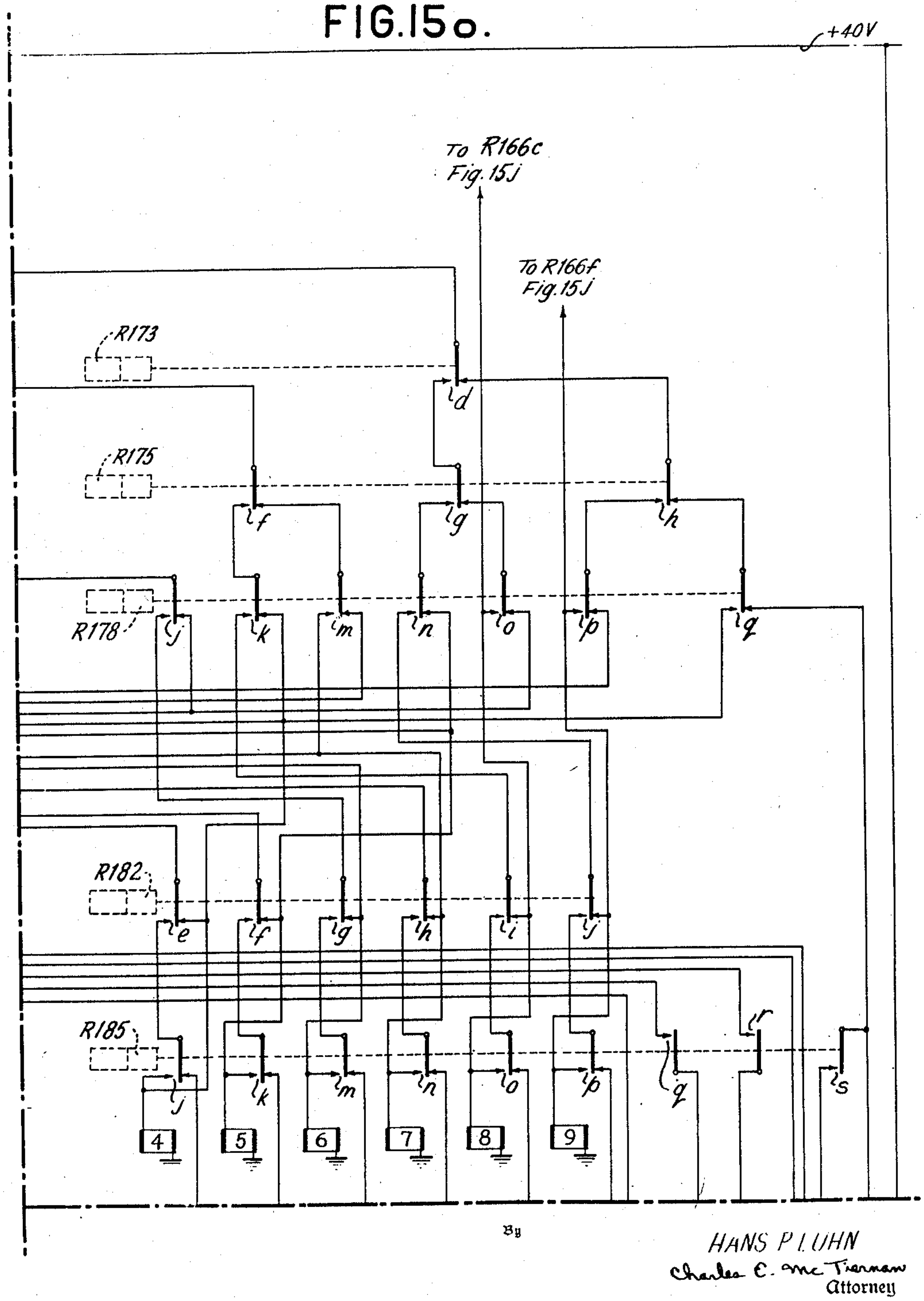
Figure 15P:
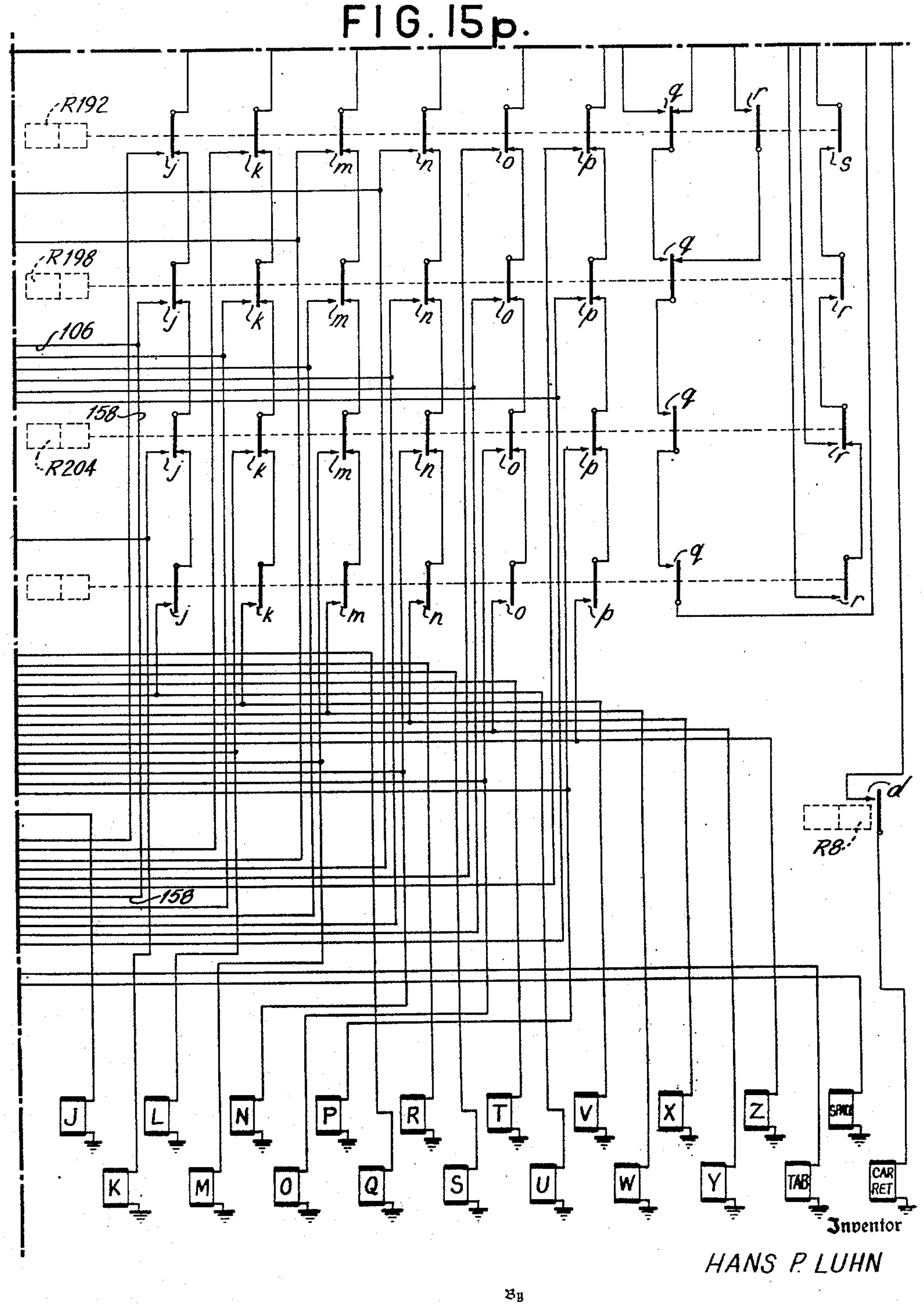
Figure 15Q:
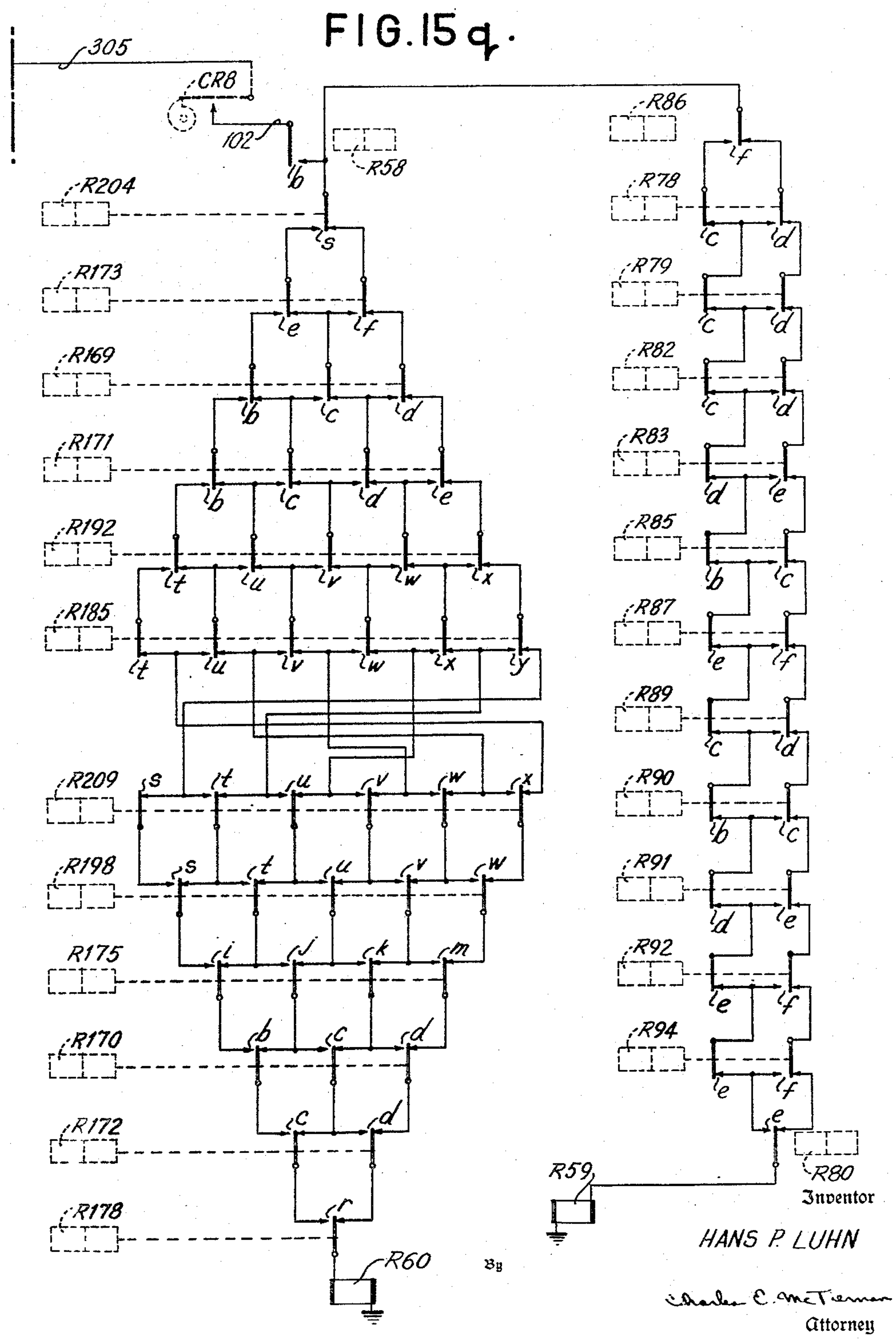

Fig. 15 is illustrative of the layout of Figs. 15*a* to 15*q* in order to constitute a wiring diagram of the electrical circuits of the system.

Figs. 16–28 represent the several series and subseries groupings of a new and novel coding arrangement.

Figures 29, 30:
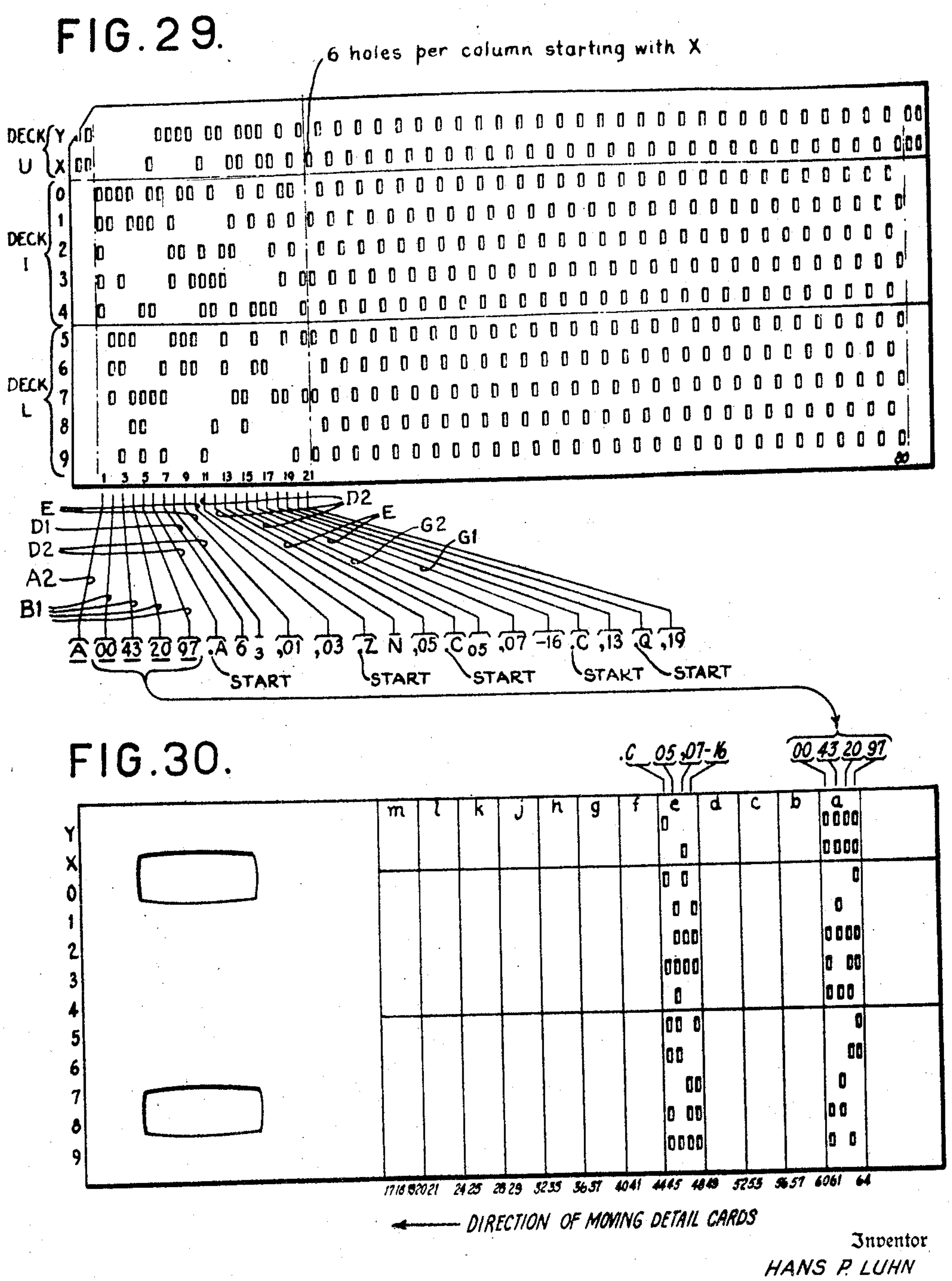

Fig. 29 is a detail card bearing data pursuant to the new and novel coding arrangement.

Fig. 30 is a master card which is to be used in conjunction with the new coding arrangement.

Fig. 31 is a chart summarizing the several groupings.

Fig. 32 is a detail card bearing data pursuant to the new coding arrangement.

Fig. 33*a* to Fig. 33*g* constitute a timing diagram showing the operation of the machine during a particular problem.

Figs. 34 to 37 illustrate a modification of the coding arrangement which is directed towards the form of tabular notations.

In order that the invention described herein may be fully appreciated and understood a description of the novel coding arrangement employed therewith will first be described.

The record card is shown and described in copending application Serial No. 153,197, filed March 31, 1950, wherein the novel features thereof are claimed.

The record card in which statistical or other reference data are to be recorded, in accordance with the present invention, takes the form of the well known IBM machine controlling record card, which is provided as shown in Fig. 29 with the usual 80 vertical columns of punching or recording positions, each of which columns contains twelve so-called index point positions designated Y, X, 0, 1, 2, 3, 4, 5, 6, 7, 8, 9. For purposes of the present invention, the card is subdivided into three so-called decks, of which the upper deck U includes the Y and X positions, the intermediate deck I includes the 0 to 4 positions, and the lower deck L includes the remaining positions 5 to 9.

Data are recorded in the card columns by utilization of a code in which combinations of five holes distributed among the twelve possible recording positions in each column are grouped, to provide an arrangement that is more suitable for interpretation, and will enable the recording of more data in a given length of record card, i. e., a given number of card columns, than has heretofore been accomplished. This is effected by distributing the 792 possible five hole combinations in what may be designated as index, major and minor series, which are broadly distinguishable in that the index series contains no perforations in deck U; the major series contains a perforation in either the X or Y position in deck U; and the minor series has perforations in both the X and Y positions of deck U.

*Index series*

The several five-hole combinations included in the index series are represented in Figs. 16, 17, 18 and 19 from which, it will be noted, that this series is subdivided into what may be termed subseries A1, A2, B1 and B2.

Figure 16:
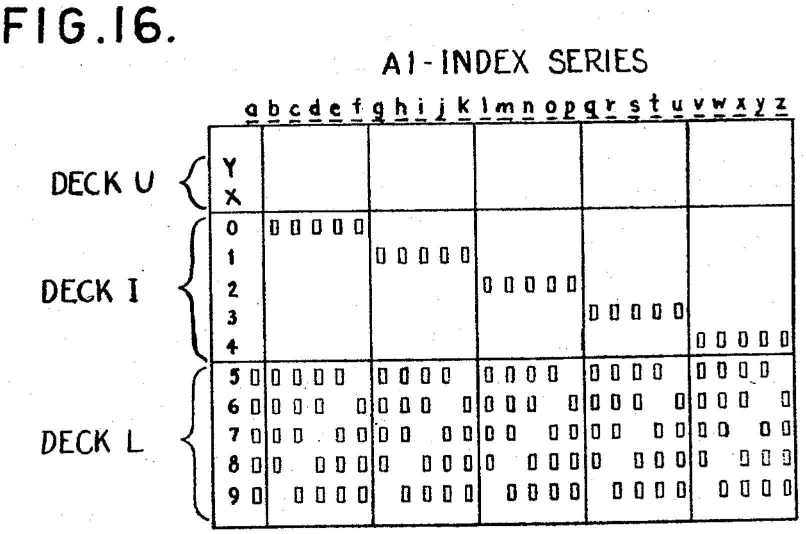

*Index series A1.*—Referring particularly to Fig. 16, this subseries comprises five-hole combinations wherein four holes are grouped in deck L and the fifth hole lies in deck I, and also the special case where all five holes or designations lie in deck L. These different combinations of which there are twenty-six may have assigned to them designations such as indicated along the top edge of the record to identify them as, for example, lower case letters as further distinguished by an underscoring mark.

It will be noted that in this subseries the hole arrangement in the lower deck L with the exception of the arrangement of all five holes being in the L deck repeats for each successive group of five letters, and that the location of the hole in deck I will identify to which section of the alphabet the lower group relates.

It is to be noted that in Fig. 16 and other coding diagrams that the recording columns are spaced apart a greater distance than they would occur on the record card. This is done to enable easier identification of the combinations occurring in the various columns.

Figure 17:
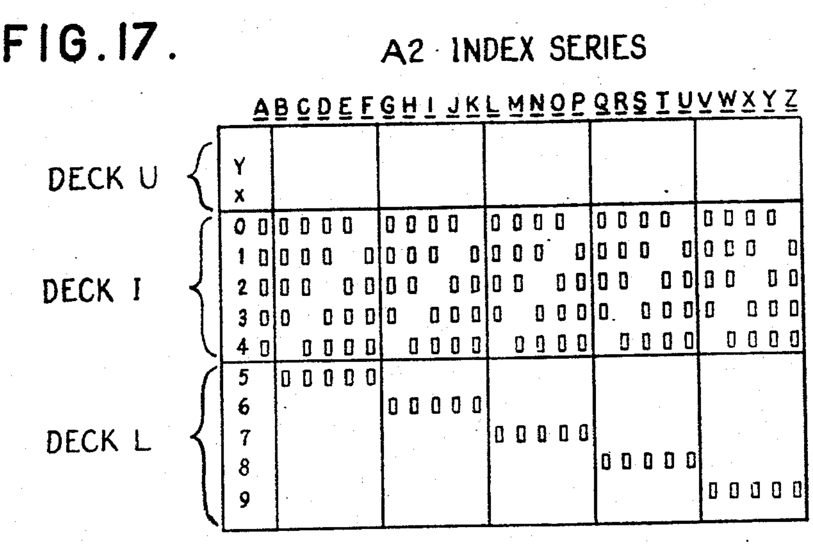

*Index series A2.*—In Fig. 17 are grouped all the five-hole combinations wherein five or four of the positions occur in the intermediate deck I and the remaining designation occurs in deck L. This provides a group of 26 different characters to which may be assigned another set of characters as indicated along the upper edge of the record, and may relate to upper case letters of the alphabet accompanied by an underscoring mark.

A comparison of the coding in Figs. 16 and 17 will show the facility with which a designated character may be identified in the present arrangement. Taking any of the combinations illustrated, the absence of perforations in deck U, identifies it as being in the index series, the grouping of either four or five holes in a single one of the decks identifies it as an alphabetic character. The location of these four or five holes in deck I would identify it as an upper case letter, while if the four or five holes occur in deck L it would be identified as a lower case letter.

It is to be particularly noted that the distinction between the subseries A1 and A2 lies in the fact that there is a transposition of decks, i. e. deck L of Fig. 16 is the same as deck I in Fig. 17, and similarly deck I of Fig. 16 is the same as deck L of Fig. 17.

Figure 18:
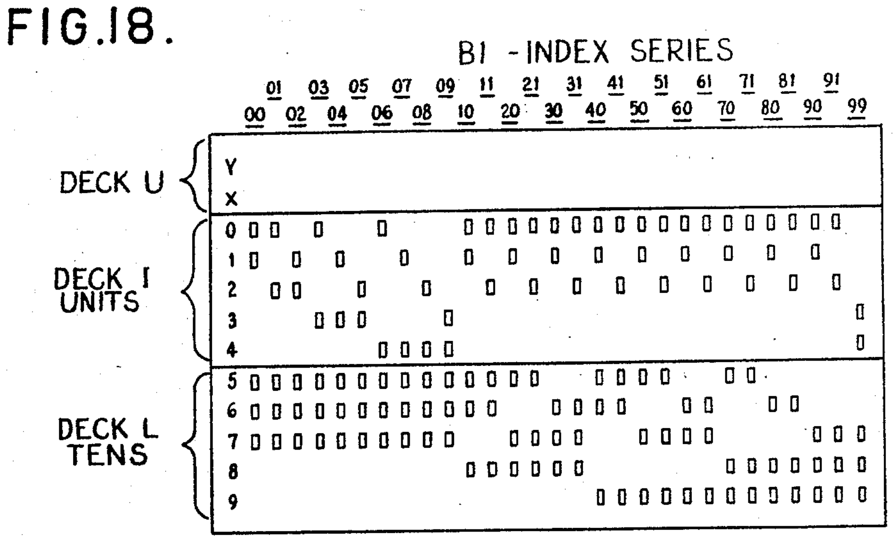

*Index series B1.*—In Fig. 18 it is shown how all the combinations, wherein three holes lie in deck L and two holes lie in deck I, are utilized to represent a hundred different things which for convenience are identified along the top edge of the record as 2-place numerals accompanied by an underscoring mark. In addition thereto, the two numerals are represented in a single column as a 2-place number with the tens digit identified by the three-hole combination in deck L and the units digit by the two-hole combination deck I. This arrangement might be termed a combination within a combination in that the units digits within deck I are represented in the form of a two-hole combination, that is, by perforations in various pairs of the possible five positions in this deck, while in deck L the tens digit are represented by perforations in three of the possible five-hole locations.

*Index series B2.*—This series (Fig. 19) provides a further arrangement utilizing all the five-hole combinations numbering 100, in which three of the five designations occur in deck I while the remaining two occur in deck L. Each combinational arrangement is identifiable as a 2-place number followed by the number sign #, the three-hole combinations in deck I identify the tens digit of the 2-place numbers, while the two-hole combinations in deck L identify the units digit.

Figure 19:
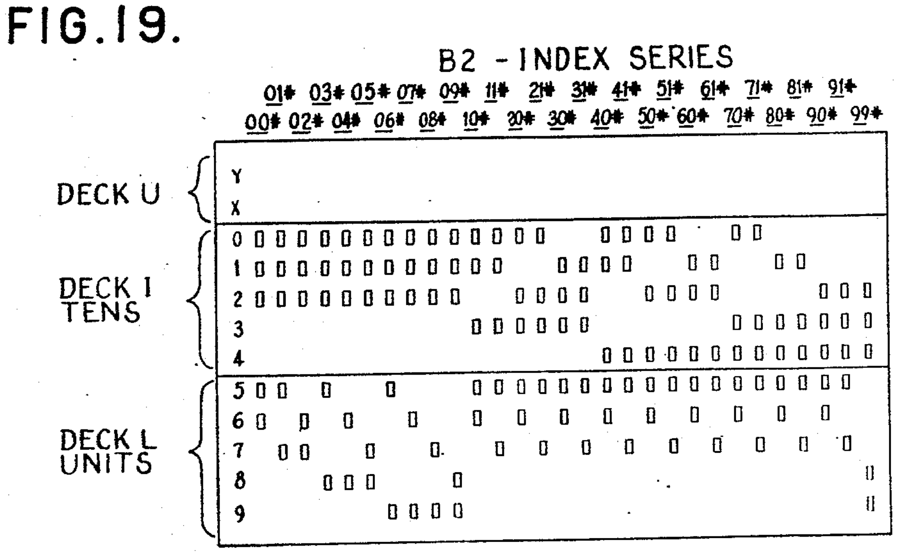
Figure 20:
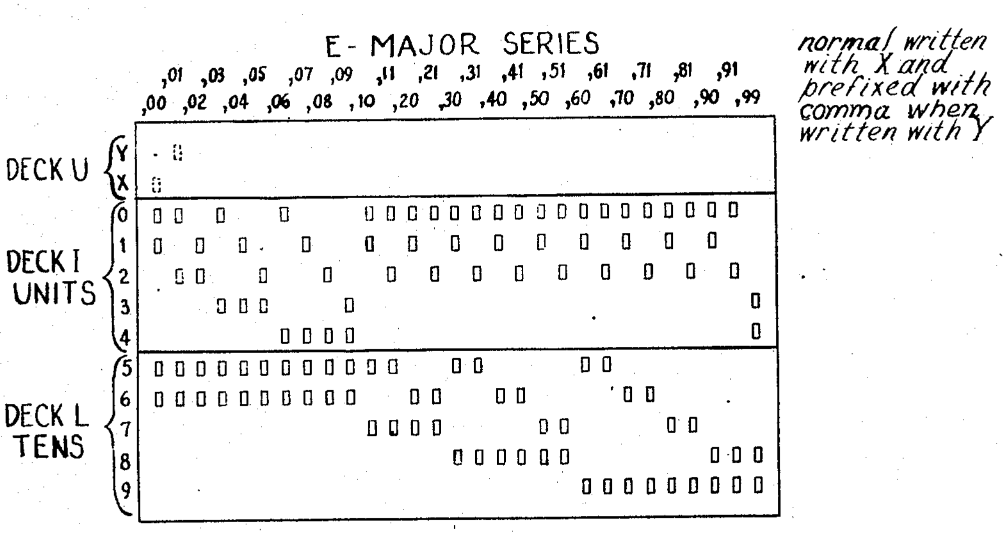
Figure 21:
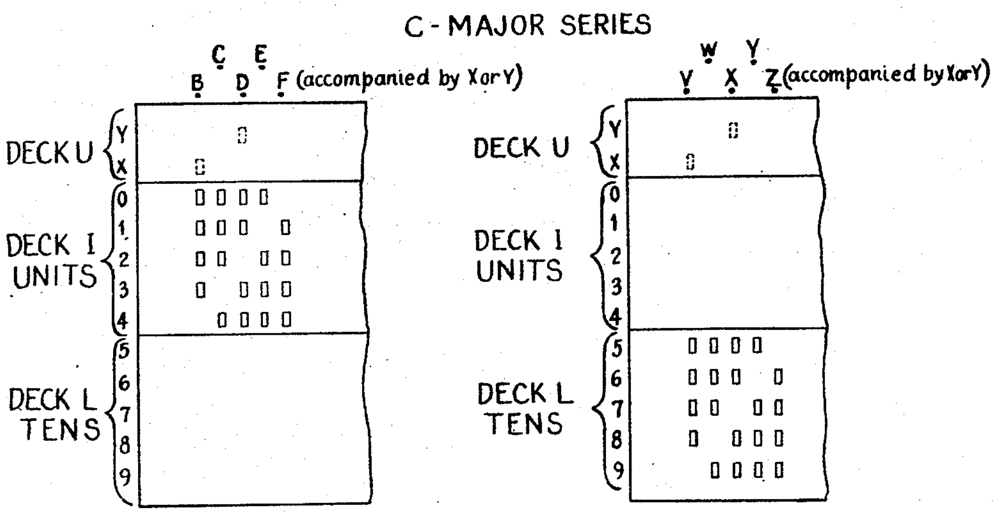

Comparison between Figs. 18 and 19 shows the identity of deck L in Fig. 18 with deck I in Fig. 19 and also the identity between deck I in Fig. 18 and deck L in Fig. 19.

Considering the four subseries of this index series, its distinctive characteristics may be summarized as follows:

(1) Absence of perforations in deck U identifies it as the index series.

(2) A group of four or five holes in either of the two lower fields identifies it as an alphabetic series A1 or A2.

(3) The location of the four-hole group identifies it as a lower case series A1 if occurring in deck L and as an upper case series A2 if occurring in deck I.

(4) The grouping of the perforations with three in either of the two lower decks will identify the subseries as B1 or B2 and the three-hole grouping will identify the tens digit of the 2-place number in both cases.

(5) If the tens digit is in the lower deck L, it identifies the series B1 and if the tens digit occurs in deck I it identifies the series as B2.

It is to be particularly noted that the B1 and B2 series provide for recording two digits in a single column with each digit in a predetermined deck and with the units and tens digits distinguishable by their separate subcombinational characteristics within their related decks.

Referring to Fig. 29 in which a record card is shown with perforations in accordance with the coding described, inspection will shown that columns 1 to 5 contain perforations made in accordance with the index series to represent A 00 43 20 97. Inspection will show that the letter A is identifiable as belonging to the A2 series and all the digits are related to the B1 series in accordance with the rules of identification set forth hereinabove.

*Major series*

Figs. 20, 21, 22, 23 and 24 illustrate the groupings of those five-hole combinations that include a single hole in either the X or Y positions of deck U. The presence of an X hole identifies the character as one constituting the beginning of a word, term or expression, that is the beginning of a series of characters that are to be taken together to represent some value or quantity. The presence of a Y hole indicates that the combination represents the character within the word, term or expression. This may be made more clear after the coding arrangement for this series has been explained in detail.

*Major series E.*—This series (Fig. 20) comprises those five-hole combinations in which one hole occurs in the deck U and two each in decks I and L. There are 100 such combinations including the X hole and another hundred including the Y hole, and in the former set the designations are represented as 2-place numbers while in the latter set the designations are represented as 2-place numbers prefixed by a comma. The two sets also differ inasmuch as that, where the X index position is perforated, the combination represents the 2-place number and also represents that it is the first character of a word, term or expression. In the combination where the Y hole occurs, it represents a 2-place number prefixed by a comma and also that it is a part of the word, term or expression other than the first character or symbol thereof. In this series also the two digits of the number represented in any column comprise the units digit in deck I and the tens digit in deck L. The units digit is represented by a two-hole combination within the five positions of deck I and the tens digit is represented by the identical two-hole combination within the five holes of deck L, so that the tens digit is identified by its location in the lower deck and therein differs from the identification of the tens digit in the index series B1 and B2, where the tens digit is identified by virtue of its representation as a three-hole combination in one of the lower decks.

*Major series C.*—In this series (Fig. 21) are included all the five-hole combinations of which one hole occurs in the deck U and the remaining four in deck I, as well as all the five-hole combinations, of which one hole occurs in deck U and the remaining four in deck L. Such combinations are identified as under-dot alphabetical characters.

Figure 22:
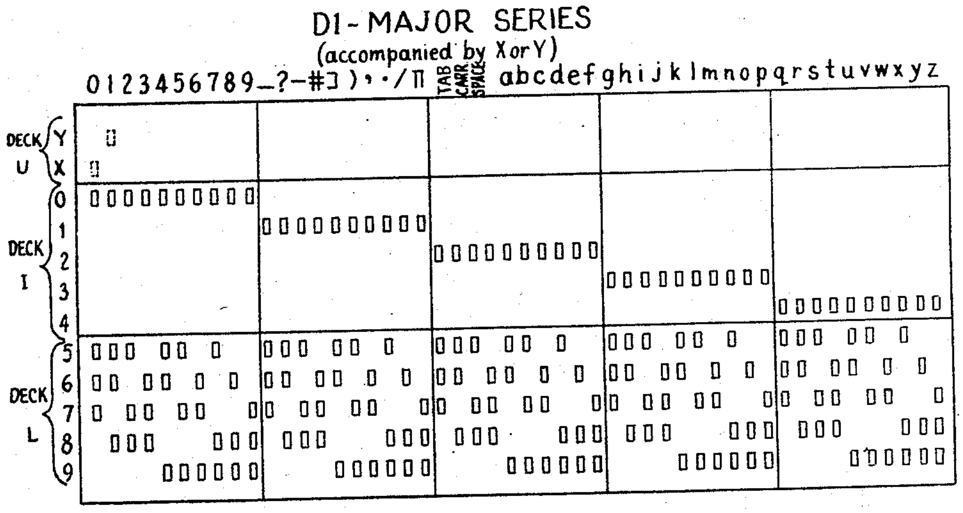

*Major series D1.*—In this series are grouped all the five hole combinations, wherein one hole occurs in each of the two upper decks and the remaining three occur in the lowermost deck L, and to each different combination there is assigned a character or symbol as indicated in Fig. 22 which includes numerals, lower case letters and the more common symbols occurring on the keys of well known typewriters.

Figure 23:
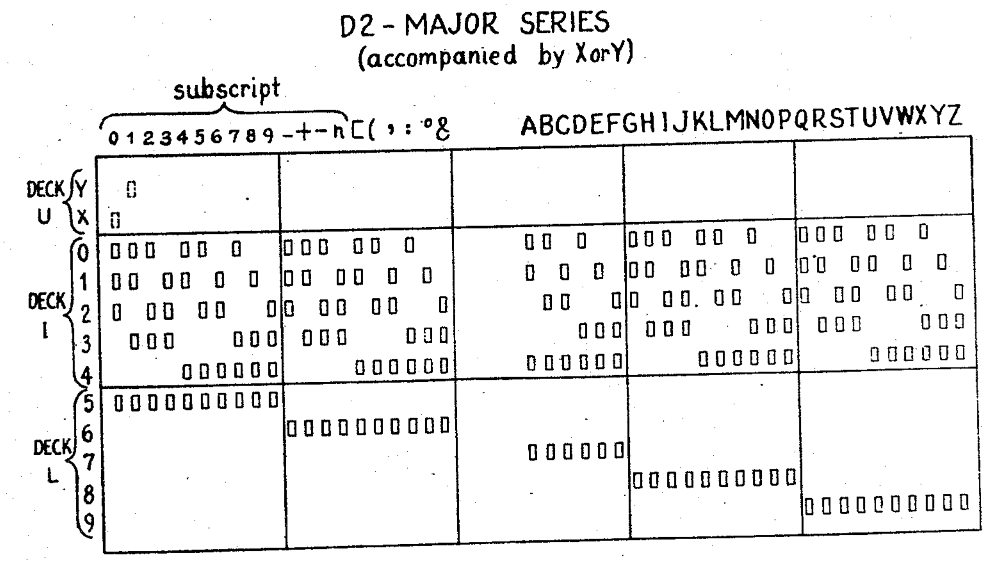

*Major series D2.*—Referring to Fig. 23 in this grouping are all the five-hole combinations in which one hole occurs in deck U, one hole in deck L and the remaining three in deck I. This arrangement is the same as that of Fig. 22 with transposition of the decks I and L and with characters allocated to the different combinations as shown along the top margin of the record of Fig. 23.

*Major series D3.*—Referring to Fig. 24, this arrangement is the same as that of Fig. 23 with the characters allocated to the different combinations shown along the top margin of the record of Fig. 24. Such combinations are identified as symbols for superscript purposes.

Briefly reviewing the coding arrangement for this major series, its identity is determined as mentioned hereinabove by the presence of a hole in the X or Y position.

The subseries C is readily identifiable by the four-hole arrangement within decks I and L, respectively; the E series is identifiable by the split-up of the remaining four holes with the two in each of the lower decks, and the D1, D2 and D3 series are identifiable respectively by the presence of three-hole combinations in the lower and intermediate decks, respectively.

Referring to the record card (Fig. 29), the example shown therein indicates in column 6 of the card an X perforation identifying this as a start of a word or expression and constituting part of the five-hole combination representing the upper case letter A. The designations in columns 7, 8, 9 and 10 of the card indicate that these characters are part of the expression beginning with the character identified in column 6 of the card, and examination will show that perforations in column 7 represent the numeral 6 of the subseries D1, the perforations in column 8 represent the subscript 3 from the subseries D2, the perforations in column 9 represent the identification ,01 from series E, and the perforations in column 10 represent the character ,03 also in the E series. In column 11 the combination again occurs with the X hole, indicating that this is the first character of another term or expression, and the combination corresponds to the character Z from series D2.

Column 12 has the Y hole indicating the continuity of the expression, and the five-hole combination in this column represents the letter N also from the series D2.

*Minor series*

This series is identifiable as such by the presence of a hole or designation in both of the index point positions X and Y of the upper deck U, and this series is broken down into the four subseries designated F1, F2, G1, G2 whose combination arrangements are shown in Figs. 25 to 28.

Figure 25:
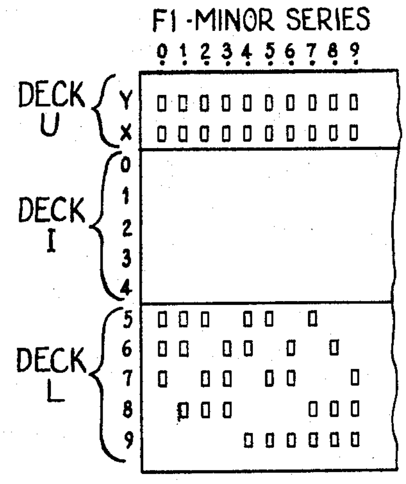
Figure 26:
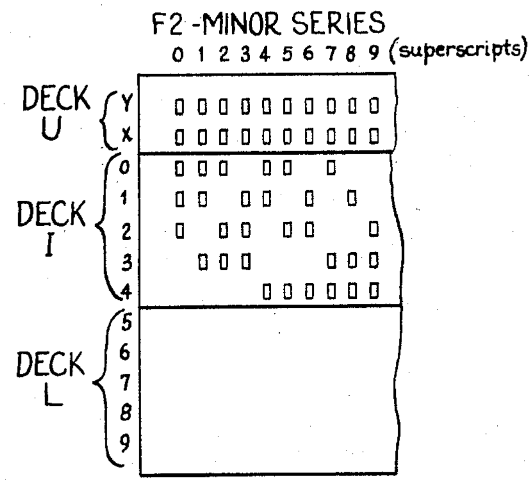

*Minor series F1.*—This series comprises those five hole combinations where three of the holes will occur in deck L in addition to the two holes in the U deck. There are ten of these and they are identified as the ten digits accompanied by an under-dot mark as indicated in Fig. 25.

*Minor series F2.*—This grouping (Fig. 26) comprises those combinations where the three holes occur in deck I, and these are designated as digits 0 to 9 employed for superscript purposes.

*Minor series G1.*—In this series (Fig. 27) the three holes are arranged with two in deck I and one in deck L to provide 50 different combinations identifiable by fifty 2-place numbers prefxed with a hypen, of which the units digit is the two-hole combination in deck I and the tens digit is the single hole in deck L.

*Minor series G2.*—Finally, the combinations of five holes in which the three holes not included in deck U are distributed with two in deck L and one in deck I to constitute 50 more combinations identified as fifty 2-place numbers for subscript purposes. This G2 subseries is the same as G1 with the decks I and L transposed, maintaining the units digits of the 2-place numbers identifiable by the two-hole combination and the tens digit by the single hole.

Referring to Fig. 31, distribution of all the 792 five-hole combinations possible in a 12-position record column is briefly summarized to show ready identification of any particular combination. Thus, for example, the combination containing two holes in deck U, one hole in deck I and two in deck L constitutes a combination in the G2 subseries. The combination containing no holes in deck U, two holes in deck I and three in deck L constitutes the combination of the subseries B2 and so on.

Referring again to Fig. 29, it is noted that the perforations in column 14 constitute the first character of an expression as denoted by the presence of an X perforation while in column 15 are perforations identifiable as in the minor series G1, representing the subscript 05. The presence of the Y perforation in this combination also serves to identify this as part of the continuous expression commencing with the X hole in column 14 and continuing through to column 17 where another coding in the minor series identifiable as G1 indicates the value or reference —16. Column 18 represents the start of a new expression. The several columns of perforations are readily identifiable as to code and subcode in accordance with the detailed explanation given hereinabove.

*The master card*

The master card is shown in Fig. 30. This card is to be provided with perforations representing information to be searched for in a group of record cards and, after it has been perforated, it is placed in the photoelectric scanning device of the scanning machine as described and claimed in the copending application Serial No. 153,197 where it is held while the record cards are moved across its surface in successive order, the movement being in the direction of the length of the cards.

Figure 27:
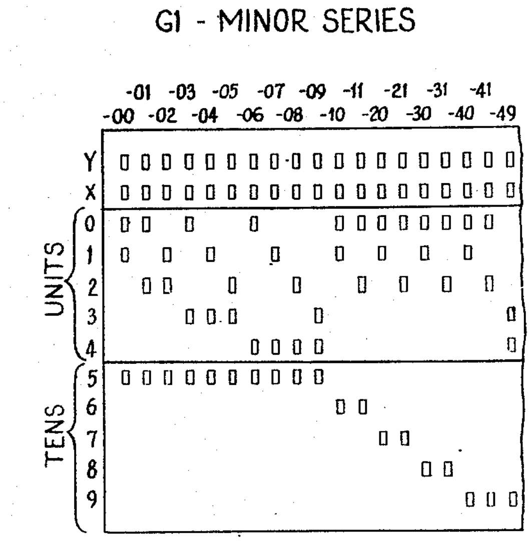
Figure 28:
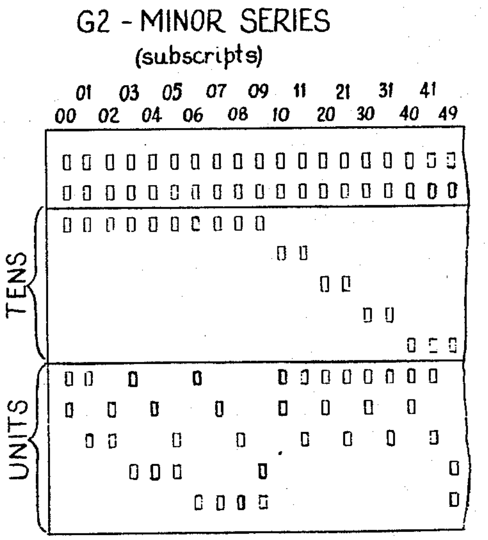

For the purpose of the present invention, the master card has the same dimensional outline as the record cards and is provided with twelve fields, each comprising four columns, numbered from 17 to 64 as shown. Where particular data are to be searched for, a field of the master card is perforated to provide a complementary or inverse pattern of the punching as it would appear on the record card. This is illustrated in Fig. 27 where the first or right hand field is perforated to search for the value 00 43 20 97.

Comparison between perforations in this field and perforations in columns 2, 3, 4 and 5 of Fig. 29 will show this complementary or inverse punching relationship. Expressed in another manner, where an index point position in a column of the record card contains a perforation, the master card remains unperforated in such position, and conversely where an index point position in the record card is imperforate, the corresponding position in the master card contains a hole.

Assume now that the card of Fig. 29 is aligned vertically with the card of Fig. 30 and the record card is moved toward the left across the face of the master card. When columns 2, 3, 4 and 5 of the record card arrive in alignment with columns 61, 62, 63 and 64 of the master card, there will occur what is hereinafter termed a "blackout" condition, which will occur only when the two sets of four columns of the pair of cards are directly superimposed, so that in all index point positions in this field there is present an imperforate portion of either one or the other card.

As is more fully explained in my copending application Serial No. 153,197, a light source is provided on one side of the superimposed cards and a light responsive device on the opposite side and, when the blackout condition occurs, the light is cut off from the light responsive device. This serves as an indication that the value set up on the master card has been discovered in the record card.

*Tabular coding arrangement*

A modification of the scanning code previously described is the tabular notation system of representation where a single concept is represented by the presence of a single hole within a column of a defined field in a detail card.

In this tabular notation arrangement, the table as punched in a detail card represents a plurality of characteristics in accordance with a prearranged key on table index where each characteristic is represented in the card by the presence of a single hole. To punch a table of this sort, the indexer will refer to a table index chart which will list a multitude of characteristics in column and index point position form of a standard record card in order to determine the position that the wanted characteristics should be punched in a detail card.

In Fig. 34 there is a table index chart, identified as Table 97#, listing the States and two of the possessions of the United States which comprise possible locations of branch offices of a particular business organization. The position of each State or possession in the chart corresponds to a particular column and index position within a record card.

Now let it be assumed that the business organization concerned has branch offices in the States of California, Florida, Idaho, Iowa, Maine, Missouri, New York, North Carolina, Ohio, Pennsylvania, Rhode Island and South Carolina and that it is desired that these locations be punched in a detail card. The indexer on observing that California occupies the "3" index position in column 1 of the chart of Fig. 34 would indicate that State in the detail card by punching all unwanted positions by the wanted position "3" as shown in Fig. 25. In like manner the remaining branch offices would be punched in the detail card. It should be noted from Fig. 35 that the coding arrangement of the tabular notation system deviates from the previously described rule that there be a fixed number of holes in each column of the detail card. In fact in this tabular notation system the number of holes in each column of the detail card is limited only by the number of index positions in a card. The geographical locations of branch offices of other business organizations would be punched in a similar manner in separate cards.

In order that the tabular notation system of coding be differentiated from the coding notations for terms or expressions, as previously described, it is necessary that the U deck of the detail card of Fig. 35 have punched therein a distinguishing pattern different from that pattern which will indicate the presence of a term or expression. The distinguishing pattern of the U deck which sets aside the tabular notation coding system from the other coding arrangements is that the first column of the table proper is punched with at least a hole in the Y position followed by holes in the X and Y position of the remaining columns of the table. When only the Y position of the first column of the table is punched as in Fig. 35 it signifies that during the scanning operation a matching condition will be detected when the photocells of the individual compartments are blocked off from the source of light.

In transferring the data from the index chart to the detail card it is also necessary to punch the chart index number within the detail card. The index number of the chart of Fig. 35 is 97# which is punched in the detail card by resorting to the code representation of the sub-series B2 of the Index series (see Fig. 19).

When a search is to be made to select all those organizations having branch offices in California, Iowa, Missoui and Rhode Island, the indexer by referring to the index chart of Fig. 34 would observe the position of these States and then punch the master card in the corresponding positions as shown in Fig. 36. The master card in the index column and the U deck is punched complementary to that hole pattern of the detail card. With regard to the hole pattern of the U deck of the master card, it is pointed out since this tabular coding arrangement permits the creation of several classes of tables as distinguished by the number of columns occupied that the master card must contain a perforation in the Y position of the next following column to the right of the table proper so as to produce a mismatch except when the number of table columns agree. In the table proper it is not necessary that the master card be punched in all positions inasmuch as the condition of the master card in the index column and the U deck are ample safeguards against accidental matching of other questions.

The master card of Fig. 36 upon being compared with the detail card of Fig. 35 will cause the photocells of the compartments concerned to be blocked off thereby indicating a matching condition and causing the card to be deposited in the selected card pocket. A matching between the detail card and master card will only exist when the master card favorably compares with the detail card as far as the four States sought for are concerned.

In the tabular coding arrangement, when the U deck of the detail card has a hole punched in the Y position of the first column of the table proper it signifies that a matching condition will be indicated whenever a black-out of the photocell concerned occurs. When the U deck of the detail card has a hole punched in the X and Y position of the first column of the table proper it indicates that a matching condition will be encountered whenever the photocell concerned is not blocked off from the light source.

In Fig. 37 there is shown in exaggerated diagrammatic form a detail card having superimposed thereon a master card. The holes punched in the detail card are represented by the solid rectangle while the holes punched in the master card are represented by the open rectangles.

The data punched in the detail card represent the same data punched in the detail card of Fig. 35. The twelve States which are represented in Fig. 35 by complementary punching are represented in the detail card of Fig. 37 by punching each State in a position corresponding to the index position of the State in the chart of Fig. 34.

The information sought for from the detail card of Fig. 37 is the same as that sought for from the detail card of Fig. 35 and the questions seeking such data are punched in the master card by punching the corresponding positions that the four States occupy in the index table of Fig. 34. Thus the four question holes of the master card that are directed toward the table proper will overlap the corresponding holes in the detail card thereby permitting the source of light to impinge upon the proper photocell and indicating a matching condition.

While the columns of the table proper operate upon the principle that whenever a light is impinging upon the photocell associated with that portion of the master card directed towards the table proper a matching condition occurs, the index column, and the column following the last column of the table still operate upon the principle that a matching condition occurs only when the photocell associated with each of said columns is blocked out.

The five-hole and tabular coding arrangements just described are to be read in the machine forming the basis of this invention to cause it to print the interpretation of the codified data in the cards.

*Record sensing unit*

The record sensing unit 20 comprises a card carriage and a means for successively feeding detail record cards or master record cards, as the case may be, into the carriage. When operating, the card carriage is moved along step-by-step to sense successively the record columns of the card in the carriage. A card sensing means is provided to sense record columns in the card as the card carriage is stepped along. The structural details of the record sensing unit will now be described.

Figure 1:
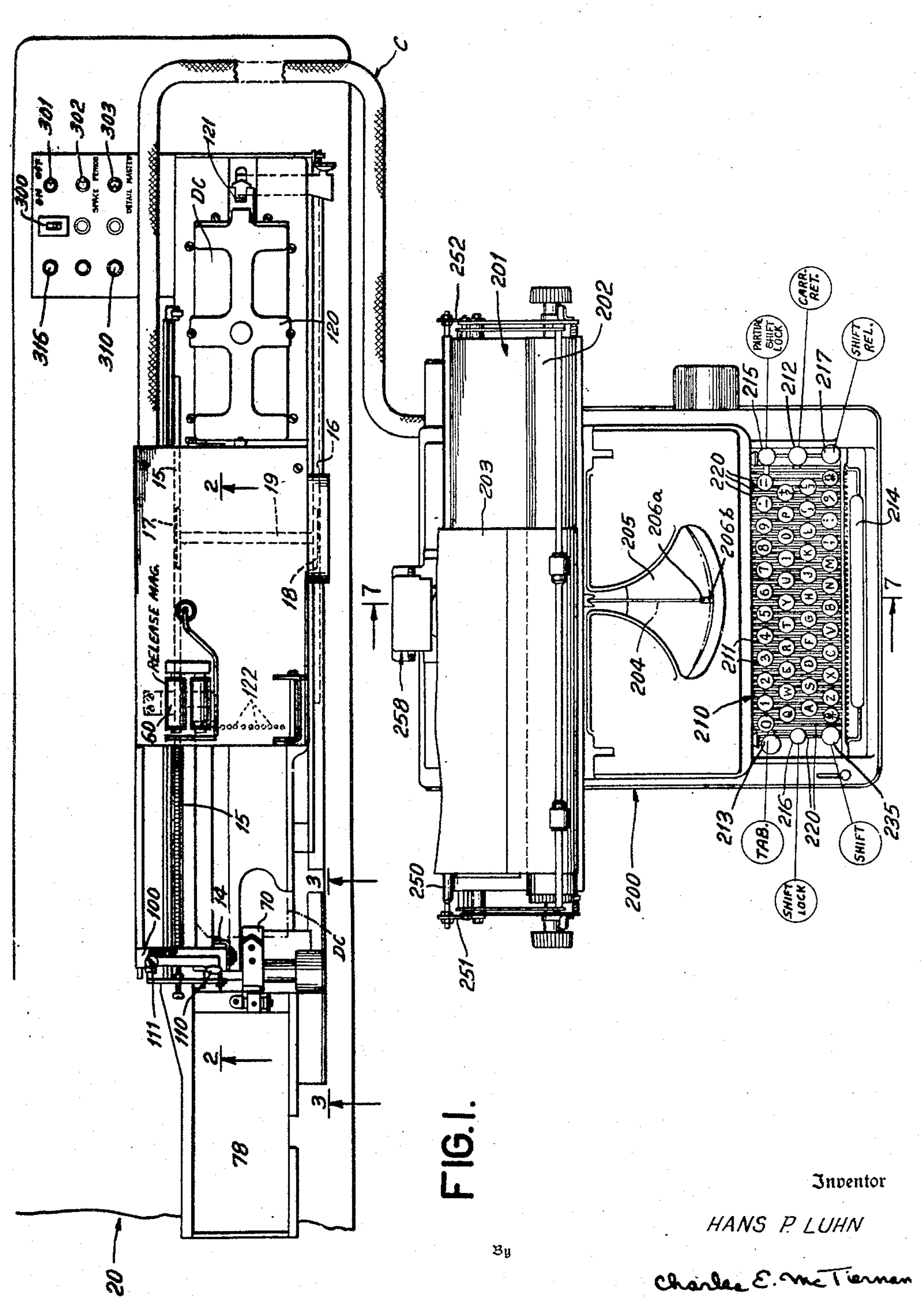
Fig. 1 is a plan view showing the record controlled printing apparatus constructed in accordance with the present invention.
Figure 2:
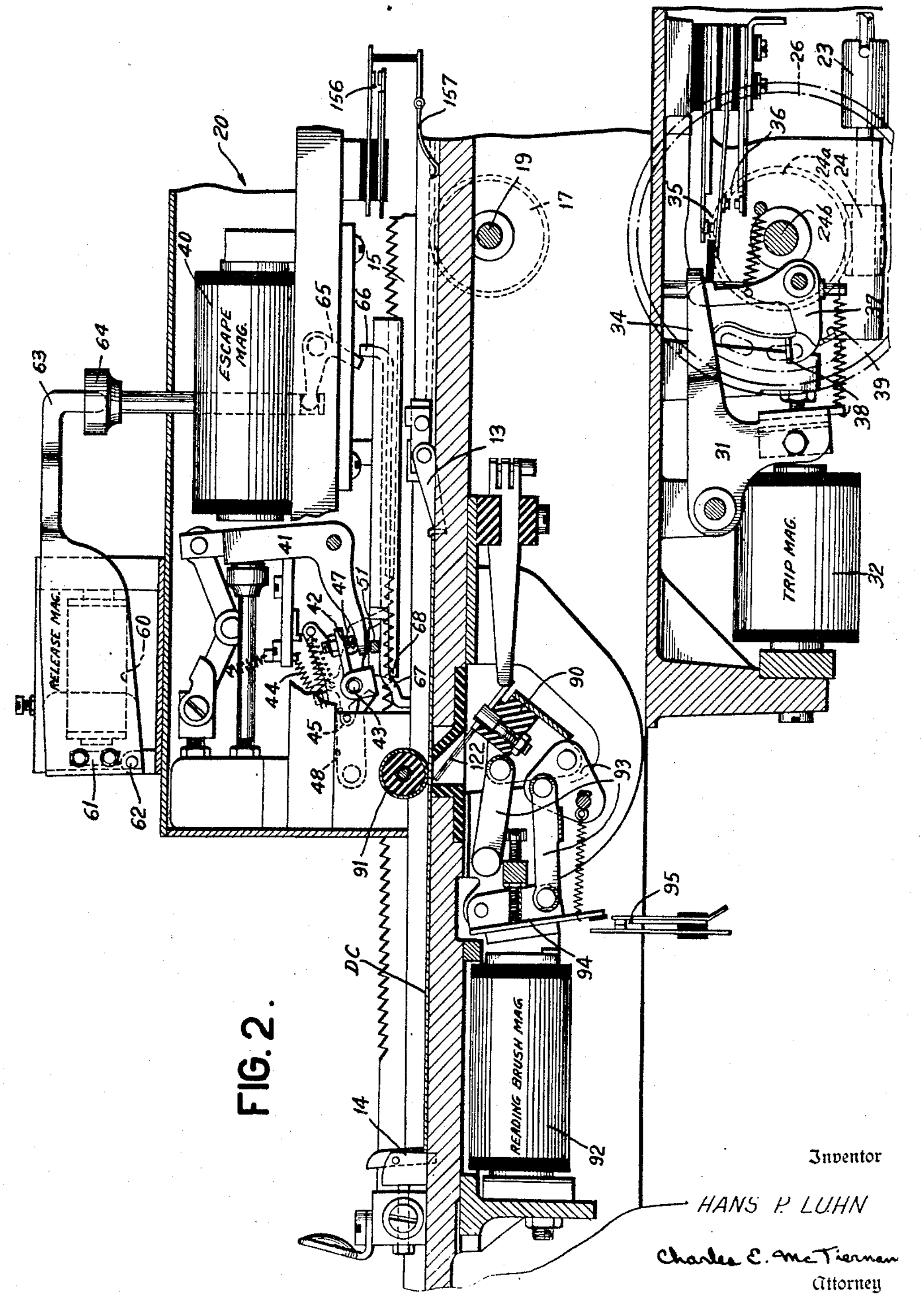
Fig. 2 is a fragmentary vertical section taken along the lines 2—2 of Fig. 1, this section being taken through the record card sensing mechanism.

*Card feeding means.*—Referring to Fig. 1, the detail record cards DC or master cards MC, whichever the case may be, to be sensed or analyzed are placed in a magazine designated 120 from which they are advanced singly by means of a picker 121 toward the left to present their first record column to a card sensing position above the card sensing brushes designated 122 (also see Fig. 2). In this position, the reciprocable card carriage comprising a pusher 13 (Fig. 2) and a forward guide 14 engages the card and advances it, step-by-step, under control of the escapement mechanism to be described later. Pusher 13 and guide 14 are carried by an escapement rack 15 which also forms a part of the card carriage, and the picker knife 121 is carried by a rack bar 16. Rack 15 has a gear 17 meshing with its lower edge (see Fig. 2) and rack bar 16 has a gear 18 (see Fig. 4) meshing with its upper edge, both gears being mounted on a cross shaft 19 (see Fig. 1). Due to this connection between the elements, the movement of rack bar 16 and picker 121 toward the left, as viewed in Fig. 1, is accompanied by movement to the right of rack 15, pusher 13, and forward guide 14. At the commencement of a card feeding operation, the picker 121 and pusher 13 are in positions as shown in Fig. 1.

The operation of card feeding just outlined is more fully explained in U. S. Patent No. 1,772,186 granted to F. L. Lee et al. for a duplicating punching machine. The escapement mechanism referred to herein is of the same general nature as that disclosed in the Schaff Patent No. 1,426,223 and a brief description thereof will be given later.

Figures 3, 4, 5:
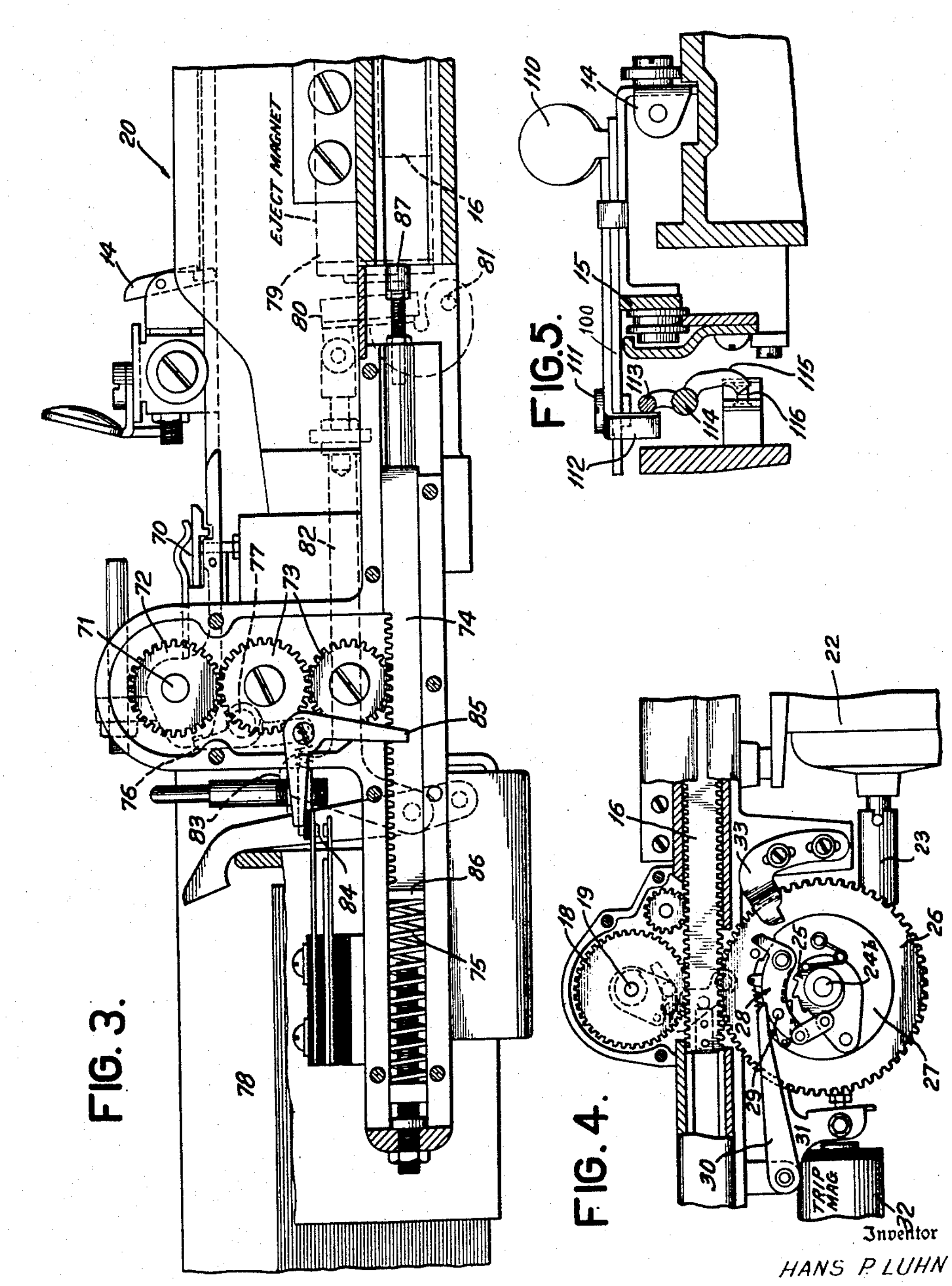
Fig. 3 is a fragmentary vertical section taken along the lines 3—3 of Fig. 1, and showing the card ejecting mechanism at the left hand end of the sensing unit.
Fig. 4 is a fragmentary vertical section showing the details of the clutch mechanism and the related drive motor for effecting the return of the card carriage.
Fig. 5 is a fragmentary detail view showing the cut-out control device of the card feeding mechanism.

Secured to the under side of the base of the machine is a motor 22 (Fig. 4) coupled to a stub shaft 23 (see Fig. 2), to which is secured a worm 24 in mesh with a worm wheel **24*a* secured to a shaft 24*b*, one end of which has secured thereto a ratchet-shaped clutch element 25. Loosely mounted on shaft 24*b* is a gear 26 meshing with teeth on the lower edge of rack bar 16 and on which gear is mounted a disk 27 (Fig. 4). Mounted upon disk 27 is a clutch mechanism generally designated by the reference character 28, one element of which is provided with a pin 29 positioned for engagement by a finger 30 integral with the armature 31 of a trip magnet 32. With the machine at rest, the parts occupy the position shown in Fig. 4 and, when magnet 32 is energized, the finger 30 will operate the clutching mechanism to couple the disk 27 to the rotating ratchet 24, so that the disk 27 and gear 26 are rotated counterclockwise to drive the rack bar 16 toward the left. The clutching mechanism 28 is constructed, as explained in greater detail in the patents referred to, so as to remain in engagement for substantially a complete revolution, at the completion of which time the clutching mechanism engages a fixed member 33, which effects uncoupling of the parts, whereby they may automatically return to the position shown in Fig. 4 under the influence of a spring (not shown). This power drive of rack bar 16** toward the left has the same effect as the manual movement thereof explained in said U. S. Patent No. 1,772,186, that is, a detail card DC will be advanced to sensing position and the pusher 13 will engage the same for further step-by-step advancement, and rack bar 16 may thereafter return to its home position without disturbing the advanced position of the card or pusher 13, this being permitted by the one-way clutch structure 28.

Also integral with the armature 31 of the trip magnet 32 is an arm 34 (see Fig. 2), the free end of which is adapted to bear upon the center blade of pairs of latch contacts 35 and 36 to open the former and close the latter when trip magnet 32 is energized, and they will be maintained in such shifted position by a latching bell crank 37, the lateral extension 38 of which is adapted to be engaged by a plate 39 secured to gear 26 at the termination of the driving movement of the latter. The contacts 35 and 36 are used to control the energization of the driving motor 22 and their function will be more fully explained in connection with the circuit diagram.

*Escapement means.*—When the detail card is in position above the sensing brushes 122 (Fig. 2), further advance is controlled by the escapement mechanism which in turn is responsive to the energization of escape magnet 40. Upon energization of magnet 40, its armature 41 will be rocked about a pivot in a clockwise direction and through a screw 42 secured to rod 43 will rock the rod 43 counterclockwise, as shown in Fig. 2, against the tension of a spring 44. The rod 43 is rocked as an incident to each spacing operation and has secured to one end thereof oppositely extending arms 45, 46 (see also Fig. 6), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked (clockwise as viewed in Fig. 6, counterclockwise as viewed in Fig. 2) arm 46 will, through its pin and slot connection with dog 47, lift the latter out of one of the notches of the rack and at the same time arm 45 will depress locking dog 48 into a notch between the rack teeth. At this time a spring 49 advances the loosely pivoted dog 47 a short distance just sufficient to permit this dog to move above the top of the next tooth. When the locking dog 48 is again raised due to the deenergizing of magnet 40, stepping dog 47, due to the movement of rack 15, will ride down along the next tooth until it strikes the end thereof and the carriage is thereby arrested. The usual spring drum (not shown) is provided to bias the rack 15 toward the right, as viewed in Fig. 6. The detailed structure of this dog and rack arrangement is well known and need not be further described, and it is sufficient to note that for each operation of the escape magnet 40, the rack 15 is advanced one step or tooth, carrying with it the pusher 13 and the forward guide 14, so that the card is likewise advanced one step, each step of advancement being coextensive with the columnar spacing of the columns of the card.

*Release control means.*—A further means by which the card may be advanced is controlled by a release magnet designated 60 (Fig. 2) which, when energized, will rock its armature 61 about pivot 62 causing the free end of an integral finger 63 to depress a vertical rod 64 shown as being in the shape of a key. The mechanism controlled by this rod or key 64 is well known in this type of machine and is briefly as follows. When the rod 64 is depressed, the lower end thereof rocks a bell crank 64 and thus slides a member 66 toward the right as viewed in Fig. 2. This member 66 is suitably mounted for such movement, and is provided at its left hand end with a cam surface 67 which coacts with the edge 68 of the supporting plate. The member 66 also extends beneath the skip lifter 51 in a position generally as shown in Fig. 2, so that as the member 66 is moved toward the right (Fig. 2), cam surface 67 engaging plate 68 will cause an upward tilting of the left end of the member 66 which in turn will lift the skip lifter 51 upward and against the stepping dog 47, whereupon the rack 17 and card carriage will be free to advance uninterruptedly toward the left. Frictional engagement of the parts will maintain the member 66 in its shifted position so that the escapement of the rack, when initiated by the release magnet 60, will not be interrupted until the card has been fully advanced, that is, until the last or 80th card column is advanced to the sensing position. At this time a suitable projection carried by the rack will engage a depending extension of the left extremity of member 66 and will slide the member toward the left and back to the position it occupies in Fig. 2.

Briefly summarizing the foregoing, it is noted that after the detail card has been initially advanced to present the first card column to the detail card sensing brushes 122, its further advance is controlled to provide a column-by-column stepping movement through the escape magnet 40. The complete release of the card from any position to its last column position is controlled by the release magnet 60.

*Automatic card ejecting means.*—The machine is provided with mechanism for automatically removing the sensed detail or master cards and depositing the same in a receptacle provided for the purpose. This mechanism is more fully shown and described in U. S. Patent No. 1,916,964, issued July 4, 1933, to J. M. Cunningham. Briefly, a gripper 70 occupies the position shown in Fig. 3 with its jaws open in card receiving position during the period that the card is advanced step-by-step by the escapement mechanism. The gripper is carried by the rod 71 to which is secured a gear 72 which through idlers 73 is connected to a slidable rack 74 which is normally biased toward the right by a spring 75. A pivoted latching member 76 engages a latching shoulder at the left hand extremity of the gripper and thereby serves to hold the parts in the position shown in Fig. 3. When the latching member 76 is rocked counterclockwise about its pivot 77, the spring 75 will be free to drive the rack 74 toward the right and through the gearing 73 and 72, flip the gripper 70 in a counterclockwise direction. This flipping action is effected after the card has been advanced to its extreme left hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76 there is provided the usual eject magnet 79 which, when energized, will rock its armature 80 about pivot 81 and draw a link 82 toward the right. The left extremity of the link is provided with an extension 83, which, when the link is moved, will strike a depending arm of the latch member 76 and effect the above-described rocking action thereof which results in the ejection of the card by the gripper. This ejecting operation will bring about the automatic feeding of another card from the magazine 120 into position to be sensed by the brushes 122. The latter operation is initiated by means of a pair of automatic start contacts designated 84 (referred to hereinafter as the "auto start" contacts) which are closed through a pivoted bell crank 85, a depending arm of which is engaged by a lateral extension 86 of rack 74 when the rack has been released for movement toward the right.

In a manner to be explained in connection with the circuit diagram, the auto start contacts 84 close a circuit through the trip magnet 32 and thereby control the operation of the driving motor 22 which, as explained, will cause advance of a new card from the magazine 120 and also cause movement toward the right of the card carriage including the card pusher 13 and forward guide 14. As the rack 16 is moved toward the left, its left-hand end will engage an adjustable extension 87 carried by the rack 74 and will thereby positively restore the rack 74 toward the left and through the gearing shown will return the gripper to the position it occupies in Fig. 3, the latch member 76 being spring-biased to engage and hold the gripper in such position until the newly advanced card has been sensed and advanced to its last column position, whereupon the above described automatic ejection and initiation of a new card feeding operation will take place.

*Card sensing means.*—The card sensing brushes 122 are shown in Fig. 2. There are provided twelve of these brushes positioned side-by-side, there being one for each of the usual twelve horizontal rows of index point positions of the card. The brushes 122 are mounted in an insulating brush holder 90 which is mounted so that the brushes 122 are given substantially a vertical movement upwardly, from the position shown in Fig. 2, to contact the card and effect electrical connections through the perforations therein with a common contact roller 91.

The upward movement of the card reading brushes 122 is effected by the card brush magnet 92 which, when energized, will cause the brushes 122 to move upwardly through linkage generally designated 93. This mechanism is of the usual construction and a detailed description thereof may be found in the patents referred to. Its purpose is generally to maintain the brushes in their lower position, when they are not actually sensing perforations in the card, and thereby preserve them against undue wear and also against damage by any inadvertent backward movement of the record cards. The armature 94 of magnet 92 is arranged when attracted by the magnet to open a pair of contacts 95, the function of which will be explained hereinafter in connection with the circuit diagram.

*Manual back-spacing means.*—Referring to Figs. 1 and 5, there is mounted on the cross arm 100 a finger piece 110 pivoted at 111 (see also Fig. 1) which finger piece also has a depending arm 112. When it is desired to manually backspace the cards, it is done by pressing against the finger piece 110, whereupon a slight rocking thereof is effected before the card carriage actually moves. During this slight rocking, the extension 112 will rock a universal bar 113 about its pivot 114 to cause a depending arm 115 thereon to open the so-called "cut-out" contacts 116. These contacts are located in the reading brush magnet circuits and are provided to insure that these magnets are deenergized and their related brushes in down position before there is any backward movement of the cards which might injure the brushes.

*Miscellaneous contact means.*—Several contacts in addition to those described are provided in the machine, and the operation of these will be pointed out before the entire operation of the apparatus is explained in connection with the circuit diagram.

Figure 6:
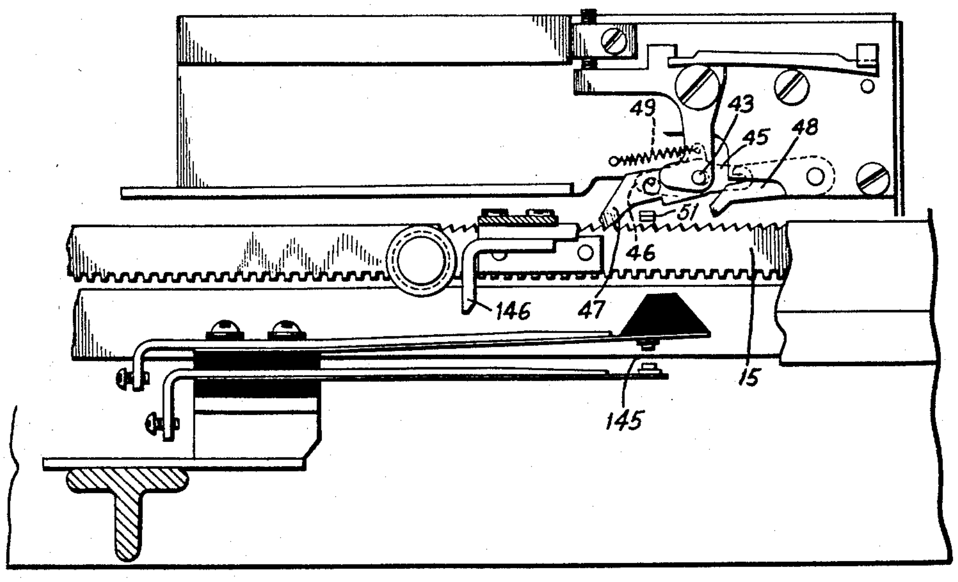
Fig. 6 is a fragmentary view showing the details of the card carriage escapement mechanism.

In Fig. 6 is shown a pair of contacts 145 known as the "last column" contacts. These contacts are closed by a downwardly extending arm 146 secured to the escapement rack and so located that when the escapement rack is advanced to the position in which the last column of the detail card is presented to the card reading brushes, the extension 146 will be in engagement with and close contacts 145. In Fig. 2 there is shown a card lever 157 lying in the path of the record card as it passes from the magazine to the #1 column sensing position. When a card is fed from the magazine, the card lever 157 is rocked to close a pair of suitably disposed "card lever" contacts 156.

*The typewriter*

While in so far as certain of the broader aspects of the invention are concerned, it may be considered as being applicable to any ordinary typewriter or other suitable form of transcribing machine, the illustrative embodiment is disclosed as comprising a well known commercial form of power driven typewriter 200, the operating principles and structural features of such typewriter being fully disclosed in a number of U. S. patents including Patents Nos. 1,777,055 granted September 30, 1930, and 1,873,512 granted August 23, 1932.

Figure 7:
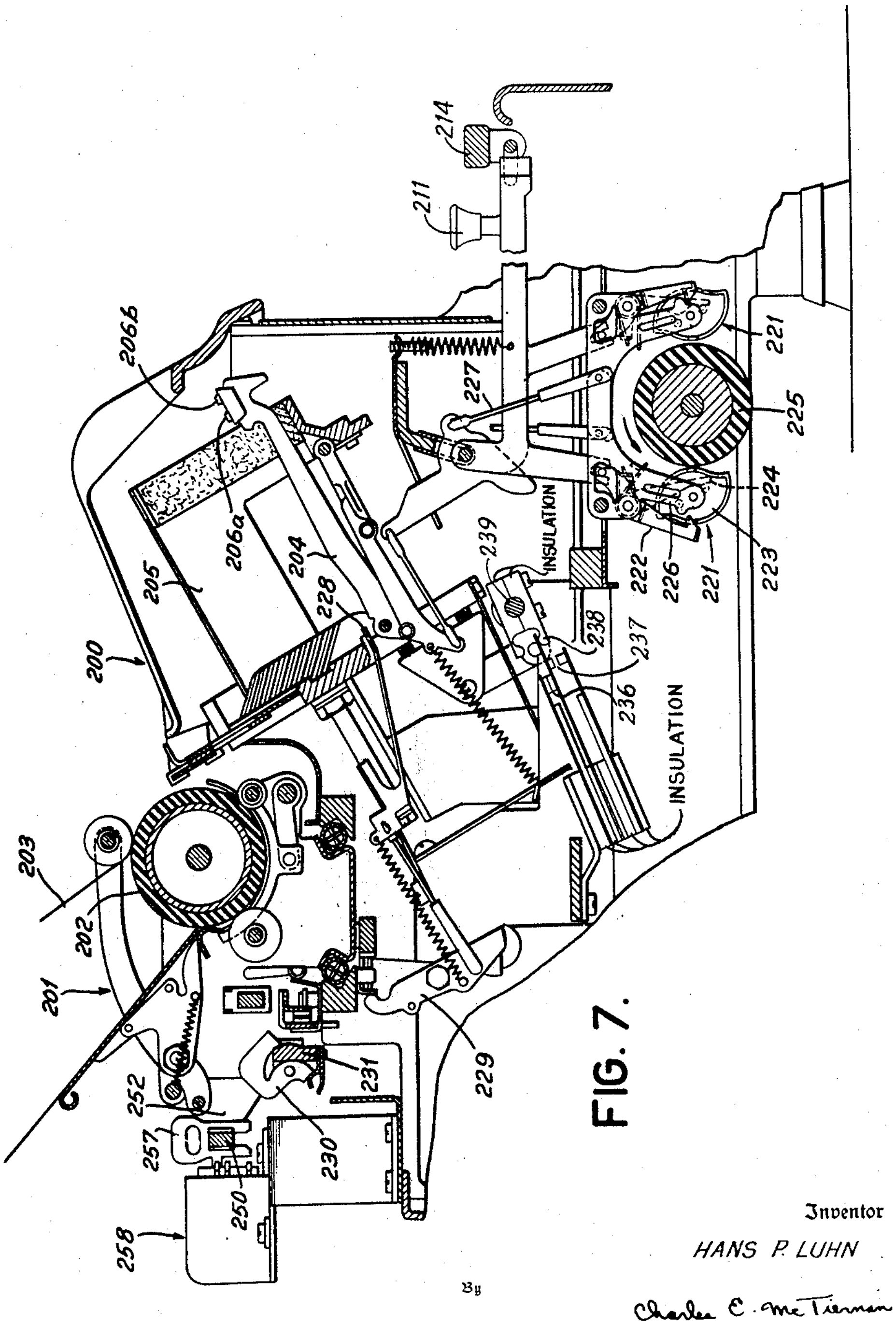
Fig. 7 is a transverse vertical section view through the typewriter, the section being taken on the section line 7—7 of Fig. 1.

As shown in Figs. 1 and 7, the typewriter 200 comprises a laterally movable carriage 201 on which is mounted the usual platen 202 for supporting a copy sheet 203 in printing position. The type bars 204 are pivotally mounted in a type basket 205 and each type bar carries a lower case type element 206a and an upper case element 206b.

Figures 14A, 14B, 14C, 14D:
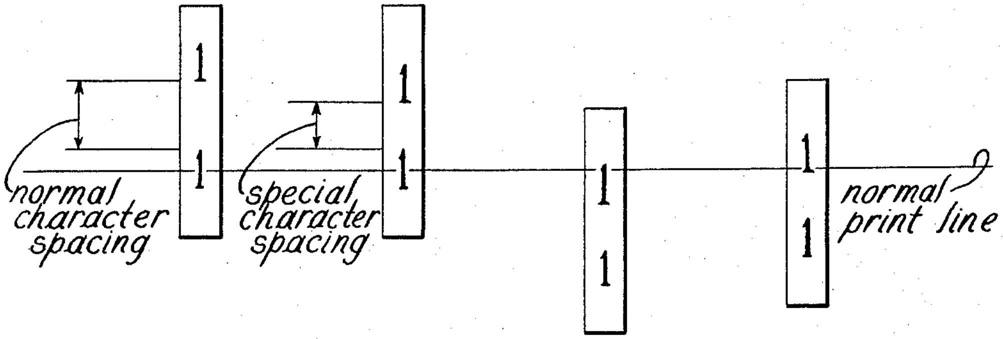

Inasmuch as the intended operation of the typewriter calls for the printing of subscripts and superscripts thus necessitating the use of three shift positions of the type basket, the mechanism for effecting the same being described subsequently, it is necessary that the upper and lower case type embossments in the selected type slugs be closer together than usual such as shown in Figs. 14*a* and 14*b* where the slug of Fig. 14*a* shows the normal character spacing while the slug of Fig. 14*b* shows the modified spacing arrangement. The modified "1" type slug of Fig. 14*b* has a lower case "1" and an upper case "1" such that when the type basket is in the lower case position, the lower case "1" will be positioned on the printing line as shown in Fig. 14*b* when printing occurs. When the shift key 235 or the shift lock key 216 is depressed, the type basket will be lowered so that the upper case "1" will print as a subscript as shown in Fig. 14*c*. When the partial shift key 215 is depressed, the type basket is only permitted to make a partial shift instead of a full shift, as shall be seen subsequently, resulting in the upper case "1" being printed as a superscript character as shown in Fig. 14*d*.

The type basket 205 normally occupies its lower case position where, when a type bar is actuated, the lower case element 206a is printed on the sheet 203. In a manner well understood by those skilled in this art, the basket 205 may be shifted to its upper case position and in such position an actuated type bar will effect printing of its upper case character 206b. Likewise the basket 205 may be shifted to a third position which is intermediate the upper and lower case position and which shall be hereinafter referred to as the partial shift position.

The typewriter 200 also comprises a keyboard 210 including the usual complement of character and functional keys. The character keys are indicated by the numeral 211, the carriage return key by 212, the tabulating key by 213, the bar 214 is the space key, the key 215 is the partial shift key, the key 216 is the shift lock key, the key 217 the shift release key, and the key 235 is the shift key. Each key is mounted on a key lever 220 and when depressed effects the printing of the corresponding character or functional operation in a manner which is either known to those skilled in this art or which shall be described subsequently.

Briefly, referring to Fig. 7, depression of a character key 211 effects operation of a cam unit 221 by releasing a latch 222 from a cam 223, thereby permitting a spring-pressed lever 224 to move the cam against the periphery of a continuously rotating motor-driven shaft 225. The cam is rotated by frictional contact with shaft 225 causing the carrier 226 of the cam to rock in a direction for pulling a link 227 which, through a suitable link-and-lever arrangement, propels a corresponding type bar 204 toward the platen 202 to effect printing of the character denoted on the operated character key. During the final increment of movement of the type bar 204, it strikes a universal bar 228 to actuate through suitable linkage an escapement lever 229 for releasing the escapement mechanism and thereby effecting a carriage spacing movement. Since certain of the characters are printed with an underscoring mark or under-dot mark, the type bar 204 associated with the underscoring or under-dot type slug has been provided with a notch (not shown), such as described in U. S. Patent No. 2,093,581, filed February 9, 1935, so as not to actuate the universal bar 228 and cause an unwanted spacing operation, and, as a result, enable the next character to be printed directly over the underscoring or under-dot mark.

Depression of the space bar 214 similarly results in downward movement of a key lever 220 to effect operation of a cam unit 223 and thereby operate suitable linkage for actuating the escapement lever 229 to cause a character or letter space operation not disclosed in detail herein, but fully disclosed in the above mentioned U. S. Patent No. 1,873,512.

The carriage return mechanism operated by depressing the key 212, is of the type disclosed in U. S. Patents No. 2,104,559 granted January 4, 1938, and No. 1,753,450 granted April 8, 1930. As is usual, the carriage return movement is accompanied by a line spacing operation effected as an incident thereto, and a repeated depression of the carriage return key merely causes an additional line space operation.

Figure 8:
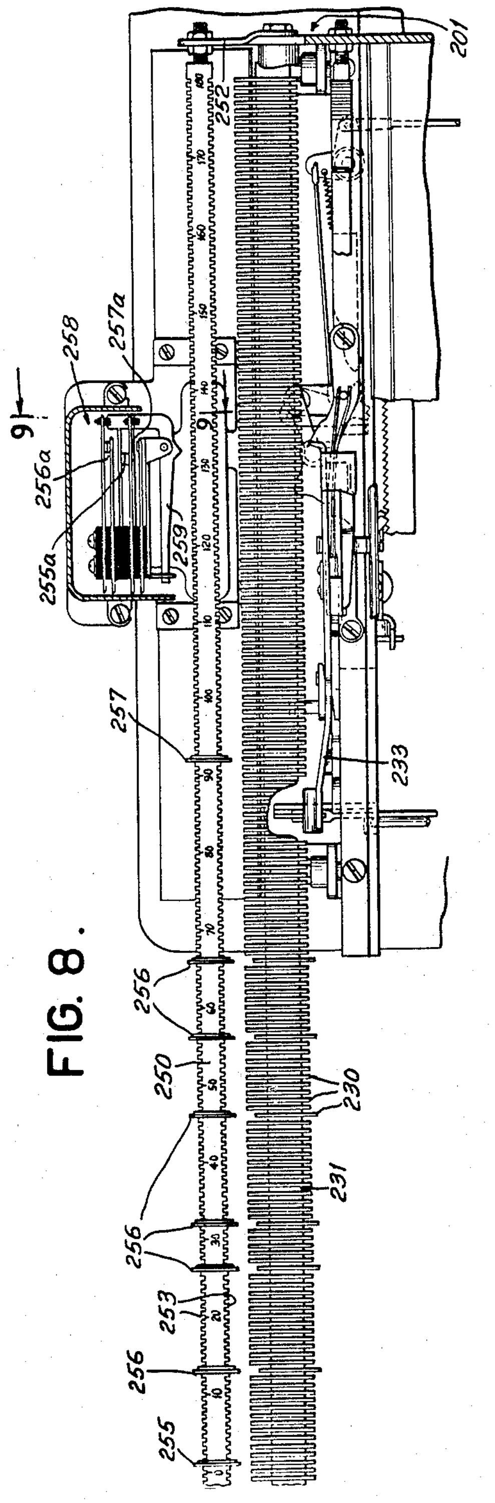
Fig. 8 is an enlarged plan sectional view showing a portion of the back of the typewriter with certain of the parts being omitted and other parts broken away so as to illustrate more clearly the tabulating mechanism for the typewriter carriage and certain of the control devices which operate at selected character space positions of the carriage.

The tabulating mechanism operated by key 213 is such as shown in U. S. Patent No. 1,935,436 granted November 14, 1933, and includes the usual settable tabular stops 230 mounted on a rack bar 231 extending across the back of the machine (Fig. 8). As is disclosed fully in the last-mentioned patent, the depressing of the tab key effects movement of a tab lever 233 to an operated position and thereby releases the escapement mechanism to permit movement of the carriage 201. When the carriage 201 reaches the character space position where a regular tab stop 230 has been preset, the tab lever 233 is engaged by the preset stop and thereby stops the carriage and restores the tab lever to normal position at such character space position.

Depression of the shift lock key 216 (Fig. 12), either manually or through the energization of the associated solenoid 240-shift lock, effects a basket shift operation which moves the type basket 205 from its normal or lower case position to its upper case position. The shift lock key 216 is pivotally mounted at 170 (Fig. 12) on the key lever 220 of the shift key 235 and when depressed is retained in an operating position by a suitable latch 171 catching under a hook 172 fixed to the typewriter frame such as fully disclosed in a number of patents, including No. 2,378,371 granted June 12, 1945. As explained in the latter patent, the shift lock key 216 is released by depressing the shift release key 217 (Fig. 12), which operation effects through bail lever 173 (Fig. 12) a downward movement of the key lever 220 on which the shift lock key 216 is pivotally mounted at 170. The latter movement causes the usual spring 174 to release the latch 171 which holds down the shift lock key. Thus, when the shift release key 217 is released, key lever 220 associated with the shift lock key 216 is then permitted to move upward to its normal position and in so doing to effect the return of the type basket to its normal or lower case position.

While either the shift key 235 or the shift release key 217, may, upon being manually depressed, also effect the shifting of the basket from normal to upper case position, the shift lock key 216 through the shift lock solenoid 240, during the programming operation, is used exclusively to shift and lock the basket in an upper case position thus obviating the unwanted step of pulsing the solenoid each cycle for a continuous series of upper case characters.

Depression of the partial shift key 215 (Fig. 12), either manually or through the energization of the partial shift solenoid 240, effects a basket shift operation which moves the type basket 205 from its normal or lower case position to a partial shift position.

Figure 11:
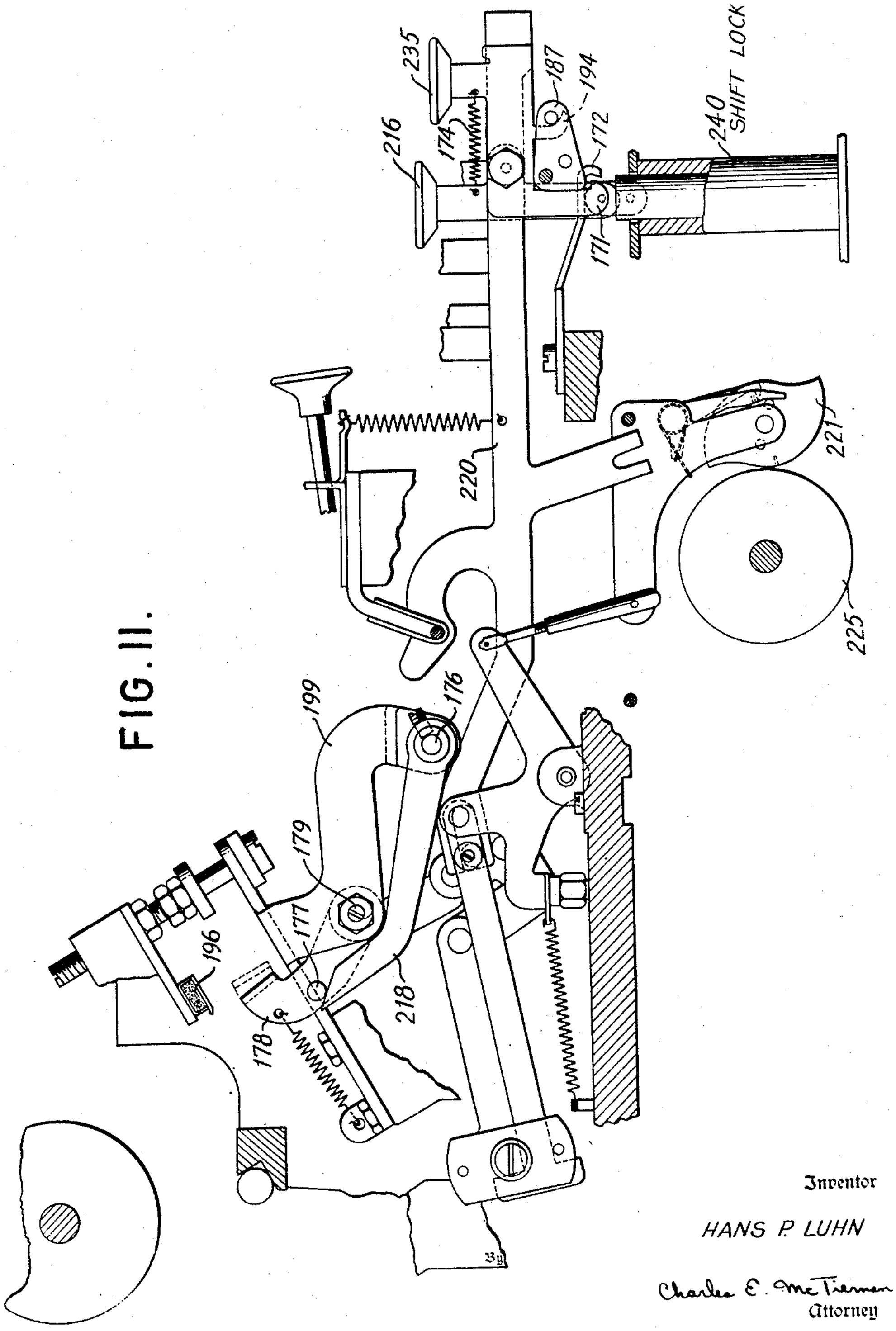
Fig. 11 is a fragmentary vertical section showing the details of the shift lock key and the related linkage arrangement for effecting the shifting of the typewriter basket from a lower to an upper case position.

When the partial shift key 215 and its associated key lever 220 are depressed, the key lever 220 pivots counterclockwise about its supporting shaft 176 (Fig. 12) pivotally supported near each end thereof by the supporting members 199 thereby causing the shaft to turn in a counterclockwise direction. There is secured to the shaft 176 a pair of spaced actuating elements 218 which, with the movement of the shaft 176 in a counterclockwise direction, are also moved in a counterclockwise direction against the studs 177 secured to the spring biased interposers 178 thereby causing the interposers 178 to be rocked about the respective pivots 179 to the dotted line position as shown in Fig. 11. It is to be noted that the supporting members 199 in addition to pivotally supporting the shaft 176 also pivotally support the interposers 178 at the pivots 179.

Figure 12:
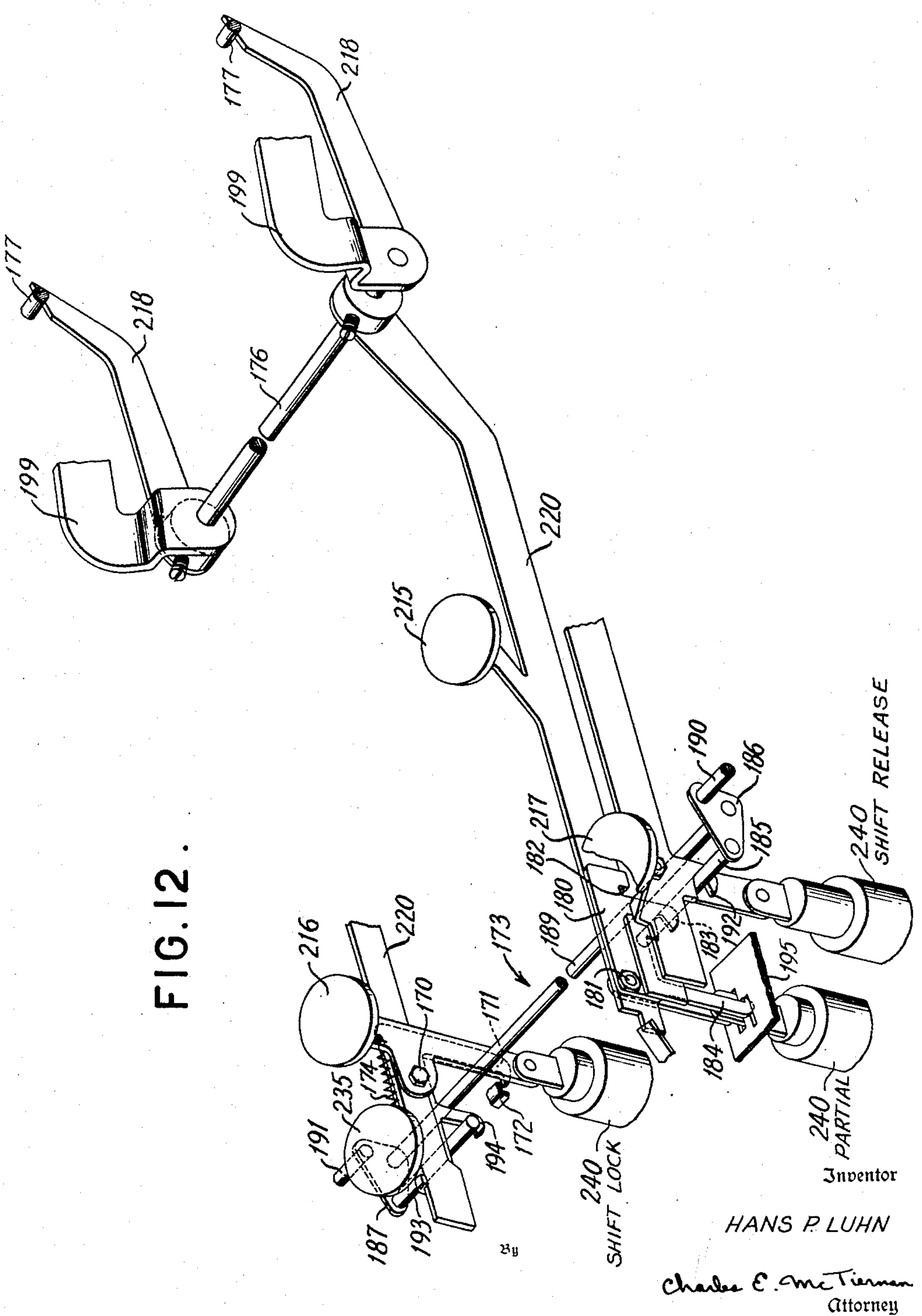
Fig. 12 is an isometric view, partly cut away, to show the details of the mechanical arrangement existing between the partial shift key, the shift release key, and the shift lock key.
Figure 13:
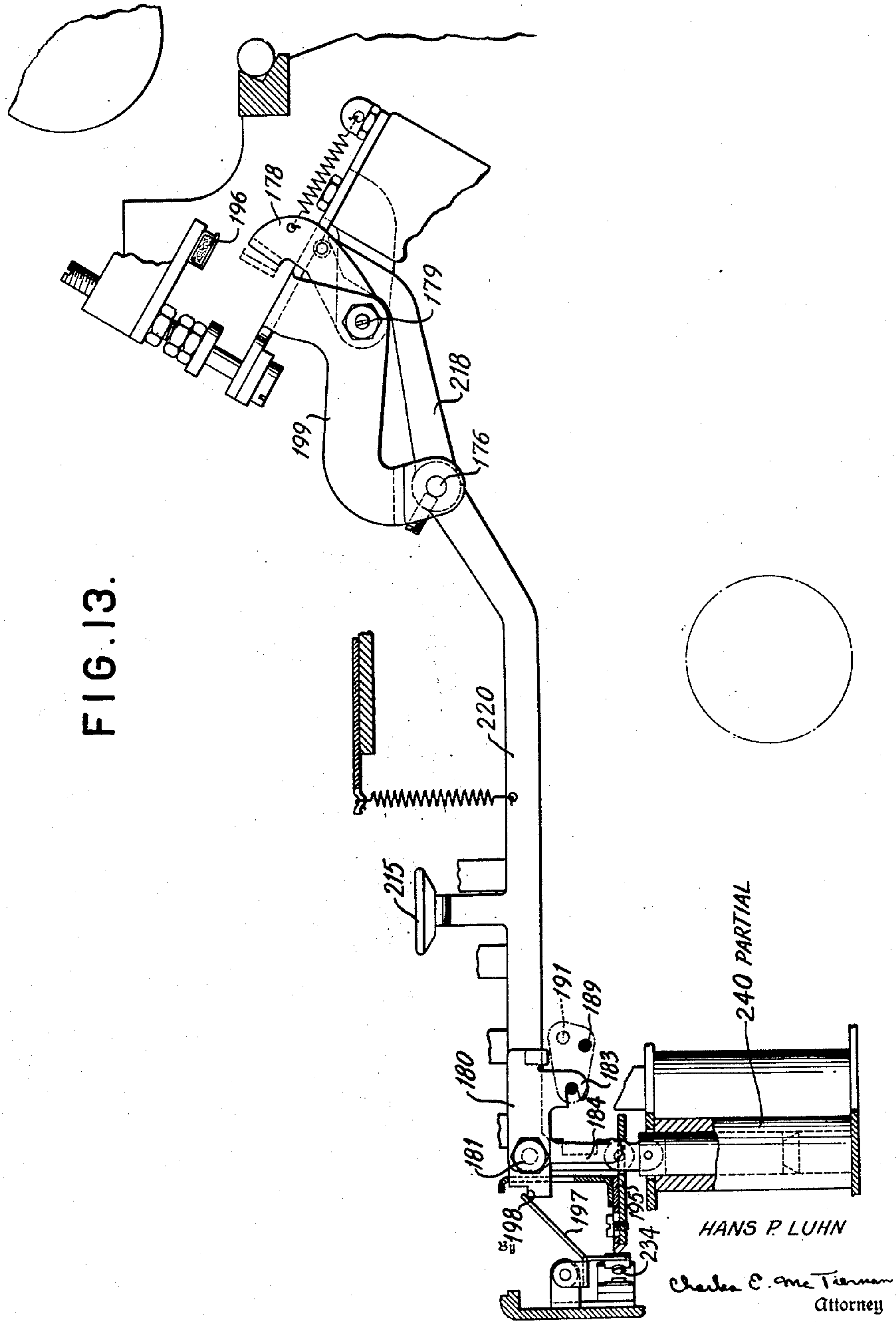
Fig. 13 is view partly cut away and partly in section showing the details of the partial shift key lever and the associated key lever for effecting the shifting of the typewriter basket from a lower to a partial case position.

As the partial shift key 215 and its associated key lever 220 are being depressed the shift release key 217 is also depressed through the medium of the partial shift lock lever 180 (Figs. 12 and 13). Partial shift lock lever 180 is pivotally mounted on the stud 181 secured to the key lever associated with the partial shift key 215. Partial shift lock lever 180 has integral therewith an ear 182, a slotted arm 183 and a latch 184. The key lever 220 which is associated with the partial shift key 215 is resting on the ear 182 as shown in Fig. 12, while the slotted arm 183 is operatively associated with the stud extension 185 of the plate 186 of the bail lever 173. The bail lever 173 comprises a pair of end plates 186 and 187 (Fig. 12) connected by a bail rod 189. Bail lever 173 is mounted for pivotal movement by the studs 190 and 191 (Fig. 12) extending outwardly from the plates 186 and 187 and secured respectively within opposite sides of typewriter frame not shown. The stud 185 extends inwardly from the end plate 186 and within a notch 192 (Fig. 12) formed in the downwardly extending projection of the key lever 220 associated with the shift release key 217. A second stud 193 extends inwardly from the plate 187 and over the hook 194 associated with the shift key lever 220.

Thus when the partial shift key 215 is depressed the stud extension 185 of the bail lever 173 is rocked counterclockwise, as viewed in Fig. 12, about the supporting studs 190 and 191 through the cooperative action of the slotted arm 183 upon the stud 185. Also when the partial shift key 215 is depressed, the latch 184 will be hooked under the member 195 thereby retaining the partial shift key lever 220 in a depressed position. Likewise when the stud 185 is rocked counterclockwise, the notch 192 meshing with the stud 185 will through the functioning of the bail lever 173 cause the shaft key lever 220 to be depressed thereby releasing the associated shift cam 221 (Fig. 11) to lower the type basket 205 from the lower to the upper case position. However, the type basket will be prevented from making a full shift because the stop 196 (Fig. 13) will encounter the interposer 178 which has assumed the dotted line position as previously explained. In order to release the partial shift key lever 220 to its normal position and to return the basket to its lower position it is necessary that the shift release key 217 be further depressed either manually or through the energization of the associated solenoid. As the shift release key lever 220 is depressed the notch 192 integral therewith and meshing with the stud 185 causes the stud 185 to be rocked in a counterclockwise fashion as viewed in Fig. 12. Since the slotted arm 183 of the partial shift lock lever 180 also meshes with the stud 185, the movement of the latter element will cause the partial shift lock lever 180 to be rocked clockwise around its pivot stud 181, thereby releasing the latch 184 from engagement with the member 195 and as a result, permitting the partial shift key lever 220 to return to its normal position.

According to the present invention three pairs of type basket contacts 234 (Fig. 13), and 236 and 237 (Fig. 7) are provided. The contacts 236 and 237 (Fig. 7) are of the transfer type and are actuated by an arm 238 fixed to an operating shaft 239 of the basket shift mechanism. The shaft 239 occupies its normal position shown when the type basket 205 is in its lower case position. In this position the contacts 236 are closed and the contacts 237 open. When the type basket is shifted to its upper case position, the shaft 239 is rocked counterclockwise as an incident to the shifting operation and, through the arm 238, opens contacts 236 and closes contacts 237. When the type basket is returned to lower case position, the contacts 236 are again closed and the contacts 237 opened, as will be apparent.

The contacts 234 (Fig. 13) secured to the frame of the typewriter are actuated by the lever arm 197 operably associated with the shouldered portion 198 of the partial shift key lever 220. When the partial shift key lever 220 is in its normal position, the arm 197 resting on the shoulder 198 prevents the contacts 234 from being closed. When the partial shift key lever 220 is depressed, the shouldered portion 198 of the lever drops followed by the lever arm 197 thereby removing the restraining effect upon the contacts 234 and resulting in the contacts 234 being engaged. When the basket is being shifted to partial case position, the shaft 239 (Fig. 7) is turned counterclockwise a distance sufficient to place the contacts 236 and 237 in an open position. Thus it is to be noted that when the contacts 234 are closed, the contacts 236 and 237 are open.

Supplementing the above construction and peculiar to the present invention, are a plurality of typewriter actuating solenoids 240, there being an actuating solenoid for the space bar and an actuating solenoid for each of the various other keys of the keyboard that are required to be operated. As shown in Fig. 12 the armature of each solenoid 240 is connected to its corresponding key lever 220. Thus, energization of a solenoid results in automatic operation of its related key and the mechanism operated by such key. The solenoids 240 may be distinguished hereinafter in this description by suffixing the designation of the key or element operated thereby to the common reference number 240. For example, the solenoid for effecting printing of the character "A" will be designated as 240-A and the solenoid for effecting the carriage return and line spacing operation as 240-carriage return.

As shown in Figs. 7 and 8, a special rack bar 250 is mounted on the carriage 201 for movement therewith, and is fixed at its two ends to rearwardly extending support plates 251 and 252 (Fig. 1), respectively, which are suitably fixed to the two end plates of the carriage 201. As shown, the special rack bar 250 is formed with a plurality of pairs of vertical grooves 253, 253, the grooves forming each pair being formed on opposite sides, respectively, of the bar 250 and extending in a common vertical plane. The several pairs of grooves 253, 253 correspond, respectively, to the character-space positions of the carriage. Each of the pairs of grooves is adapted to receive either one of three kinds of control stops, indicated respectively by the reference characters 255, 256 and 257 (see also Figs. 9 and 10). Each of these control stops functions when the carriage 201 reaches the character-space position corresponding to the pairs of grooves where such control stop has been placed, to open, or close, a related pair of contacts mounted within a contact assembly 258 fixed to the rear portions of the typewriter frame. As will appear more fully hereinafter in the description of the circuit diagram appearing on Figs. 15*a* to 15*q* inclusive, there is a separate pair of contacts actuated by each of the three kinds of control stops and such contacts are located in circuits for controlling certain operations of the apparatus disclosed herein.

Figure 10:
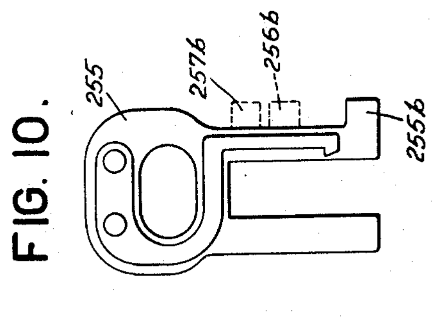
Fig. 10 is a vertical elevation showing in full lines one of the control stops and indicating in dash lines the positions of the contact operating tabs on the other two control stops.
Figure 9:
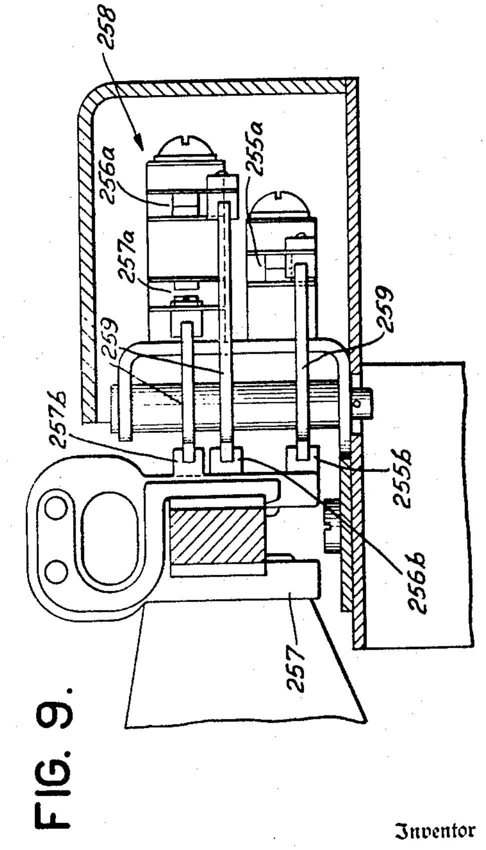
Fig. 9 is an enlarged fragmentary vertical sectional view taken on line 9—9 of Fig. 8.

As shown in Figs. 8, 9 and 15*b*, the contact assembly 258 comprises a pair of make contacts 257*a*, a pair of break contacts 256*a*, and a pair of break contacts 255*a*. Each pair of contacts is actuated by a separate related lever 259 when the latter is engaged by a contact actuating tab formed on its related control stop. As shown in Fig. 9, the control stop 257 is provided with a tab 257*b* in alignment with the lever 259 for actuating the pair of make contacts 257*a*, so that, when the carriage reaches the character-space position corresponding to a pair of grooves where a stop 257 has been set, the related contacts 257*a* are closed. Fig. 10 shows in full lines the control stop 255 with a tab 255*b* which is so located that it will open the break contacts 255*a* when the carriage 201 reaches the character-space position where such a stop 255 has been placed. The location of the contact actuating tab 256*b* for the third kind of control stop 256 is indicated in dash lines in Fig. 10, and in full lines in Fig. 9. As shown, the control stop 256, through its tab 256*b*, will open its related contacts 256*a* when the carriage reaches the character-space position corresponding to the pair of grooves 253, 253 where such stop 256 has been placed.

*General operation*

The general operation of the apparatus of the present invention will now be described in connection with the complete electrical diagram which is shown in Figs. 15*a* to 15*q*. In the wiring diagram, all switches and contacts are shown in the position they occupy when the power is turned off and without a detail card or a master card in position in the card carriage.

The general operation will be described with the manually controlled release key eject switch 301, "space-period" switch 302, and "detail-master" switch all being in the position as shown in Fig. 1.

Before starting a reading and typing operation, the magazine 120 is filled with a plurality of detail cards DC containing the recorded code designations of the data to be printed.

Next, a main power switch 300 (Figs. 1 and 15*a*) is closed. This switch connects a suitable source of direct current with a main positive conductor 305 and a main negative or ground conductor 306 and thereby energizes brush interlock relay R5 (Fig. 15*a*) through the normally closed card brush magnet contacts 95 (Fig. 15*a*). Thus, relay R5 upon being energized closes its normally open contacts *a* of relay R5 and opens its normally closed contacts *b* of relay R5 (Fig. 15*a*).

While the contacts of the respective relays are designated by means of a single alphabetical reference character, such as *b* contacts of relay R5 (Fig. 15*a*), they will henceforth be referred to in a manner such as to be prefixed by the associated relay designation, such as contacts R5*b*.

The contacts R5*b* while in an open position prevent the reading of the perforations within a card by preventing the read control relay R31 from being energized. The contacts R5*a*, when in an open position, prevent an eject cycle from taking place when the brushes 122 are in a reading position. Likewise when the switch 300 is closed, energy is supplied to the motor CR causing the cam controlled contacts CR1 to CR9, inclusive, to make and break contact as shown in the timing diagram of Fig. 33*a* in a manner well known to those skilled in the art.

*Initial card feeding operation.*—The next step in the operation is to feed the bottom record card DC in the magazine 120 to a reading position which is the position occupied when the #1 column of the record card is in sensing position over the card reading brushes 122. This feeding operation is effected by closing the release key eject switch 301 (Figs. 1 and 15*a*) and depressing the release key 310 (Figs. 1 and 15*a*) to close its contacts 311 and thereby energize the pick-up coils of the release relays R2 and R3 when the cam controlled contacts CR5 make by the following circuit: from the positive line 305, line 307 cam controlled contacts CR5 now closed, line 19, release key contacts 311 now closed, read control relay contacts R31*c* normally closed, pick-up coils of the relays R2 and R3 in parallel to ground. The energizing of the pick-up coil of R2 causes the associated contacts R2*a*, R2*b*, and R2*c* to be closed while the energizing of the pick-up coil of the relay R3 causes the associated contacts R3*a* (Fig. 15*g*), R3*b* (Fig. 15*a*), R3*c* (Fig. 15*g*), and R3*d* (Fig. 15*a*) all to be closed.

After the contacts R2*b* are closed, a hold circuit for the relay R2 is set up as follows: line 305, line 307, line 21, latch contacts 35 normally closed, last column relay contacts R1*c* normally closed, contacts R2*b* now closed, hold coil of the relay R2 and then to ground.

After the contacts R2*c* are closed and when the cam controlled contacts CR6 make, a circuit is established for energizing the interlock relay R36 which, as shall be seen subsequently, suspends any programming operation which is taking place through the opening of the contacts R36*b*, R36*c*, and R36*a* (Fig. 15*j*). This circuit may be traced from line 305, line 207 (Fig. 15*a*), cam controlled contacts CR6 now closed, line 52, contacts R2*c* now closed, pick-up coil of relay R36 and then to ground. This relay is held by a circuit established through the cam controlled contacts CR7 in a closed position, contacts R36*a* now closed, hold coil of R36 and then to ground.

A circuit for holding the relay R3 is completed at the time that the cam controlled contacts CR3 make. This circuit may be traced from line 305, line 307, contacts CR3 now closed, line 50, contacts R3*b* now closed, hold coil of the relay R3 and then to ground.

The closing of the contacts R3*d* causes the release magnet 60 (Fig. 15*a*) to be energized through a circuit which may be traced as follows: from line 305, line 307, line 21, latch contacts 35 normally closed, contacts R3*d* now closed, release magnet 60 and then to ground.

As explained hereinabove, the energized release magnet (Fig. 2) through its armature 63, plunger 64 and bell crank 65, will move the slide 66 to the right and thereby raise the skip lifter 51 which will in turn raise the escapement dog 47 out of engagement with rack 15 and permit movement of the card carriage to its last, or 80th column reading position. The slide 66 will remain in the actuated position until the card carriage approaches the last column position at which time a projection (not shown) on the rack 15 engages a depending extension on the left hand end of slide 66 and will thereby return the slide to the position shown. The release magnet 60 is deenergized when the contacts R3*d* are opened at the time that the hold circuit of relay R3 is broken with the opening of the cam controlled contacts CR3.

When the card carriage reaches the last column position, the last column contacts 145 are closed causing a circuit to be established for energizing the relay R1 as follows: from conductor 307, line 135, contacts 145 now closed, relay R1 and then to ground. At the same time a circuit is completed for energizing the eject magnet 79 as follows: from line 307, line 135, contacts 145 now closed, switch 301 now closed, contacts R5*a* now closed, eject magnet 79 and then to ground.

The energizing of the eject magnet 79 causes the card reading unit to go through an eject cycle, as previously described, resulting in the closing of the auto-start contacts 84 (Fig. 15*a*) and the energizing of the trip magnet 32 (Fig. 15*a*). The magnet 32 trips the clutch 28 and also shifts the latch contacts 35 and 36 (Fig. 15*a*) to open contacts 35 and close contacts 36. The closing of latch contacts 36 energizes the motor 22 which, through the clutch 28, drives the rack bar 16 and picker 121 towards the left as viewed in Fig. 1 and simultaneously drives the card carriage including the rack 15, pusher 13, and guide 14, toward the right. The picker 121 feeds the bottom record card of the stack in the magazine 120 into a start reading position, where it is held between the pusher 13 and guide 14 (as shown in Fig. 2) and where the #1 column of such record card is in position to be sensed by the sensing brushes 122.

At the end of this movement of the card carriage to the start position, the auto-start contacts 84 (Figs. 3 and 15*a*) are opened to deenergize the trip magnet 32 thereby opening the latch contacts 36 to stop the motor 22 and closing the contacts 35, and the first column contacts 54 (Fig. 15*a*). The first column contacts 54 are positioned upon the back of the machine so as to be closed when the carriage assumes its extreme right hand position and to be open when the carriage skips to the second column position.

At start position with the #1 column of the record card in position to be read, the card lever contacts 156 (Figs. 2 and 15*a*) are closed through the rocking of the card lever 157 and the positioning of the new record card in the card carriage. Closed card lever contacts 156 energize relay R4 by the following circuit: from conductor 307, line 21, latch contacts 35 now closed, contacts R1*c* normally closed, line 53, contacts 156 now closed, relay R4 and then to ground. Relay R4 closes its hold contacts R4*a* which are connected in parallel with the contacts 156 and thereby keep the relay R4 energized under the control of the latch contacts 35. As the energizing of relay R4 is dependent upon the closing of both the latch contacts 35 and the card lever contacts 156, R4 prevents, through its normally open contacts R4*b* and R4*c*, the energizing of the brush magnet 92 (Fig. 15*a*) and the establishing of an operating circuit while the card carriage is being moved to its start position and while there is no card in the card carriage.

It will be apparent that with the card carriage at start position and with contacts R1*c* in their normal deenergized position shown, the closing of contacts R4*c*, as just described, will establish an energizing circuit through the brush magnet 92. As shown in Fig. 15*a* this circuit extends from the positive conductor 307, line 21, contacts 35 now closed, contacts R1*c* and R4*c* now closed, normally closed cut-out contacts 116, brush magnet 92 and then to ground. The energizing of brush magnet 92 opens its contacts 95 (Figs. 2 and 15*a*) and thereby drops out relay R5 which permits its contacts R5*a* to open and R5*b* to close. The energizing of brush magnet 92 enables the brushes 122 to be placed in their upper or reading position.

Likewise as the card is positioned for sensing the #1 column, the first column contacts 54 (Fig. 15*a*) being in an engaging position will in conjunction with the making of the cam controlled contacts CR2 cause the relay R34 to be energized and latched by the following circuit: from line 307, cam controlled contacts CR2 now closed, contacts 54 and R4*b* now closed, pick-up coil of the relay R34 and then to ground. The contacts 54 will be returned to the normal open position when the card is shifted to #2 column.

While all the foregoing operations, to bring a card into reading position, are taking place, the CR contacts through the driven motor CR (Fig. 15*a*) are repeatedly opening and closing but are ineffective since no circuits have been established. It is not until contacts R4*b* and 54 (Fig. 15*a*) are both closed that contacts CR2 become effective. The cycle in which this occurs is designated as the "1st cycle" in Fig. 33*a* where the solid line under R34 represents the period of energization of its pick-up magnet and the broken line represents the period that it remains latched.

The relay R34 is a latched type relay consisting of a pick-up magnet P and a tripping magnet T. As shown in Fig. 33*a*, the pick-up magnet is energized and latched when the contacts CR2 make in the first cycle and it will remain in a latched position until the tripping magnet is energized when the contacts CR4 make in the second cycle. It is to be noted that all relays having pick-up and tripping magnets are latched type relays.

The energizing of the pick-up coil of R34 causes the contacts R34*a* to be closed resulting in a circuit being established for the energizing of read control relay R31 when the cam control contacts CR9 make. This circuit may be traced from line 307, cam controlled contacts CR9 in a closed position, line 56, contacts R34*a* now closed, contacts R5*b* normally closed, relay R31 and then to ground. A hold circuit is set up for the relay R31 at the time that the cam controlled contacts CR7 make which may be traced from line 307, contacts CR7 in a closed position, line 57, contacts R31*a* now closed, hold coil of R31 and then to ground.

*Detail operation*

The remaining circuits will now be described with reference to a specific problem as typified by the detail card of Fig. 32. An examination of this card will show that code notations in column 1 represents the character "a" of code A1; that the designations in column 2 represent the character "76#" of code B2; that the representations in column 3 indicate the presence of a tabular notation; that the indications in column 4 represent the character "a" of code D1; and that the perforations in column 5 and subsequent columns represent a lacing operation.

For the purposes of describing the operation of the electrical circuits as applied to the specific problem to effect the typing of this particular data, it will be assumed that the detail card has been fed into the card carriage, that the card carriage is at its #1 card column reading position, and that the typewriter carriage is at its #1 character position with the type basket in upper case position. Also that, as shown in Fig. 33*a*, the pick-up coil of R31 is energized when the contacts CR9 make in the 1st cycle while the hold coil of R31 is energized when the contacts CR7 make in the 1st cycle such that the relay R31 is held in an energized condition until after the middle of the second cycle.

Likewise it will be assumed that the card lever relay R4, the brush magnet 92, the start relay R34, and the read control relay R31 are all either in an energized or a latched position such as previously described.

Thus, with the #1 column of the detail card of Fig. 32 in a sensing position, the brushes 122 will sense the perforations "9," "8," "7," "6," and "5" representing the character "a" of code A1 thereby causing R72, R73, R74, R75, and R76 (Fig. 15*c*) to be energized and latched through a circuit established when the cam controlled contacts CR1 close in the second cycle such as shown in the timing diagram of Fig. 33*a*. This circuit is traceable from line 305, contacts CR1 now closed, line 58, contacts R31*e*, common brush 55, contact roll 91, brushes 122, corresponding pilot relays R72, R73, R74, R75, and R76 and then to ground.

After the pilot relays have been energized and latched and the corresponding contacts thereof shifted, the escapement solenoid 40 (Figs. 2 and 15*a*) will be energized when the cam controlled contacts CR5 close as shown in the second cycle of the timing diagram of Fig. 33*a* thereby causing the dog 47 (Fig. 2) to be lifted such that when the escapement solenoid is de-energized, the detail card escapes to the second column. The circuit completed for energizing the solenoid 40 is traceable from line 307, contacts CR5 now closed, line 19, line 136, contacts R31*d* now closed, solenoid 40 and then to ground.

Also in the second cycle when the cam controlled contacts CR2 close, a circuit will be established for energizing the pick-up coil of the screening relays R122, R120, R121, R118, and R117 (Fig. 15*c*) and setting up the screening relay network (Figs. 15*e* and 15*f*) to determine the code represented by the combination of screening relays which have been energized. This circuit may be traced from line 305, line 137 (Fig. 15*c*), contacts CR2 now closed, line 69, contacts R39*c* normally closed, contacts R31*f* now closed, contacts R13*b* as shown, line 87, contacts R72*b*, R73*b*, R74*b*, R75*b* and R76*b* all transferred, corresponding pick-up coils of the relays R122, R120, R121, R118, and R117 and then to ground. A holding circuit is established for these screening relays when the cam control contacts CR3 close as shown in the timing diagram of Fig. 33*a*. This circuit is traceable from line 305, line 137, contacts CR3 now closed, line 59, contacts R122*a*, R120*a*, R121*a*, R118*a* and R117*a* all now closed, corresponding hold coils of the relays R122, R120, R121, R118, and R117 and then to ground.

*Code selecting.*—The screening network (Figs. 15*e* and 15*f*) consists of the contacts associated with the screening relays corresponding to the index point positions of the two lower decks of a record card being intercoupled in such a manner that a circuit will be completed therethrough to the coil of the appropriate code selecting relay only when five of the screening relays have their contacts in a transferred position. The contacts associated with the screening relays R122, R121, R120, R118, and R117 corresponding to the index point position of the lower deck are arranged so that individual outputs are obtained if none, one, two, three, four or five of these relays are energized.

The individual output circuits of the screening relays corresponding to the index point positions of the lower deck are coupled to the contacts of the screening relays corresponding to the index point positions of the intermediate deck so as to produce individual screening circuits, each of which is responsive to the required combination necessary to energize the appropriate code selecting relay. Thus, for example, when three of the relays R122, R121, R120, R118, and R117 are energized, a circuit will be completed through the associated contacts thereof to the common output of the contacts R117$c$ as shown and contacts R117$d$ in a shifted position which, in turn, is coupled to a maze of contacts of the relays R115, R112, R108, R103, and R99 so as to enable a circuit to be completed through all of the screening relay contacts to the appropriate code selecting relay when either none, one or two of the latter group of relays are energized.

Thus, after the perforations have been sensed and the associated pilot relays energized and latched and a holding circuit completed for the corresponding screening relays R122, R120, R121, R118, and R117, a circuit will be established for the energizing and latching of code A1 selecting relay R94 (Fig. 15$e$) when the cam controlled contacts CR3 make as shown in the second cycle of the timing diagram of Fig. 33$a$. This circuit may be traced from line 305, contacts CR3 now closed, line 88, contacts R122$b$, R121$b$, R120$b$, R118$b$ and R117$b$ all transferred, contacts R115$b$, R112$b$, R108$b$, R103$b$, and R99$b$ all as shown, pick-up coil of relay R94, line 138, contacts R96$b$ and R97$b$ as shown and then to ground.

There is listed below in tabular fashion a sample code notation selected from each of the remaining code series in addition to the necessary information required to trace a circuit through the screening relay network to the corresponding code selecting relay. This table includes a particular coding arrangement from each code series, as represented by the "x" designation under the numbers indicative of index point positions of a record card, the code series from which the particular coding arrangement has been selected, the screening relays energized when the code arrangement concerned is sensed, and the code selecting relay which will be energized by a circuit completed through the screening relay network when the contacts CR3 make at the appropriate time. With regard to the screening relay network it is to be noted that a circuit will be established from line 305 through the network to ground only when any combination of five holes are sensed in a single column of a record card.

much as the first symbol to be printed as represented by each of the aforementioned series is a lower case character such as, for example, the underscoring mark of series A2, the hyphen of series G1, and the comma (,) of series E.

Likewise if either of the code selecting relays R82, R85, or R92 respectively representing code series C, D2, and G2 had been energized in place of relay R94 then the upper case basket control relay R49 would have been energized inasmuch as the first symbol to be printed as represented by these series is an upper case character.

Inasmuch as the circuit established for energizing the relay R49 when the code selecting relay R82 is energized is not as readily followed as for the other relays, it may be traced as follows: line 139 (Fig. 15$h$), contacts CR4 closed, line 89, contacts R39$b$ as shown, contacts R31$g$ now closed, line 140 (Fig. 15$h$ to Fig. 15$g$), contacts R79$b$ and R80$b$ as shown, contacts R82$a$ shifted, line 209 (Fig. 15$g$ to Fig. 15$h$), contacts R97 as shown, pick-up coil of R49 and then to ground.

Also if either of the code selecting relays R86 or R90 respectively representing the code series D3 and F2 are energized in place of relay R94 then the partial case basket control relay R50 would be energized since these two series call for the printing of characters in superscript form.

At the same time a circuit is established for unlatching the start relay R34 (Fig. 15$a$) which may be traced from line 305, line 307 (Fig. 15$a$), contacts CR4 now closed, contacts R31$b$ now closed, trip coil of the relay R34 and then to ground.

With the control relay R31 returned to a deenergized state when the contacts CR7 break during the second cycle (Fig. 33$a$), and with the relay R51 now in a latched position, a circuit will be established when the contacts CR5 make in the third cycle, for energizing the shift release solenoid 240 (Fig. 15$h$) which will cause the typewriter basket to shift to the lower case position resulting in the opening of contacts 237 and the deenergizing of relay R11, and the closing of contacts 236 and the energizing of basket position relay R12. This circuit may be traced from line 305, line 139 (Fig. 15$h$), contacts CR5 now closed, line 96, contacts R31$h$ normally closed, contacts R11 transferred, contacts R51$a$ now closed, solenoid 240-shift release and then to ground.

| Code Notations | | | | | | | | | | | | Code Series | Screening Relays | Code Selecting Relay |
|---|---|---|---|---|---|---|---|---|---|---|---|---|---|---|
| 5 | 6 | 7 | 8 | 9 | 0 | 1 | 2 | 3 | 4 | X | Y | | | |
| x | -- | -- | -- | -- | x | x | x | x | -- | -- | -- | A2 | R122, 115, 112, 108, 103 | R78 |
| x | x | x | -- | -- | x | -- | x | -- | -- | -- | -- | B1 | R122, 121, 120, 115, 108 | R79 |
| x | x | -- | -- | -- | x | x | x | -- | -- | -- | -- | B2 | R122, 120, 115, 112, 108 | R80 |
| -- | -- | -- | -- | -- | x | x | x | x | -- | x | -- | C | R115, 112, 108, 103, 97 | R82 |
| x | x | x | -- | -- | x | -- | -- | -- | -- | -- | x | D1 | R122, 121, 120, 115, 96 | R83 |
| x | -- | -- | -- | -- | x | x | x | -- | -- | x | -- | D2 | R122, 115, 112, 108, 97 | R85 |
| -- | -- | x | -- | -- | x | x | x | -- | -- | -- | x | D3 | R121, 115, 112, 108, 96 | R86 |
| x | x | -- | -- | -- | x | x | -- | -- | -- | -- | x | E | R122, 120, 115, 112, 96 | R87 |
| x | x | x | -- | -- | -- | -- | -- | -- | -- | x | x | F1 | R122, 121, 120, 196, 97 | R89 |
| -- | -- | -- | -- | -- | x | x | x | -- | -- | x | x | F2 | R115, 112, 108, 96, 97 | R90 |
| x | -- | -- | -- | -- | x | x | -- | -- | -- | x | x | G1 | R122, 115, 112, 96, 97 | R91 |
| x | x | -- | -- | -- | x | -- | -- | -- | -- | x | x | G2 | R122, 120, 115, 96, 97 | R92 |

*Typewriter basket control.*—Inasmuch as it has been assumed that the typewriter basket is in its upper case position, the contacts 237 (Figs. 7 and 15$h$) will be closed causing the basket position relay R11 (Fig. 15$h$) to be energized when the main switch 300 is closed. Since the code notations of code A1 (see Fig. 16) initially call for the printing of a lower case symbol in the form of an underscoring mark, the typewriter basket will now automatically seek its lower case position due to the relay R94 being in an energized state when the cam controlled contacts CR4 make as shown in the second cycle of the timing diagram of Fig. 33$a$. When the contacts CR4 make a circuit is established for energizing and latching the lower case basket control relay R51 (Fig. 15$h$) which is as follows: from line 305, line 139 (Fig. 15$g$), contacts CR4 now closed (Fig. 15$h$), line 89, contacts R39$b$ as shown, contacts R31$g$ now closed, line 140, contacts R94$a$ now closed, pick-up coil of basket control relay R51 and then to ground.

It is to be noted that if either of the code selecting relays R91, R83, R80, R79, R78, or R87 respectively representing code series G1, D1, B2, B1, A2 and E had been energized in place of relay R94 that the lower case basket control relay R51 would also be energized inas- Also during the second cycle when the relay R51 is being energized due to the closing of the contacts CR4, a pair of circuits shall be set up for respectively energizing the program skip relays R130, R131 and R133, R134 (Fig. 15$g$) which represent the program steps unused in the transcribing operation of the code notation of series A1 and the operation of which shall be described subsequently. The circuit for energizing the relays R130 and R131 is traceable as follows: from line 305 (Fig. 15$g$), line 139 (Figs. 15$g$ and 15$h$), contacts CR4 now closed, line 89, contacts R39$b$ normally closed, contacts R31$g$ now closed, line 140, contacts R78$a$ and R89$a$ as shown, line 144 (Fig. 15$h$ to Fig. 15$g$), R97$f$ normally closed, a parallel circuit arrangement leading to the pick-up coil of R130 and then to ground, and to contacts R83$b$ normally closed, contacts R31$k$ now closed, pick-up coil of R131 and then to ground. The circuit for energizing the relays R133 and R134 may be traced as follows: from line 139 (Fig. 15$h$), contacts CR4 now closed, line 89, contacts R39$b$ normally closed, contacts R31$g$ now closed, line 140 (Figs. 15$h$ and 15$g$), contacts R79$b$ and R80$b$ as shown (Fig. 15$g$) a parallel circuit arrangement leading to the contacts R87$b$, R91*b*, R92*b*, and R87*a*, all as shown, contacts R31*j* now closed, pick-up coil of R133 and then to ground, and to the contacts R82*a* as shown, R31*i* now closed, pick-up coil of R134 and then to ground.

The typewriter basket control circuits consist of the upper case contacts 237, the lower case contacts 236, and the partial case contacts 234 (Fig. 15*h*), the corresponding basket position relays R11, R12, and R14, the corresponding basket control relays R49, R51, and R50 (Fig. 15*h*), and the respective basket shift solenoids 240-shift release, 240-shift lock, and 240-partial.

In order to change the position of the typewriter basket from either a partial or upper case position to a lower case position, it is necessary that the solenoid 240-shift release be energized in a manner as just described.

To change the position of the basket from lower case to upper case, it is necessary that the solenoid 240-shift lock be energized. For example, assuming the code selecting relay R92 for code G2 has been energized and that the basket is in lower case position, a circuit will be established when the cam controlled contacts CR4 and CR5 make at the appropriate time to energize the solenoid 240-shift lock. The circuit established when CR4 makes may be traced from line 305 (Fig. 15*g*), line 139 (Figs. 15*g* and *h*), contacts CR4 now closed, line 89, contacts R39*b* as shown, contacts R31*g* now closed, line 140, contacts R92*a* now closed, line 141, relay R49 and then to ground whereby the relay R49 becomes energized. The circuit established when CR5 makes may be traced from line 305 (Fig. 15*g*), line 139 (Figs. 15*g* and *h*), contacts CR5 now closed, line 96, contacts R31*h* normally closed, contacts R11*a* as shown, contacts R12*a* transferred, contacts R49*a* now closed, solenoid 240-shift lock and then to ground. Thus, when the shift lock solenoid is energized the typewriter basket will shift to the upper case position.

In order that the basket be shifted from lower case position to partial case position, it is necessary that the solenoid 240-partial be energized. This operation is made clear by assuming that the code selecting relay R90 representing code F2 is energized. Thus, when the cam controlled contacts CR4 and CR5 make at their respective times, corresponding circuit will be established which will eventually cause the partial shift solenoid 240-partial to be energized. The circuit established when contacts CR4 make may be traced as follows: from line 305 (Fig. 15*g*), line 139 (Figs. 15*g* and 15*h*), contacts CR4 now closed, line 89, contacts R39*b* as shown, contacts R31*g* now closed, contacts R90*a* now closed, line 142, partial case basket control relay R50 and then to ground. When the contacts CR5 make, the circuit may be traced as follows: from line 139 (Fig. 15*h*), contacts CR5 now closed, line 96, contacts R31*h* normally closed, contacts R11*a* as shown, contacts R12*a* transferred, line 143, contacts R50*d* now closed, solenoid 240-partial and then to ground whereby the solenoid is energized causing the basket to shift to the partial case position.

In order that the basket be shifted from upper case position to partial case, or vice versa, it is necessary that the basket be shifted to lower case position and then, in the following cycle, be shifted to the partial case position. This operation may be best explained by assuming that the code selecting relay R90 representing the superscript notations of the code F2 is energized and that the relay R11 is also energized since the basket is in the upper case position. Thus, when the contacts CR4 make in a particular cycle, a circuit will be established for energizing the partial case basket control relay R50, and when the contacts CR5 make in the next following cycle the shift solenoid 240-shift release will be energized causing the basket to be shifted to lower case position thereby resulting in the relay R11 being deenergized and the relay R12 energized. Normally at this point the programming operations would commence, as shall be pointed out subsequently, but such is not the case in this instance inasmuch as the basket position relay R12, which is energized when the basket is in the lower case position, is not in agreement with the partial case basket control relay R50 thereby preventing the energization of the program control relay R38 (Fig. 15*h*).

When contacts CR4 make two cycles later after R50 is first energized and latched, a circuit is established for energizing the relay R50 (Fig. 15*h*) which is of no consequence inasmuch as R50 is in a latched position due to being energized as described. When CR5 makes in this cycle following the energization of the solenoid 240-shift release, a circuit will be established for energizing the partial shift solenoid 240-partial causing the basket to be shifted to the partial case position whereby the contacts 236 open resulting in the deenergizing of relay R12 and the contacts 234 close resulting in the energizing of relay R14. This circuit may be traced from line 139 (Fig. 15*h*), contacts CR5 now closed, line 96, contacts R31*h* normally closed, contacts R11*a* as shown, contacts R12*a* shifted, line 143, contacts R50*d* now closed, solenoid 240-partial and then to ground. With the basket now in the proper position programming steps shall now take place to carry out the necessary functions as called for by the different code arrangements.

The various basket shifts necessary to initially position the basket as called for by the respective shifts required for the complete translation of the codified data represented by the code series are set forth below in tabular form. For example, in the case of code A2 which initially calls for the basket to be in lower case position for printing the underscoring mark and then shifted to the upper case position for the printing of the upper case characters, the table shows that if the basket is initially in either a partial or upper case position it is necessary that solenoid 240-shift release be energized in order to shift the basket to the lower case position; and that after the underscoring mark is printed the basket is shifted to an upper case positioned by energizing the solenoid 240-shift lock.

| | A1 | A2 | B1 | B2 | C | D1 | D2 | D3 | E | F1 | F2 | G1 | G2 |
|---|---|---|---|---|---|---|---|---|---|---|---|---|---|
| Partial or Upper Case to Lower Case (240-shift release) | X | X | X | X | ---- | X | ---- | ---- | X | X | ---- | X | ---- |
| Lower Case to Upper Case (240-shift lock) | ---- | X | ---- | ---- | X | ---- | X | ---- | ---- | X | ---- | ---- | X |
| Lower Case to Partial Case (240-partial) | ---- | ---- | ---- | ---- | ---- | ---- | ---- | X | ---- | ---- | X | ---- | ---- |
| Upper Case to Partial Case (240-shift release and 240-partial) | ---- | ---- | ---- | ---- | ---- | ---- | ---- | X | ---- | ---- | X | ---- | ---- |
| Partial Case to Upper Case (240-shift release and 240-shift lock) | ---- | ---- | ---- | ---- | X | ---- | X | ---- | ---- | ---- | ---- | ---- | X |

*Programming*.—In interpreting the codified data punched in a record card pursuant to one of the described series coding arrangements, there is provided a programming operation for carrying out a sequence of operations as required for the complete translation of the codified data.

The programming operation for the series coding arrangement calls for seven possible steps where the last, or seventh, step is instrumental in introducing further programming operations as called for by data designated within a card pursuant to the tabular notation coding system and which shall be described subsequently.

The seven possible program steps required to fulfill the functions of the series coding arrangements presented herein are as follows: (1) Printing of a period (.) or spacing of the carriage, whichever the case may be, for indicating the start of a word as represented by a major series code notation, or the printing of an underscoring mark or an under-dot for the respective codes A2 and F1; (2) shifting of the typewriter basket to the proper position for the next required step; (3) printing of either the underscoring mark, as in the case of code arrangements A1, A2, B1 and B2, or the comma prefix, as in code E, or the hyphen prefix, as in code G1; (4) energizing of the zero suppressor relay R143, the test relay R58 and the reading relay R169, R170, R185, R192, R198, R204, R209, R171, R172, R173, R175, and R178 (Fig. 15d) as required and all of which shall be referred to more specifically subsequently, or the printing of the tens digit of a two-character code arrangement; (5) printing of the underscoring mark for the units digits for codes B1 and B2, or printing of an under-dot for code C; (6) printing of the units digit as in the case for codes B1, B2, E, G1 and G2, or printing of single characters as in the case of code D1, for example; and (7) printing of the number (#) suffix for code B2 and introducing additional steps for a tabular programming operation.

During the programming operation, operational cycles are allotted only to those program steps necessary to fulfill the functions required by each code and passing over unwanted steps without delay. There follows a table showing the program steps required of all the series coding arrangements with the unwanted steps for each code indicated by an "x" in the column designating the particular program step. For example, this table shows for code E when used as indicating the start of a word that program steps 1, 3, 4 and 6 will be taken in the order named while program steps 2 and 5 will be skipped over. In the table the seventh program step has been omitted inasmuch as this step is taken only by the code series B2.

out by the circuit completed through the first mentioned network thereby conditioning the skip relay contacts for the next required step.

For example, let it be assumed that program steps 1, 2, 4 and 6 as represented by skip relays R130, R131, R133, and R135 in an energized state are unwanted and that program steps 3 and 5 as represented by skip relays R134 and R136 in an unenergized state are wanted. Then at the proper time during the programming operation a circuit as determined by R130 and R131 will be completed through the skip relay contacts to energize the relay R139 which is equivalent to the count of 2 representing the number of skip relays energized before the first required step, step 3. Upon being energized the relay R139 will first condition one network for carrying out the required program step and then later through the other network cause the energization of the program skip relay R132 representing the step just taken. Then a circuit as determined by relays R130, R131, R132 and R133 will be completed through the skip relay contacts to cause the energization of the program relay R141 which is equivalent to the count of 4 representing the number of skip relays energized before the next required program step, step 5 as represented by relay R135. As in the case of program relay R139, the relay R141 upon being energized will first enable the program step to be carried out and then cause the energization of skip relay R135 representing program step 5.

The following table shows for each code series the unwanted program steps as indicated by the "x" designation and the program relays which are energized in order to enable the required program step to be carried out. For example, in referring to the series coding arrangement B1 it will be noted that the unwanted program steps 1 and 2, as represented by the program skip relays R130 and R131 will be energized prior to the beginning of the programming operation; that relay R139 will be energized for the third program step; that R137 and R139 will be energized together for the fourth program step, and that R141 will be energized in order to enable the fifth program step to be carried out.

Likewise it is to be noted for those codes calling for the first program step, for example, series A2, that this step will be carried out with all of the program relays being in an unenergized condition inasmuch as the program skip relay R130, representative of the first program step, will be in an unenergized state thus preventing the establishing of a circuit through the skip relay contacts to energize the program relays. The first program step will be carried out through a circuit established through one of the program relay networks with all of the contacts thereof being in a normal position while skip relay R130 will be energized after the first step is carried out through a circuit established through the other program relay networks having all the contacts thereof in a normal position also.

*Program Steps*

| Code | 1 (R130) | 2 (R132) | 3 (R132) | 4 (R133) | 5 (R134) | 6 (R135) |
|---|---|---|---|---|---|---|
| A1 | x | x | Print Underscore | x | x | Print Character. |
| A2 | Print Underscore | Basket Shift | x | x | x | Do. |
| B1 | x | x | Print Underscore | Print Tens Digit | Print Underscore | Print Units Digit. |
| B2 | x | x | do | do | do | Do. |
| C (Word Start) | Print Period or Space. | Basket Shift | x | x | Print Underdot | Print Character. |
| C (Word Cont.) | x | x | x | x | do | Do. |
| D1 (Word Start) | Print Period or Space. | x | x | x | x | Do. |
| D1 (Word Cont.) | x | x | x | x | x | Do. |
| D2 (Word Start) | Print Period or Space. | Basket Shift | x | x | x | Do. |
| D2 (Word Cont.) | x | x | x | x | x | Do. |
| D3 (Word Start) | Print Period or Space. | Basket Shift | x | x | x | Do. |
| D3 (Word Cont.) | x | x | x | x | x | Do. |
| E (Word Start) | Print Period or Space. | x | Print Coma | Print Tens Digit | x | Print Units Digit. |
| F1 | Print Underdot | Basket Shift | x | x | x | Print Character. |
| F2 | x | x | x | x | x | Print Units Digit. |
| G1 | x | x | Print Hyphen | Print Tens Digit | x | Do. |
| G2 | x | x | x | x | x | Do. |

Specifically, the elements which combine to carry out this programming feature of the invention consist of a group of seven program skip relays R130 to R136 (Fig. 15g) and three program relays R137, R139 and R141 (Fig. 15k).

There are associated with each of the skip relays R130 to R136 a plurality of contacts serially arranged in a parallel circuit fashion so as to enable a circuit to be completed to the pertinent program relays R137, R139 and R141 as shall be determined by the number of energized skip relays there are prior to the program step to be taken as represented by the lowest unenergized skip relay. For example, at the appropriate time during the programming operation those program relays bearings values additively equal to the program step prior to the step to be taken will be energized.

There are associated with each of the program relays R137, R139, and R141 a plurality of contacts arranged to form two separate networks for the establishment of a circuit therethrough at the appropriate time if either none, one, two, or three of the program relays are in an energized state. One of these networks through a circuit determined by the energized program relays and at the appropriate time enables the program step to be carried out as shall be seen subsequently. The other network at a later time causes the energization of the skip relay representative of the program step carried

*Program Steps*

| Code | 1 (R130) | 2 (R131) | 3 (R132) | 4 (R133) | 5 (R134) | 6 (R135) |
|---|---|---|---|---|---|---|
| A1 | x | x | R139 | x | x | R137 R141 |
| A2 | ---------- | R137 | x | x | x | R137 R141 |
| B1 | x | x | R139 | R137 R139 | R141 | R137 R141 |
| B2 | x | x | R139 | R137 R139 | R141 | R137 R141 |
| C (Word Start) | ---------- | R137 | x | x | R141 | R137 R141 |
| C (Word Cont.) | x | x | x | x | R141 | R137 R141 |
| D1 (Word Start) | ---------- | x | x | x | x | R137 R141 |
| D1 (Word Cont.) | x | x | x | x | x | R137 R141 |
| D2 (Word Start) | ---------- | R137 | x | x | x | R137 R141 |
| D2 (Word Cont.) | x | x | x | x | x | R137 R141 |
| D3 (Word Start) | ---------- | R137 | x | x | x | R137 R141 |
| E (Word Start) | ---------- | x | R139 | R137 R139 | x | R137 R141 |
| E (Word Cont.) | x | x | R139 | R137 R139 | x | R137 R141 |
| F1 | ---------- | ---------- | x | x | x | R137 R141 |
| F2 | x | x | x | x | x | R137 R141 |
| G1 | x | x | R139 | R137 R139 | x | R137 R141 |
| G2 | x | x | x | R137 R139 | x | R137 R141 |

The programming operation shall now be described in relation to the specific problem being discussed. It is recalled that during the second cycle the code selecting relay R94 (see Fig. 33a) has been energized and that during the third cycle the basket has assumed the lower case position with the relays R12 and R51 being in an energized condition as shown in the timing diagram of Fig. 33*a*.

The programming operation is now initiated when the program control relay R38 (Fig. 15*h*) is energized and latched through a circuit established when the contacts CR6 make in the third cycle (Fig. 33*a*). This circuit may be traced from line 139 (Fig. 15*h*), contacts CR6 now closed, line 97, contacts R54*e* and R39*d* normally closed, contacts R11*b* as shown, contacts R11*b* as shown, contacts R12*b* transferred, contacts R51*c* now closed, pick-up coil of R38 and then to ground. Similarly, if the upper case relays R11 and R49 had been energized, the circuit will go through the shifted contacts R11*b* and R49*c* to the relay R38. Also if the partial case relays R14 and R50 had been energized, the circuit will go through contacts R11*b* and R12*b* as shown, and shifted contacts R14*b* and R50*c* to relay R38. Thus the program control relay R38 is not energized unless and until a pair of related relays is first energized. Likewise attention is drawn to the fact in the problem being discussed that if the basket had been in the position necessary for the printing of an underscoring mark that the program relay R38 would have been energized in the second cycle instead of the third cycle thereby eliminating a cycle. At the same time when contacts CR6 make, a circuit is established for energizing the program relay R139 (Fig. 15*k*) which will then enable the first required program step to be taken. This circuit may be traced from line 139 (Fig. 15*g*), contacts CR6 now closed, line 98, contacts R130*b* and R131*b* transferred, contacts R132*b* as shown, line 147 (Figs. 15*g* and 15*k*), pick-up coil of R139 (Fig. 15*k*) and then to ground. A hold circuit for R139 is set up when contacts CR8 (Fig. 15*j*) make which may be traced from line 305, contacts CR8 now closed, line 219 (Fig. 15*j* to Fig. 15*k*), contacts R139*a* now closed, hold coil of R139 and then to ground.

The first program step for code A1 is carried out when the contacts CR7 make during the third cycle (see Fig. 33*a*). At this time a circuit will be established for energizing the underscore solenoid which results in the printing of an underscore. This circuit may be traced from line 305, contacts CR7 (Fig. 15*j*) now closed, contacts R36*c* normally closed, contacts R39*g* as shown, line 148 (Fig. 15*j* to Fig. 15*k*), contacts R38*b* now closed, contacts R137*e* as shown, contacts R139*e* transferred, contacts R141*d* as shown, contacts R87*d* and R91*c* as shown, line 149 (Fig. 15*k* to Fig. 15*n*), line 150, underscore solenoid 240-underscore and then to ground.

In the fourth cycle (Fig. 33*b*) when the contacts CR4 make, a circuit is established to energize the program skip relay R132 (Fig. 15*g*) which corresponds to the program step just taken. This circuit is traceable as follows: from line 305 (Fig. 15*j*), contacts CR4 now closed, contacts R36*b* and R39*f* as shown, line 151 (Fig. 15*j* to Fig. 15*k*), contacts R38*a* now closed, contacts R141*b* as shown, contacts R139*c* transferred, contacts R137*c* as shown, cable 152 (Figs. 15*k* to 15*g*), pick-up coil of R132 (Fig. 15*g*), and then to ground.

A second circuit is also established when contacts CR4 make in the fourth cycle (see Fig. 33*b*) to trip the basket control relay R51. This circuit may be traced from line 139 (Fig. 15*h*), contacts CR4 now closed, line 89, contacts R38*c* now closed, trip coil of R51 and then to ground.

When the contacts CR6 make in the fourth cycle, a pair of circuits are established for the energizing of the program relays R137 and R141 (Fig. 15*k*) thereby conditioning the program relay contacts for the second program step required for the transcribing of the code notations of series A1. The circuit established for R137 may be traced as follows: from line 139 (Fig. 15*g*), contacts CR6 now closed, line 98, contacts R130*a*, R131*a*, R132*a*, R133*a*, R134*a* all transferred, R135*a* as shown, line 153 (Fig. 15*g* to Fig. 15*k*), pick-up coil of R137 and then to ground. The circuit established for R141 is traceable as follows: line 139 (Fig. 15*g*), CR6 now closed, line 98, contacts R130*b*, R131*b*, R132*b*, R133*b*, and R134*b* all transferred, contacts R135*b* as shown, line 154 (Fig. 15*g* to Fig. 15*k*), pick-up coil of R141 and then to ground. A holding circuit for each of these relays is set up when the contacts CR8 make as shown in the timing diagram of Fig. 33*b*.

The second program step required of series A1 is initiated when the contacts CR7 close in the fourth cycle (Fig. 33*b*) causing a circuit to be established for energizing the reading relays R171, R172, R173, R175, and R178 (Fig. 15*d*) and the test relay R58 (Fig. 15*k*). The circuit established for the reading relays may be traced from line 305, contacts CR7 (Fig. 15*j*) now closed, contacts R36*c* normally closed, contacts R39*g* as shown, line 148 (Fig. 15*j* to Fig. 15*k*), contacts R38*b* now closed, contacts R137*e* and R139*d* transferred, line 101 (Fig. 15*k* to Fig. 15*d*), contacts R13*c* as shown, respective contacts R72*c*, R73*c*, R74, R75*c* and R76*c* all transferred, associated contacts R62*e*, R62*d*, R62*c*, R62*b* and R62*a* as shown, corresponding reading relays R171, R172, R173, R175 and R178 and then to ground. Also at the time when contacts CR7 make, a circuit is established for energizing relay R58 which is the same as the circuit just traced to the transferred contacts R139*d* (Fig. 15*k*) with the relay R58 (Fig. 15*k*) being coupled to the transferred side of the contacts R139*d*.

After the relay R58 is energized and when the contacts CR8 close in the fifth cycle (Fig. 33*b*), a circuit is established through a maze of intercoupled reading relay contacts for energizing relay R60 (Fig. 15*q*) only if five of the reading relays are energized. This circuit may be traced from line 305, contacts CR8 (Fig. 15*q*) now closed, line 102, contacts R58*b* now closed, contacts R204*s* as shown, R173*f* transferred, R169*c* as shown, R171*d* transferred, R192*v*, R189*w*, R209*w* and R198*t* all as shown, contacts R175*j* transferred, contacts R170*b* as shown, contacts R172*c* and R178*r* transferred, relay R60 and then to ground.

Also after the relay R58 is energized and the contacts CR8 are closed, a circuit is established through a network of intercoupled contacts of the code selecting relays to energize the relay R59 (Fig. 15*q*) only if one of the code selecting relays is energized. The circuit is traceable as follows: from line 305, contacts CR8, line 102, contacts R58*b* now closed, contacts R86*f*, R78*d*, R79*d*, R82*d*, R83*e*, R85*c*, R87*f*, R89*d*, R90*c*, R91*e*, R92*f* all as shown, contacts R94*f* transferred, contacts R80*e* as shown, relay R59 and then to ground.

If either one of the relays R59 and R60 is not energized when the contacts CR5 make, then the error relay R10 (Fig. 15*a*) and the interlock relay R36 (Fig. 15*a*) will be energized causing the programming operation to be suspended. Assuming that relay R60 is not energized at the time that R59 is energized then, when the contacts CR5 make, a circuit will be established for energizing the error relay R10 which may be traced as follows: from line 305, contacts CR5 (Fig. 15*m*) now closed, line 105, contacts R58*a* now closed, contacts R59*a* transferred, contacts R60*a* as shown, line 103 (Fig. 15*m* to Fig. 15*a*), pick-up coil of relay R10 and then to ground. A hold circuit R10 will be established through the now closed contacts R10*b* and the normally closed contacts R1*b* (Fig. 15*a*) which will be broken only when the card causing the error is ejected. After R10 is energized, the error indicating light 104 (Fig. 15*a*) will be lighted through an obvious circuit established through the now closed contacts R10*a* thereby visually indicating the suspension of the programming operation. When the contacts CR6 make with R10 being held in an energized status, a circuit is set up for energizing the interlock relay R36 (Fig. 15*a*). The circuit may be traced from line 307 (Fig. 15*a*), contacts CR6, line 52, contacts R10*c*, pick-up coil of R36 and then to ground. A hold circuit for relay R36 is set up when the contacts CR7 make which is traceable as follows: from the line 307, contacts CR7, line 57, line 155, contacts R36*a* now closed, hold coil of R36 and then to ground. The energizing of relay R36 causes the contacts R36*a*, R36*b*, R36*c* and R36*d* to open thereby suspending the programming operation. Programming is resumed by depressing the release key causing the card containing the error to be ejected and the next following card to be fed into reading position. Inasmuch as the relays R59 and R60 (Fig. 15*q*) are energized when the contacts CR5 make in the fifth cycle (Fig. 33*b*), a circuit will now be established for energizing the solenoid 240–A (Fig. 15*n*) which causes the printing of the lower-case character "a." This circuit may be traced as follows: from line 305, contacts CR5 (Fig. 15*n*) now closed, line 105, contacts R58*a* now closed, contacts R59*a*, R60*a*, R171*a*, R172*a*, R173*a*, R175*a* and R178*a* all transferred, line 106 (Figs. 15*m*, 15*n*, and 15*p*), line 158 (Figs. 15*p* to 15*n*), solenoid 240–A and then to ground.

After the character has been printed and when the contacts CR4 make in the fifth cycle, a circuit is set up for energizing and latching the program skip relay R135 as follows: from line 305, contacts CR4 (Fig. 15*j*) now closed, contacts R36*b* and R39*f* as shown, line 151 (Figs. 15*j* to 15*k*), contacts R38*a* now closed, contacts R141*b* transferred, contacts R139*b* as shown, contacts R137*b* transferred, cable 152 (Figs. 15*k* to 15*g*), pick-up coil of relay R135 and then to ground.

Then since the last program step for this code notation of series A1 has been carried out with the printing of the character, a circuit is established when the contacts CR6 make in the fifth cycle for energizing the end relay R42 (Fig. 15*g*) and tripping the program control relay R38 (Fig. 15*h*). This circuit may be traced from line 139 (Fig. 15*g*), contacts CR6 now closed, line 98, contacts R130*a*, R131*a*, R132*a*, R133*a*, R134*a*, R135*a* all transferred, contacts R80*c* as shown, line 159, trip coil of R38 (Fig. 15*h*) and pick-up coil of R42 (Fig. 15*g*) in parallel and then to ground. A hold circuit is set up for the relay R42 through the now closed points R42*a* when the contacts CR7 make in the fifth cycle (Fig. 33*b*).

With all of the functions required by the code notations of series A1 now completed, a pair of circuits are established when the contacts CR9 make in the fifth cycle to trip all pilot relays and to energize the read control relay R31 in preparation for the sensing of the second column of the record card of Fig. 32. The circuit for unlatching the pilot relays may be traced as follows: from line 130, contacts CR9 (Fig. 15*g*) now closed, lines 160 and 161, contacts R42*b* transferred, line 107 (Figs. 15*g* to 15*c*), respective trip coils of the relays R72, R73, R74, R75 and R76 and then to ground. The circuit for energizing the relay R31 (Fig. 15*a*) is traceable as follows: from line 307, contacts CR9 now closed, contacts R42*b* now closed, line 107 (Figs. 15*g* to 15*c*), line 108 (Figs. 15*c*, 15*b* and 15*a*) contacts R35*b* (Fig. 15*a*), R1*a* and R5*b* all as shown, pick-up coil of R31 and then to ground. A hold circuit for this relay is established in the manner as previously described.

Figure 33D:
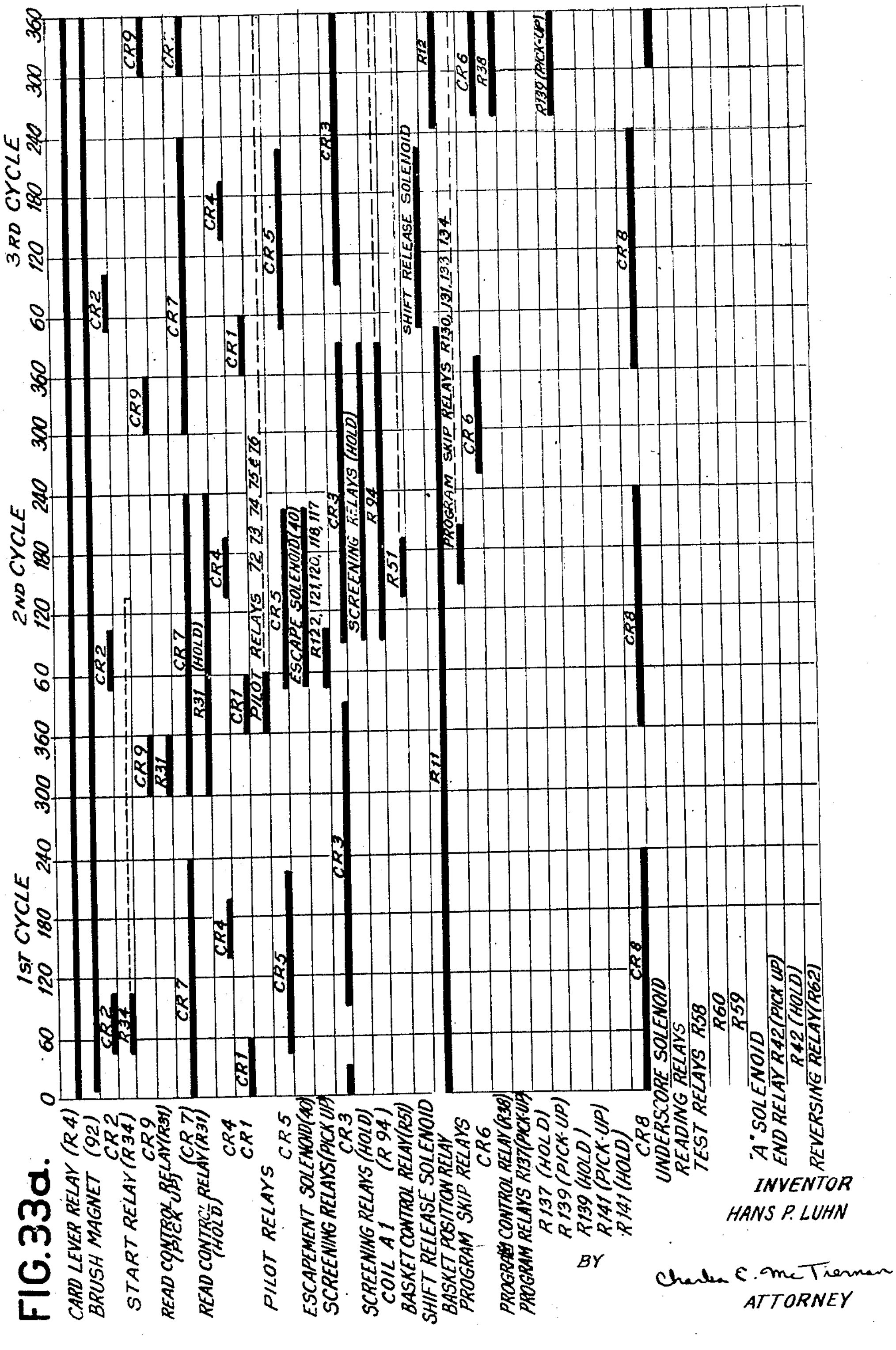
Figure 33B:
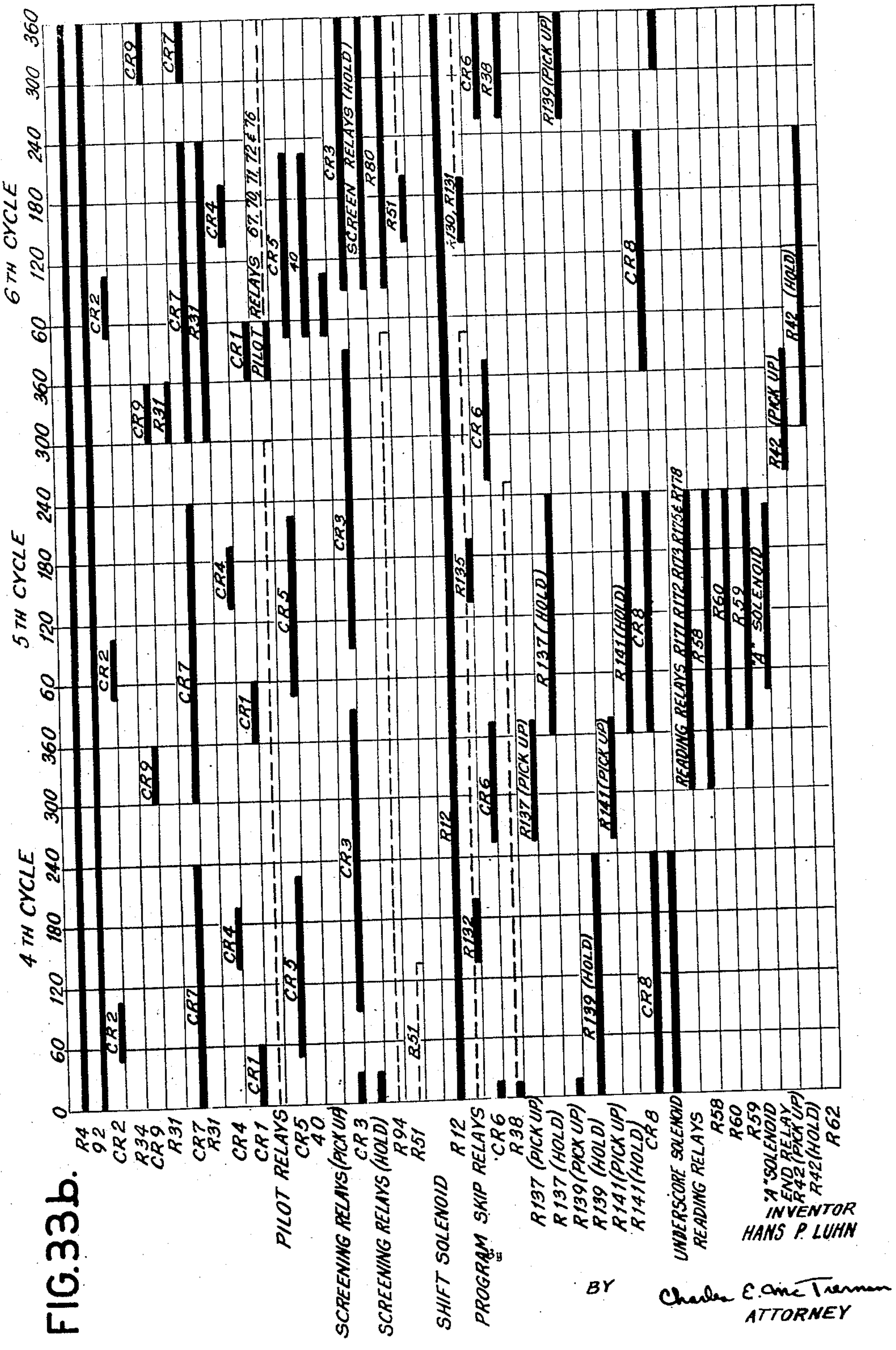

Thus it is to be noted during the first five cycles, as shown in the timing diagram of Figs. 33*a* and 33*b*, that the data represented in the first column of the detail card of Fig. 32 has been sensed, interpreted and printed; that the card has escaped to position column 2 for a sensing operation at the appropriate time; that the card reading phase of the operation commenced with the energization of the read control relay R31; that the programming operation began when the program control relay R38 was energized and latched and terminated when R38 was unlatched and that the circuits are condtioned for reading the perforations within the next following column when the relay R42 is energized.

The second column of the card of Fig. 32 contains perforations in the "9," "5," "4," "3," and "0" index point positions which, upon referring to Fig. 19, represents the characters "76#" of code B2. Thus with the detail card in column 2 position when the contacts CR1 make in the sixth cycle (Fig. 33*b*), the pilot relays R67, R70, R71, R72 and R76 (Fig. 15*c*) will be energized and latched in a manner as previously described. The program skip relays R135, R134, R133, R132, R131 and R130 (Fig. 15*g*) and the code selecting relay R94 (Fig. 15*e*), which were energized during the reading of column 1, will all be unlatched through an obvious circuit established when the contacts CR2 make in the sixth cycle. Likewise, when the contacts CR2 make a circuit will be established for energizing the screening relays R115, R103, R99, R122 and R117 (Fig. 15*c*) in a manner similar to that previously explained with regard to column 1.

As in the case of the data read in column 1, similar operations will take place with respect to the data read in column 2 such that when the contacts CR5 close, the card escapes to column 3; that when the contacts CR3 make in the sixth cycle, the code selecting relay R80 (Fig. 15*e*) representing code B2 will be energized; that when contacts CR4 make in the sixth cycle, the basket control relay R51 (Fig. 15*h*) will be energized and latched, and the skip relays R130 and R131 (Fig. 15*g*) representing the unwanted program steps for code B2 will be energized and latched; that when the contacts CR6 make in the sixth cycle, the program control relay R38 (Fig. 15*h*) will be energized as will be the program relay R139 (Fig. 15*k*); and that when the contacts CR7 make in the sixth cycle, the underscore solenoid will be energized resulting in the printing of an underscore which is the first program step required of code B2.

When the contacts CR4 make in the seventh cycle (Fig. 33*c*), the program skip relay R132 (Fig. 15*g*) will be energized and latched as previously explained. Then the program relays R137 and R139 (Fig. 15*k*) will be energized when the contacts CR6 make as now understood with both of the relays being held by a circuit established when the contacts CR8 make. At the time contacts CR6 make, an additional circuit is established for energizing the reversing relay R62 which may be traced as follows: from line 139 (Fig. 15g), contacts CR6, line 98, contacts R130c, R131c, R132c all transferred, contacts R133c as shown, line 109 (Figs. 15g to 15k), contacts R80f now closed, pick-up coil of the relay R62 and then to ground. An obvious circuit is set up for holding the relay R62 through the contacts R62n (Fig. 15k) when the contacts CR8 make.

In all the numerical coding arrangements it is necessary that the tens digit be printed first and then the units digit. In both cases the group of reading relays representing the index point positions "5" to "9" is used exclusively to select the proper solenoid. In those cases when the code combination sensed is represented within the intermediate deck I, such as the tens digit of code B2, the pick-up coils of the reading relays are inverted by the reversing relay R62 so that the corresponding reading relays associated with deck L are energized.

Thus, when the contacts CR7 make at the time that the relay R62 is energized, a circuit will be completed for energizing the reading relays R171, R175, R178, R185 and R209 (Fig. 15d) which is traceable as follows: from line 305, contacts CR7 (Fig. 15j) now closed, contacts R36c normally closed, contacts R39g as shown, line 140 (Figs. 15j to 15k), contacts R38b (Fig. 15k) now closed, contacts R137e and R139d transferred, line 101 (Figs. 15k to 15d), contacts R13b (Fig. 15d) as shown, respective contacts R67c, R70c, R71c, R72c and R76c all transferred, corresponding contacts R62j, R62g, R62f, R62e and R62a all transferred, respective reading relays R171, R175, R178, R185 and R209 and then to ground. The test relay R58 (Fig. 15k) is also energized when contacts CR7 make in a manner as previously described and as shown in the seventh cycle of the timing diagram of Fig. 33c.

After the test relay R58 is energized, the relays R59 and R60 (Fig. 15q) are energized when contacts CR8 make as previously described thereby enabling a circuit to be established when the contacts CR5 make to energize the solenoid 240–7 resulting in the printing of the number "7."

Figure 33C:
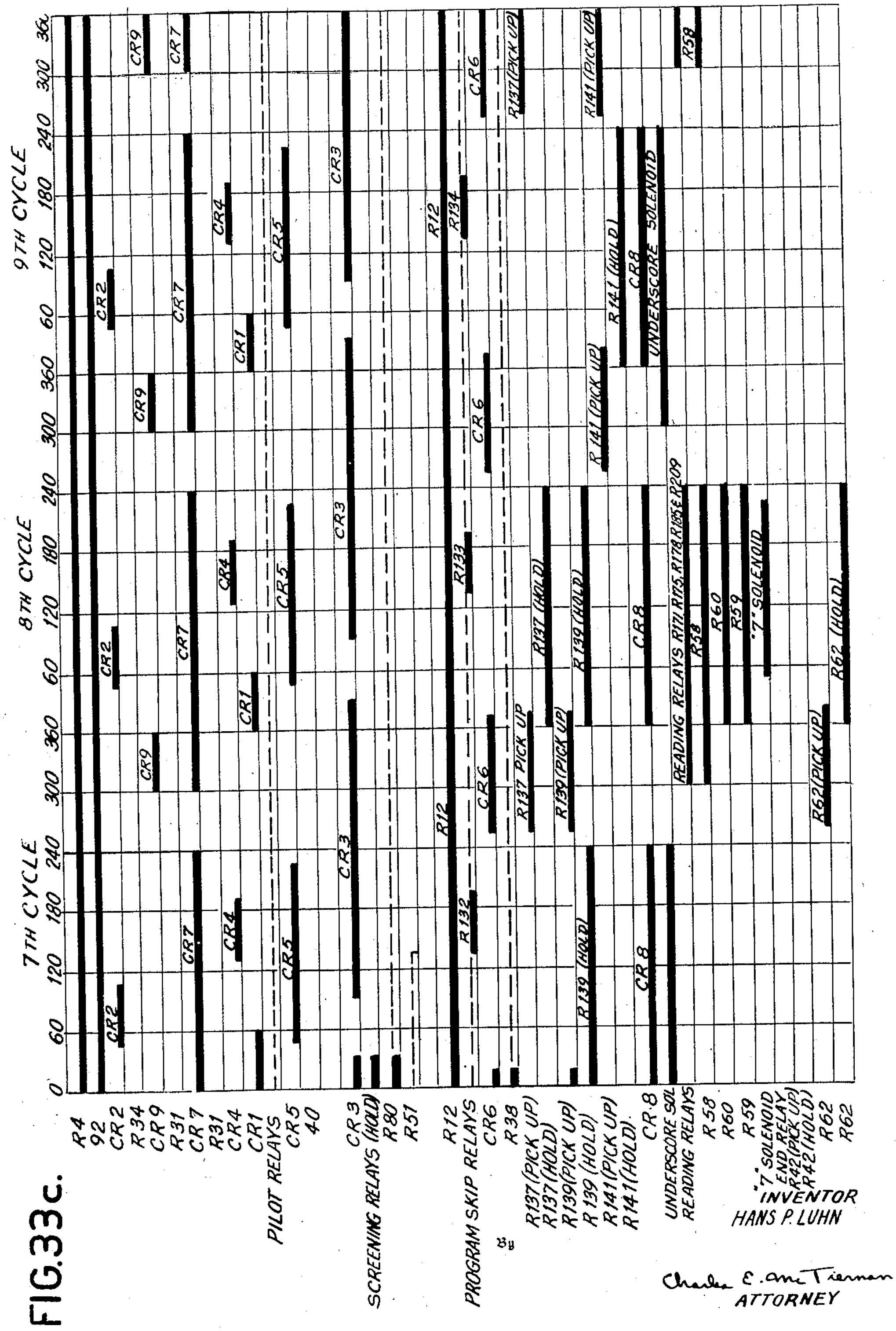
Figure 33D:
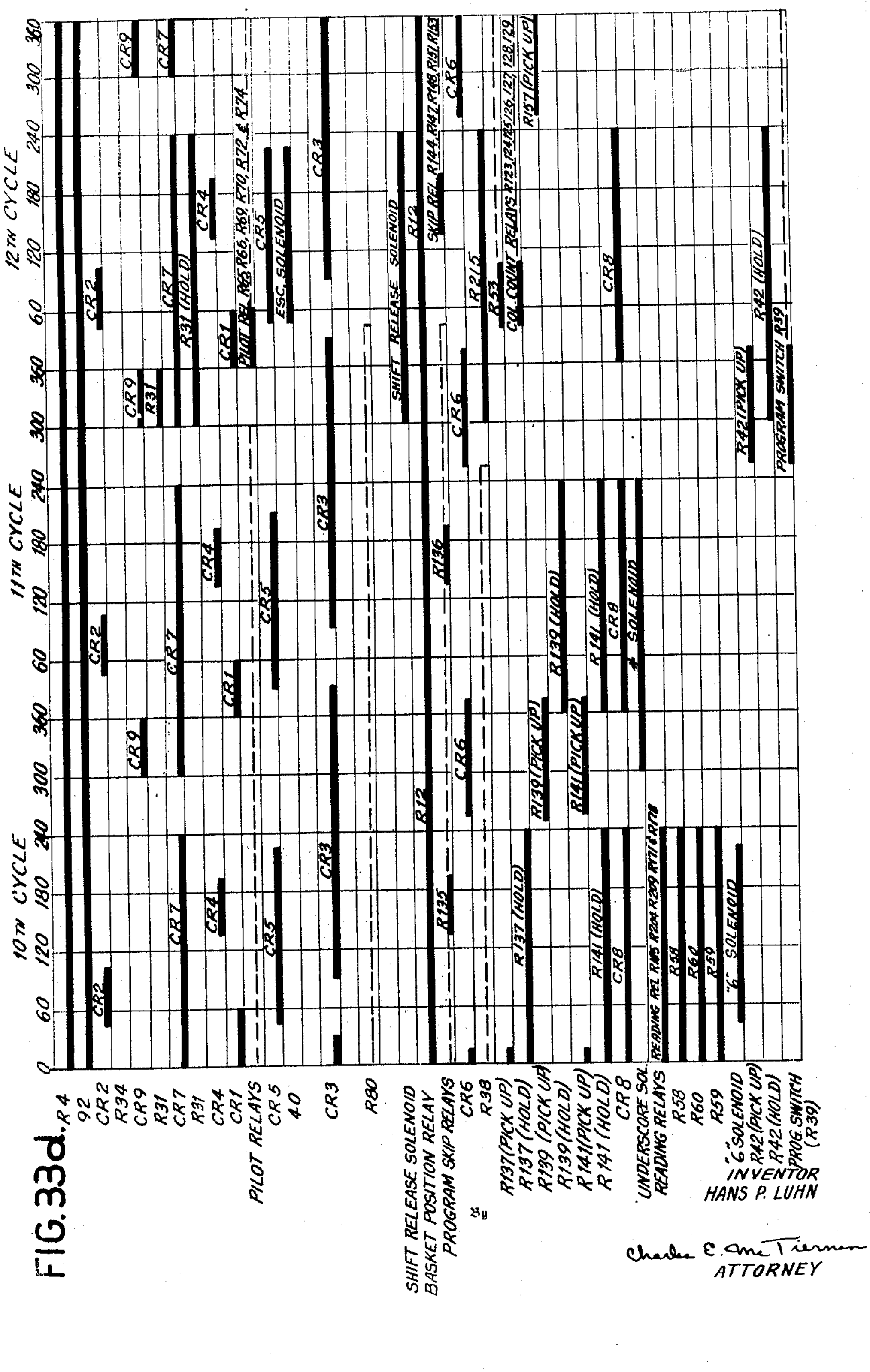

The remaining program steps of printing an underscoring mark, the number "6" and the number indicating sign "#" are then carired out in a manner similar to that previously described and as shown in the timing diagram of Figs. 33c and 33d.

Inasmuch as the coding arrangements of code B2 are always followed by tabular representations, the last program step required of this code conditions the various circuits for the transcribing of this type of representations. Thus, when the contacts CR6 make in the eleventh cycle, a circuit is established for energizing the program switch relay R39 (Fig. 15i) which, upon being energized, eliminates the screening relay network and the program steps 1–7 and introduces a second programming network consisting of steps 8–20. The circuit established for R39 may be traced from line 139 (Fig. 15g), contacts CR6 now closed, line 98, contacts R130b, R131b, R132b, R133b, R134b, R135b, R80d and R136b all transferred, line 162 (Figs. 15g to 15i), pick-up coil of the relay R39 and then to ground. Likewise, when the contacts CR7 make, a circuit is established for energizing the digit skip control relay R215 and the solenoid 240-shift release. This circuit may be traced from line 305, contacts CR7 (Fig. 15j) now closed, contacts R36c as shown, contacts R39g transferred, contacts R157h, R160f, R163g and R166g, all as shown, line 163 (Fig. 15j to Fig. 15h), parallel circuit to R215 (Fig. 15h) and the solenoid 240-shift release and then to ground. The relay R215 prevents any back circuits from being made during the programming. As mentioned previously when the last program step is carried out for a particular coding arrangement, the circuits are conditioned for a reading operation of the next column by the energizing of the end relay R42 when the contacts CR6 make in the eleventh cycle.

*Tabular transcribing.*—The next column, column 3, to be sensed and transcribed, is noted to be one bearing tabular notations in the "Y," "X," "2," "3," "5," and "7" index point positions where the "Y" and "X" perforations indicate that the perforations are to be transcribed directly according to their numeric equivalents.

As in previous similar instances, the pilot relays R65, R66, R69, R70, R72 and R74 (Fig. 15c) will be energized when the contacts CR1 make in the twelfth cycle (Fig. 33d). Similarly, when the contacts CR2 make in the twelfth cycle, the program skip relays R130 to R136 (Fig. 15g) and the code selecting relay R80 (Fig. 15e) will be unlatched.

During a tabular transcribing operation, the contacts CR2 upon making in the twelfth cycle will be instrumental in setting up a pair of circuits to respectively energize and latch the storage relay R53 (Fig. 15c) and the column counter relays R123 to R129 (Fig. 15k). The circuit for energizing and latching R53 indicating the beginning of tabular notations may be traced from line 305, contacts CR2 (Fig. 15j) now closed, contacts R36d as shown, contacts R39h now closed, contacts R166h, R163h, R160g, R157j all as shown, line 118 (Fig. 15j to Fig. 15c), contacts R42d and R66d transferred, pick-up coil of R53 and then to ground.

In the transcribing of tabular information it is necessary that the material transcribed from each column be prefixed by an appropriate column number in lower case, except for the first column, designated as column 0, in which the prefix is omitted. This printing of the column number is brought about through the functioning of the column counter relays R123 to R129 (Fig. 15k). The contacts of the column counter relays are arranged in two circuits such that during program step 9, the numeric solenoid corresponding to the column number read shall be energized resulting in the number being printed.

As previously described, when the contacts CR5 make in the twelfth cycle (Fig. 33d), a circuit is completed for energizing the escapement solenoid causing the dog 47 (Fig. 2) to be lifted such that when the escapement solenoid 40 (Figs. 2 and 15a) is deenergized, the card is shifted to the next column.

When the contacts CR4 make in the twelfth cycle, the skip relays R144, R147, R148, R151, R153, R155 and R156 (Fig. 15i) representing unwanted program steps will be energized and latched. The circuit for energizing relay R144 may be traced from line 305, contacts CR4 (Fig. 15j) now closed, contacts R36b normally closed, contacts R39f transferred, contacts R54f as shown, contacts R166b, R163c, R160d and R157g as shown, cable 124 (Fig. 15j to Fig. 15i), relay R144 (Fig. 15i) and then to ground. The circuit for energizing the remaining unwanted relays is as follows: from the line 305, contacts CR4 (Fig. 15j) now closed, contacts R36b normally closed, contacts R39f transferred, contacts R54f as shown, contacts R166b, R163c, R160d, R157g all as shown, line 125 (Fig. 15j to Fig. 15c), contacts R53a (Fig. 15c) transferred, contacts R67a, R68a, R71a, R73a, R75a and R76a all as shown, corresponding contacts R215a, R215b, R215e, R215g, R215i and R215j, cable 164 (Fig. 15c to Fig. 15i), cable 124 (Fig. 15i), corresponding relays R147, R148, R151, R153, R155 and R156 and then to ground.

Figure 33E:
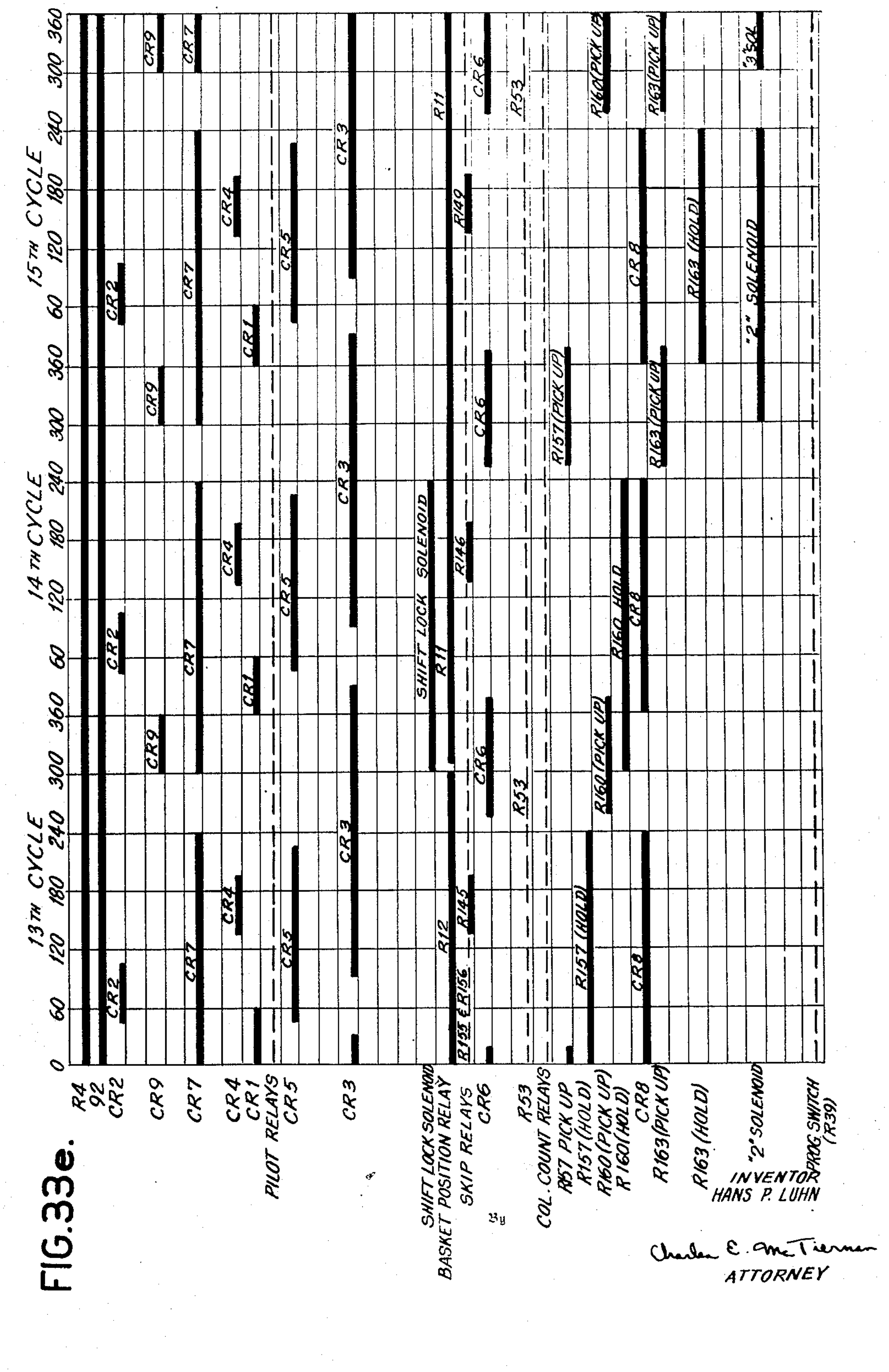

With the skip relays representing the unwanted program steps now in a latched condition, the table program relay R157 (Fig. 15j) will be energized through a circuit completed when contacts CR6 close in the twelfth cycle. This circuit is traceable as follows: from the line 139 (Fig. 15g), contacts CR6 now closed, line 98, line 126 (Fig. 15g to Fig. 15i), contacts R39a (Fig. 15i) now closed, contacts R144b transferred, contacts R145b as shown, contacts R147a and R148a transferred, contacts R149a as shown, line 127, line 128 (Fig. 15i to Fig. 15j), pick-up coil of R157 and then to ground. A hold circuit is established for R157 through its now closed contacts R157a when the contacts CR8 make as shown in the thirteenth cycle (Fig. 33e).

The energizing of R157 conditions the circuit for the printing of the column prefix number which is table program step 9 when the contacts CR5 make but inasmuch as this is the first column being transcribed, no prefix is printed. For all subsequent columns of the table the appropriate column number will be printed when the contacts CR5 make at the time that R157 is in an energized state. A column prefix number will not be printed for the first column of a table inasmuch as a complete circuit will not be established when the contacts CR5 make in the cycle following the energization of column count relays. This incomplete circuit may be traced as follows: line 305 (Fig. 15j), contacts R36c as shown, contacts R157k shifted, contacts R160j, R163j, R166j, all as shown, line 245 (Fig. 15j to Fig. 15k), contacts R129a, R128b, R127b, R126b, R125b, R124b and R123b all shifted which leads to an open circuit. If the contacts R123b were in the position as shown, which position will be assumed after the next column is read as shall be described subsequently, then the circuit would be completed through line 246 (Fig. 15*k*), line 247 (Fig. 15*k* to Fig. 15m), line 248 to the solenoid 240–1 resulting in the column number read being printed in lower case form.

The circuit is then prepared for the next program step of energizing the shift lock solenoid resulting in the typewriter basket being moved to upper case. This step is brought about by the skip relay R145 (Fig. 15*i*) being energized and latched when contacts CR4 make and the table program relay R160 (Fig. 15*j*) being energized when contacts CR6 make in the thirteenth cycle. The circuit completed when contacts CR4 make may be traced from line 305, contacts CR4 (Fig. 15*j*) now closed, contacts R36*b* normally closed, contacts R39*f* transferred, contacts R54*f* as shown, contacts R166*b* and R163*c* as shown, R160*d* transferred, R157*f*, as shown, cable 124 (Fig. 15*j* to Fig. 15*i*) pick-up coil of relay R145 (Fig. 15*i*) and then to ground. The circuit for energizing R160 is traced as follows: from line 139, contacts CR6 (Fig. 15*g*) now closed, line 98, line 126, contacts R39*a* now closed, R144*c* and R145*c* transferred, R146*c* as shown, line 129, line 166 (Figs. 15*i* to 15*j*), pick-up coil of the table program relay R160 (Fig. 15*j*) and then to ground. With R160 now energized, the shift lock solenoid (Fig. 15*h*) is energized when a circuit is completed at the time the contacts CR7 make in the thirteenth cycle (Fig. 33*e*). This circuit may be traced from line 305, contacts CR7 (Fig. 15*j*) now closed, contacts R36*c* as shown, contacts R39*g* transferred, contacts R157*h* as shown, R160*f* transferred, R163*f* and R166*e* as shown, line 130 (Fig. 15*j* to Fig. 15*h*) shift lock solenoid (Fig. 15*h*) and then to ground.

It is necessary that the shift lock solenoid be energized in order to shift the basket into the proper position for the printing of the data sensed in the column. It is also to be noted that the appropriate column number which is printed prior to the energizing of the shift lock solenoid is printed when the basket is in lower case position. Likewise, it is to be noted that the relay R12 is deenergized and relay R11 energized when the shift lock solenoid is energized thereby causing the basket shift to upper case position.

After the shift lock solenoid (Fig. 15*h*) is energized, the skip relay 146 (Fig. 15*i*) is energized and latched through a circuit established when contacts CR4 make in the fourteenth cycle (Fig. 33*e*). This circuit may be traced from line 305, contacts CR4 (Fig. 15*j*) now closed, contacts R36*b* as shown, R39*f* transferred, R54*f* as shown, R166*b* and R163*c* as shown, R160*d* shifted, R157*f* as shown, cable 124 (Figs. 15*j* to 15*i*), pick-up coil of R146 (Fig. 15*i*) and then to ground.

The table program skip relay network (Fig. 15*i*) is now in condition to permit the energization of the table program relays R157 and R163 (Fig. 15*j*) when the contacts CR6 close in preparation for the next program step. The circuit completed for energizing R157 may be traced from line 139, contacts CR6 now closed, line 98, line 126 (Fig. 15*g* to Fig. 15*i*), contacts R39*a* shifted, contacts R144*b*, R145*b*, R146*b*, R147*b*, R148*b* all transferred, R149*b* as shown, line 165, line 128 (Fig. 15*i* to Fig. 15*j*), pick-up coil of R157 (Fig. 15*j*) and then to ground. The circuit established for energizing R163 may be traced from line 139, contacts CR6 now closed, line 98, line 126, contacts R39*a*, R144*d*, R145*d*, R146*d*, R147*d*, R148*d* all transferred, R149*d* as shown, line 131, line 132 (Figs. 15*i* to 15*j*), pick-up coil of R163 (Fig. 15*j*) and then to ground. As usual a holding circuit is established for each of these relays when the contacts CR8 make.

After the energization of relays R157 and R163 (Fig. 15*j*), the next program step is effected when the contacts CR7 make during the fifteenth cycle (Fig. 33*e*) to cause the printing of the character "2." The circuit established for achieving this result may be traced as follows: from line 305, contacts CR7 (Fig. 15*j*) now closed, contacts R36*c* normally closed, contacts R39*g* and R157*h* transferred, R160*e* as shown, R163*e* shifted, line 133 (Figs. 15*j* to 15*k*), line 167 (Figs. 15*k* to 15*m*), line 168 (Fig. 15*m*), solenoid 240–2 and then to ground.

Figure 33F:
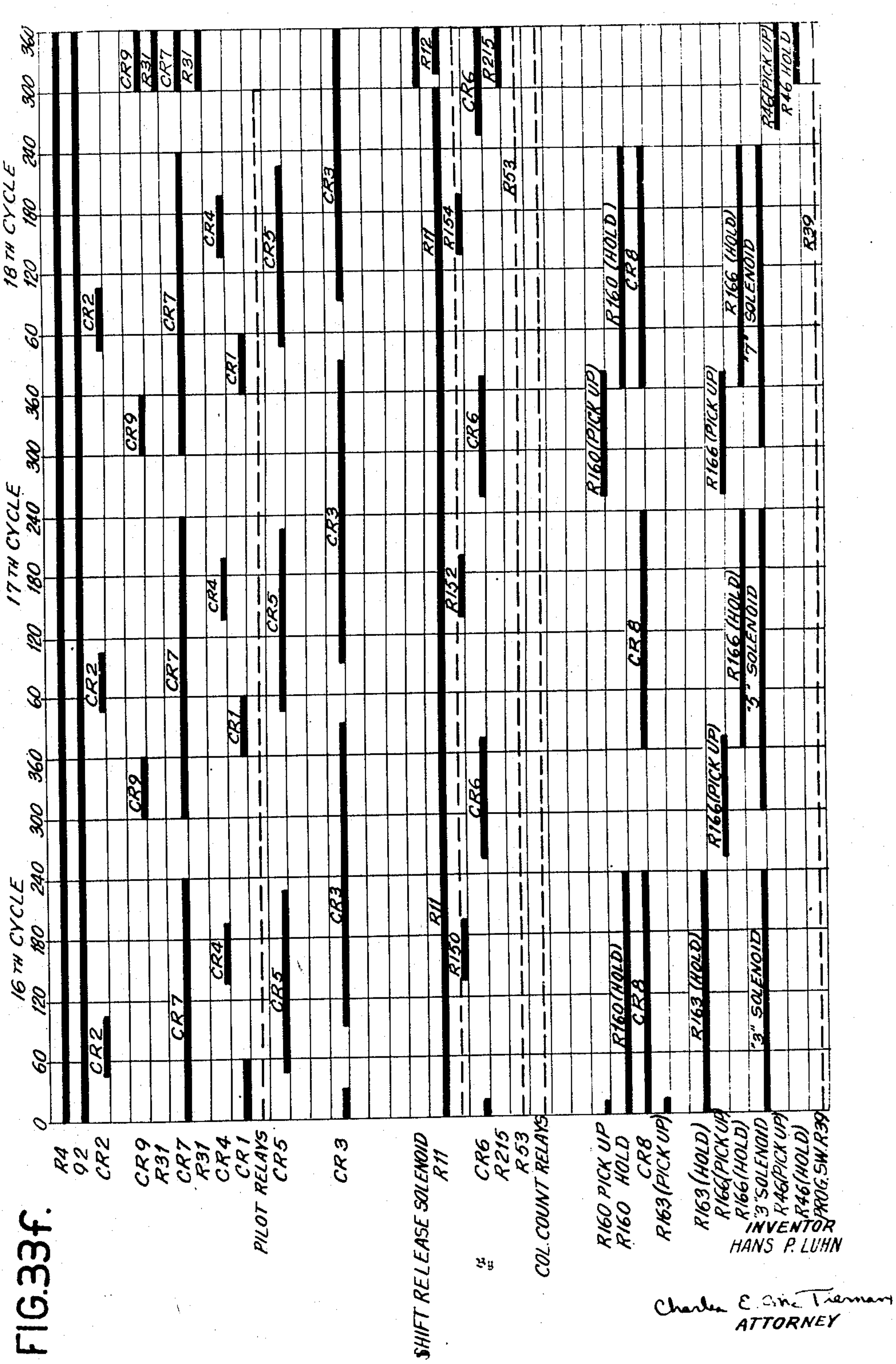

The remaining program steps to print the characters "3," "5," and "7," and return the basket to lower case position are carried out in a fashion as previously described as can be observed from the timing diagram of Fig. 33*f*.

The network for controlling the programming of the tabular notations is similar to that as previously described. In the case of the tabular notation, there are thirteen program steps, designated steps 8–20, which upon being made effective, fulfill the function required by any combination of perforations within column. The functions assigned to the various program steps are as follows: Program step 8 as represented by relay R144 causes the basket to be shifted to lower case position; program step 9 as represented by relay R145 prints the column number; program step 10 as represented by relay R146 shifts the basket to upper case position; and program steps 11 to 20, respectively represented by the relays R147 to R156, print the characters 0 to 9.

The data in the fourth column of the detail card of Fig. 32, is now sensed in the nineteenth cycle resulting in the pilot relays R66, R67, R72, R73 and R75 (Fig. 15*c*) being energized when the contacts CR1 make.

When the contacts CR2 make, the column count relay R123, the table program skip relays R144 to R156 and the "X" storage relay R153 are all unlatched. At the same time, the "Y" storage relay R54 is energized thereby signifying the end of the table programming operation.

Also in the nineteenth cycle, the contacts CR6 establish a circuit to trip the program switch relay R39 (Fig. 15*i*) while the contacts CR9 complete a circuit to energize the screening delay relay R57 (Fig. 15*g*) which is held by a circuit established through the making of the contacts CR7.

Then in the twentieth cycle (Fig. 33*g*) the screening relays R97, R115, R122, R120 and R118 (Fig. 15*c*) are energized due to a circuit established through contacts R57*c* and R13*b* when the contacts CR2 make. The contacts CR3 then complete a circuit for energizing the code selecting relay R83 (Fig. 15*e*) representing series D1.

Figure 33G:
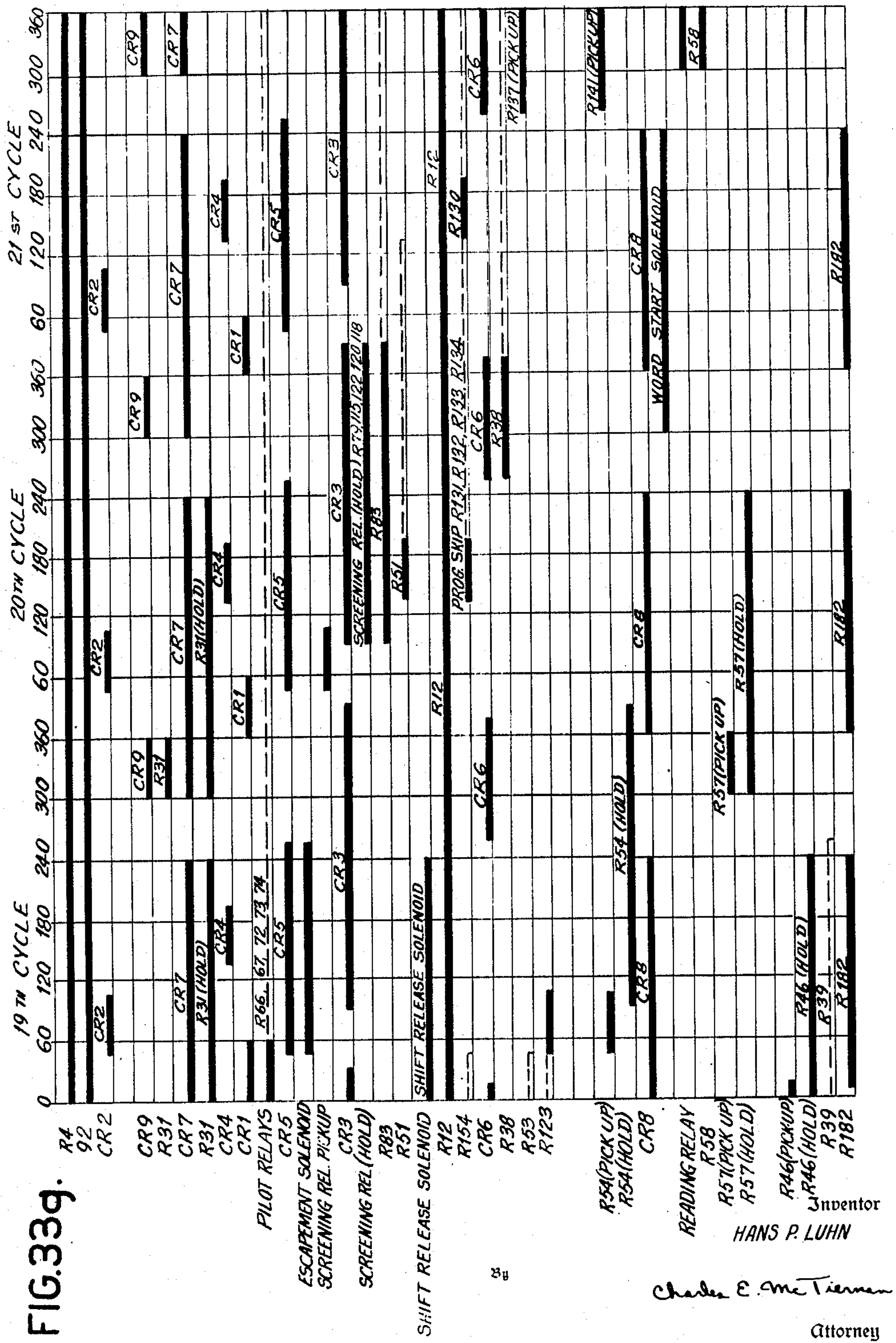
Figure 33H:
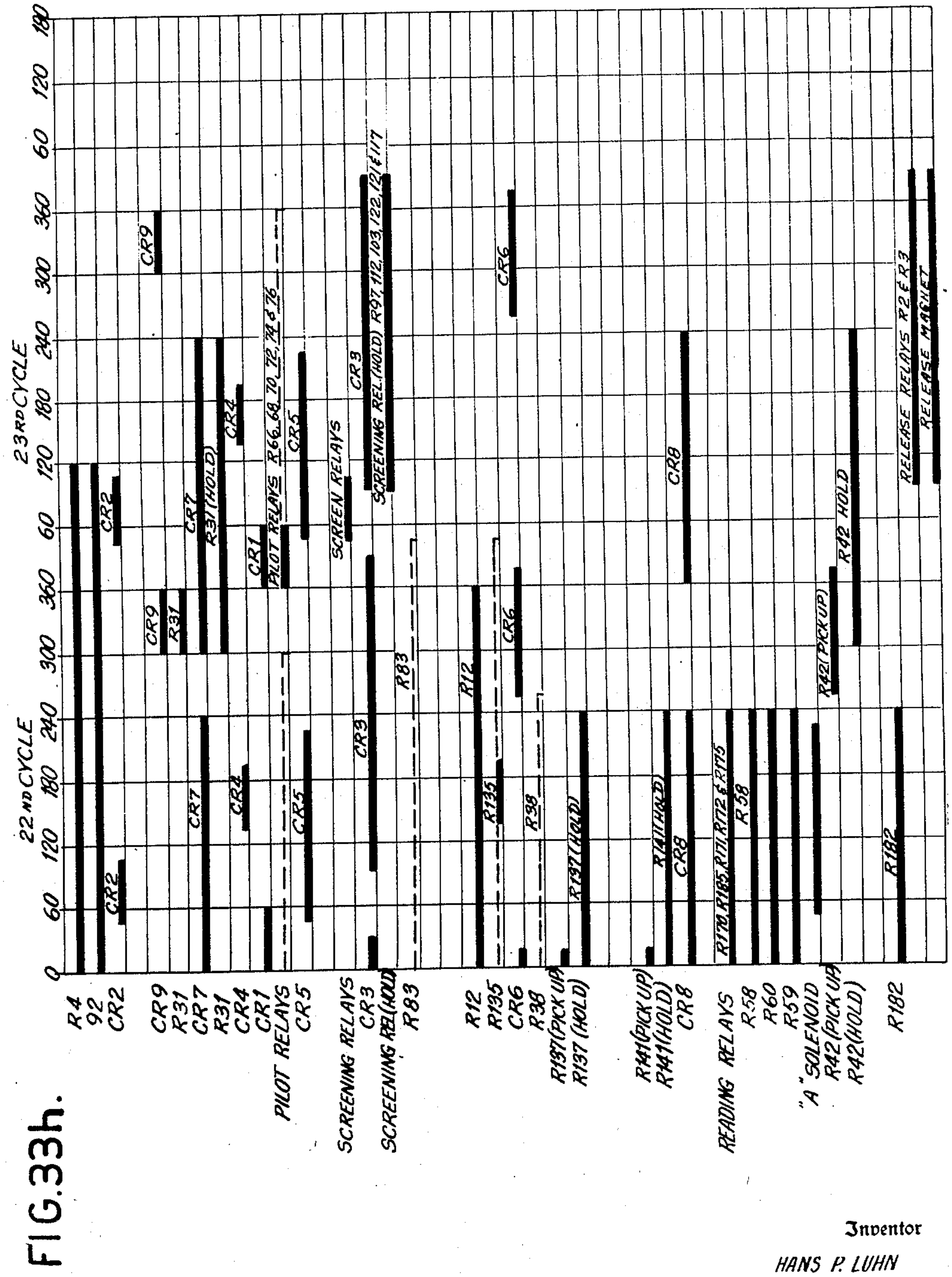

The programming which follows, as shown in the timing diagram of Figs. 33*g* and 33*h*, is similar to that described with respect to the programming of the data contained in column 1.

The fifth column of the detail card of Fig. 32 is laced so that when the contacts CR1 make in the twenty-third cycle (Fig. 33*h*), the pilot relays R66, R68, R70, R72, R74 and R76 will be energized and latched resulting in the screening relays R97, R112, R103, R122, R121 and R117 being energized when the contacts CR2 make in a manner as previously described.

After the screening relays are energized, a circuit will be established when the contacts CR3 make to energize the release relays R2 and R3 as follows: from line 305, line 88 (Fig. 15*e*), contacts R122*b* and R121*b* transferred, R120*b* as shown, R118*c* as shown, R117*d* transferred, R115*d* as shown, R122*e* shifted, R103*e* as shown, R103*e* shifted, R99*d* as shown, R97*c* transferred, line 169 (Figs. 15*e* to 15*a*), pick-up coils of release relays R2 and R3 and then back to ground. Now as previously described, hold circuits for the release relays R2 and R3 are established and the release magnet 60 will be energized resulting in the detail card of Fig. 32 being ejected and the following card being fed to the reading station.

*Interlock circuits*

The programming operation is suspended when the interlock relay R36 (Fig. 15*a*) is energized causing the contacts R36*b*, R36*c*, R36*d* and R36*e* (Fig. 15*j*) to open. The interlock relay R36 is energized when the contacts CR6 make when either the release relay R2 (Fig. 15*a*), stop relay R6 (Fig. 15*a*), tabulating interlock relay R7, the carriage return interlock relay R8 (Fig. 15*b*), or the error relay R10 (Fig. 15*a*) is energized.

The depressing of the release key 310 (Fig. 15*a*), during a programming operation, will close the release key contacts 311 thereby enabling the release relays R2 and R3 (Fig. 15*a*) to be energized through an obvious circuit completed when the contacts CR5 make. The contacts R2*c* (Fig. 15*a*) will close when the relay R2 is energized thereby enabling a circuit to be established for energizing the interlock relay R36 when the contacts CR6 make. As previously mentioned the programming operation will be suspended when the relay R36 is energized and the detail card being sensed will be ejected in a manner as previously described.

As previously described, the release relay R2 will also be energized when the first lacing column is detected thereby resulting in the energization of the interlock relay R36.

The interlock relay R36 will also be energized when the stop key 315 (Figs. 1 and 15*a*) is depressed closing the contacts 317 (Fig. 15*a*). The closing of contacts 317 will establish an obvious circuit for energizing the stop relay R6 causing the closing of the contacts **R6*b* and R6*c*. The contacts R6*b* upon being closed will set up a hold circuit for the relay R6 while the contacts R6*c* will complete a circuit for energizing the interlock relay R36 causing the programming operation to be suspended. When the programming is suspended by depressing the stop key 315, the machine may be placed in operation again by depressing the start key thus breaking the hold circuit of relay R6 and causing the relay R36** to be deenergized.

When the code notations "2," "5," "6" and "7" (Fig. 22) representing a tabulating operation are detected in a detail card, the solenoid 240-tab (Fig. 15*p*) and the tabulating interlock relay R7 (Fig. 15*b*) will be energized. A hold circuit for relay R7 will be established through the normally closed tab stop **256*a*** (Fig. 15*b*) and the now closed contacts **R7*a*. The energizing of the solenoid 240-tab will effect a tabulating operation of the typewriter carriage, such as described in U. S. Patent No. 2,378,371, while the energizing of relay R7 will cause the contacts R7*c*** (Fig. 15*a*) to close resulting in a circuit being completed for energizing the interlock relay R36 (Fig. 15*a*). When the carriage has reached its destination, the contacts **256*a*** (Fig. 15*b*) will open resulting in the deenergization of the relays R7 and R36 and the continuing of the program operation.

The interlock relay R36 will also be energized when the carriage return interlock relay R8 (Fig. 15*b*) and the carriage return relay R9 (Fig. 15*b*) are energized. The relay R8 will be energized when the contacts CR5 make causing a circuit to be completed through the reading relay network (Figs. 15*m* and 15*n*) to the contacts **R86*d*** (Fig. 15*n*) which responds to the code designation "8," "7," "5" and "2" (see Fig. 22) representing a carriage return operation. The relay R8 will also be energized when the tab stop contacts **257*a*** (Fig. 15*b*) are closed by the carriage causing the relay R9 (Fig. 15*b*) to be energized. Then when the contacts CR5 make, a circuit will be completed through either contacts **R42*e* or R46*e*** (Fig. 15*b*), one of which will be closed, the now closed contacts **R9*b*, relay R8 and then to ground. A hold circuit for the relay R8 and R9 will be established through the tab stop contacts 255*a* which are located in the first printing position of the typewriter carriage. After the relay R8 is energized, an obvious circuit will be established for energizing the solenoid 240**-carriage return (Fig. 15*p*) through the now closed contacts **R8*d* causing the carriage to shift to its first printing position. Likewise after the relay R8 is energized, a circuit will be completed for energizing the interlock relay R36** (Fig. 15*a*) through the now closed contacts **R8*c*** (Fig. 15*a*) causing the programming operation being carried out to be suspended. After the carriage has returned, the contacts **255*a* will be disengaged resulting in the hold circuit of relays R8 and R8** being broken and the programming being resumed.

*Master card operation*

One of the features of the invention described herein is the ability to transcribe data from both a master card, such as that shown in Fig. 30 and having seven perforations to a column, and a detail card, such as that shown in Fig. 29 and having five perforations to a data containing column.

When it becomes necessary to transcribe the data contained in a master card, the switch 303 (Figs. 1 and 15*b*) is shifted from the "Detail" position to the "Master" positon causing an obvious circuit to be established for energizing the relay R13 (Fig. 15*b*).

Now assuming that the data contained in column 64 of the master card of Fig. 30 has been analyzed, the pilot relays R65, R66, R69, R70, R71, R75 and R76 (Fig. 15*c*) will be energized in a manner as previously described. Then when the contacts CR2 make a circuit will be established through the shifted contacts **R13*b*** (Fig. 15*c*) and the normally closed contacts of those pilot relays which were not energized to energize the screening relays R115, R112, R122, R120 and R121 (Fig. 15*c*). The remaining steps are similar to that described for a detail card except that the reading relays (Fig. 15*d*) energized will only be those relays for which a circuit will be completed over the transferred contacts **R13*c*** (Fig. 15*d*) and the normally closed contacts of those pilot relays which were not energized.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A programming system comprising a plurality of relays having a maze of intercoupled contacts each representative of a particular program step to be fulfilled as required by a particular coding arrangement, means for energizing certain ones of said relays representative of unwanted program steps upon sensing a particular coding arrangement, the remaining ones of said relays representative of the wanted program steps as required by said sensed coding arrangement being in an unenergized condition, cyclically operable means for carrying out the wanted program steps including a plurality of program control relays having a network of intercoupled contacts, said program control relays being energized through a circuit completed through said maze of contacts as determined by the number of relays representative of unwanted steps that are energized prior to the relay representative of the initial wanted step, means as determined by said network for effecting the initial wanted program step, and means as determined by said network for energizing the relay of said relays representative of the program step effected thereby enabling a circuit to be completed through said maze of contacts for effecting the next following program step.

2. A program system for allotting operational cycles only to those program steps necessary to fulfill the functions required by each code and passing over unwanted program steps without delay, comprising a plurality of relays each representative of a distinct program step, means upon sensing a particular coding arrangement for energizing certain of said relays representing the program steps not required of the sensed coding arrangement, the remaining ones of said relays being in an unenergized condition and representing the program steps to be taken by the sensed coding arrangement, program control means including a plurality of relay means operably coupled to said first mentioned relays and cyclically operable means to enable each required program step to be successively carried out, means controlled by said first mentioned relays for cyclically energizing those program control relay means representative of the number of unwanted program steps preceding a wanted program step to enable the wanted program step to be fulfilled, and means controlled by said program control relay means for cyclically energizing the relay representative of each fulfilled program step thereby enabling said program control relay means to be conditioned for the next wanted program step, the unwanted relays representative of the unwanted program steps being skipped.

3. A programming arrangement comprising a plurality of relays each of which is representative of a particular predetermined program step and arranged in numerical order, means for energizing certain of said relays upon detecting a particular coding arrangement within a record card, said certain relays representing the program steps unwanted by the detected coding arrangement, the remaining ones of said relays being in an unenergized state and representing the steps required of the detected coding arrangement, and program control means including a plurality of relay means fewer in number than said first mentioned relays and cyclically operable means to enable the wanted program steps to be carried out successively in order, the energization of said relay means being determined by the number of said relays representative of unwanted steps that are energized prior to the one of said relays which is representative of the initial wanted step, said energized relay means enabling the program step to be taken to be carried out, said energized relay means after said program step is carried out causing the relay representative of the program step taken to be energized.

4. A programming arrangement comprising a plurality of relays each representative of a particular program step, means for energizing certain ones of said relays that are unnecessary in the transcribing of a particular detected coding arrangement, the others of said relays being in an unenergized state and representing the program steps required in the transcribing of said coding arrangement, a plurality of relay means energizable either singly or in combination to represent any number of said relays, means under control of said relays for energizing certain ones of said relay means which are representative of a number one less than the number of the program step to be taken, means under control of said energized relay means for enabling the program step to be taken to be carried out, and additional means under control of said energized relay means for causing the energization of the one of said relays which is representative of the program step carried out after the last mentioned step is carried out, the energization of the relay representative of the step carried out placing said relay means in a condition for carrying out the next wanted program step.

5. A programming arrangement comprising seven relays having a maze of intercoupled contacts, each of said relays representative of a distinct program step required in the transcribing of a particular coding arrangement, means for energizing certain ones of said relays representative of program steps unwanted for the transcribing of a detected coding arrangement, the other ones of said relays representative of the program steps wanted for transcribing said detected coding arrangement remaining in an unenergized condition, a plurality of program control relays having a network of contacts, said relays representative of the digits 1, 2 and 4, means under control of said maze of contacts for sequentially energizing said control relays representative of a number one less than the program step to be taken, and means under control of said network for carrying out the wanted program step followed by the energization of the relay of said relays representative of the step carried out, said maze of contacts being then conditioned for causing said control relays to be energized for the purpose of enabling the next wanted step to be carried out.

References Cited in the file of this patent

UNITED STATES PATENTS

| Number | Name | Date |
|---|---|---|
| 403,179 | Davis et al. | May 14, 1889 |
| 566,536 | Rich et al. | Aug. 25, 1896 |
| 2,283,538 | Clark | May 19, 1942 |
| 2,464,608 | Rabenda et al. | Mar. 15, 1949 |